US008870301B2

(12) United States Patent
Ohkubo et al.

(10) Patent No.: US 8,870,301 B2
(45) Date of Patent: Oct. 28, 2014

(54) HYDRAULIC BRAKE SYSTEM

(75) Inventors: Masayasu Ohkubo, Okazaki (JP); Yoshito Tanaka, Miyoshi (JP); Hiroshi Nakaoka, Okazaki (JP); Takayuki Yamamoto, Aichi-gun (JP); Tetsuya Miyazaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/395,320

(22) PCT Filed: Sep. 17, 2010

(86) PCT No.: PCT/JP2010/066188
§ 371 (c)(1),
(2), (4) Date: Mar. 9, 2012

(87) PCT Pub. No.: WO2012/035652
PCT Pub. Date: Mar. 22, 2012

(65) Prior Publication Data
US 2013/0207451 A1 Aug. 15, 2013

(51) Int. Cl.
| | |
|---|---|
| *B60T 8/84* | (2006.01) |
| *B60T 8/50* | (2006.01) |
| *B60T 13/68* | (2006.01) |
| *B60T 8/36* | (2006.01) |
| *B60T 13/14* | (2006.01) |
| *B60T 7/04* | (2006.01) |
| *B60T 1/10* | (2006.01) |
| *B60T 13/66* | (2006.01) |
| *B60T 8/40* | (2006.01) |

(52) U.S. Cl.
CPC ............. *B60T 13/686* (2013.01); *B60T 8/5012* (2013.01); *B60T 8/5081* (2013.01); *B60T 8/3655* (2013.01); *B60T 13/146* (2013.01); *B60T 13/148* (2013.01); *B60T 7/042* (2013.01); *B60T 1/10* (2013.01); *B60T 13/662* (2013.01); *B60T 8/4081* (2013.01)
USPC ...................... 303/116.1; 303/116.2; 303/157; 303/158

(58) Field of Classification Search
CPC ... B60T 13/686; B60T 13/662; B60T 13/148; B60T 1/10; B60T 7/042; B60T 8/3655; B60T 8/4081; B60T 8/5012; B60T 8/5081
USPC ........ 303/155–159, 189, 113.1, 113.4, 114.1, 303/116.1, 116.2, 119.1, 13; 137/601.14
See application file for complete search history.

(56) References Cited

U.S. PATENT DOCUMENTS

| | | | | |
|---|---|---|---|---|
| 6,968,860 | B1 * | 11/2005 | Haenlein et al. | ............... 137/613 |
| 7,530,648 | B2 * | 5/2009 | Obai | ........................... 303/119.1 |
| 7,530,649 | B2 * | 5/2009 | Kusano | ........................... 303/151 |

(Continued)

FOREIGN PATENT DOCUMENTS

| | | |
|---|---|---|
| JP | A-2001-213302 | 8/2001 |
| JP | A-2006-240339 | 9/2006 |

(Continued)

OTHER PUBLICATIONS

International Search Report issued in International Application No. PCT/JP2010/066188 dated Dec. 28, 2010 (with translation).

*Primary Examiner* — Thomas Irvin
(74) *Attorney, Agent, or Firm* — Oliff PLC

(57) ABSTRACT

A hydraulic brake system includes: a hydraulic pressure source provided for a vehicle, and including a hydraulic-pressure generating device and a reservoir; a plurality of hydraulic brakes provided for respective wheels of the vehicle, and configured to restrain rotations of the respective wheels; and a control valve device including at least one hydraulic-pressure control valve group disposed between the hydraulic-pressure generating device and at least one of brake cylinders of the hydraulic brakes and/or between the reservoir and the at least one of the brake cylinders. Each of the at least one hydraulic-pressure control valve group includes (a) at least one ON/OFF control valve and (b) at least one linear control valve that are disposed in parallel with each other.

10 Claims, 28 Drawing Sheets

(56) References Cited

U.S. PATENT DOCUMENTS

| | | | |
|---|---|---|---|
| 7,559,613 B2 * | 7/2009 | Kokubo | 303/16 |
| 8,506,022 B2 * | 8/2013 | Nakaoka et al. | 303/115.4 |
| 8,517,476 B2 * | 8/2013 | Okano et al. | 303/167 |
| 2006/0214504 A1 * | 9/2006 | Kusano | 303/113.4 |
| 2007/0114842 A1 * | 5/2007 | Ohkubo et al. | 303/115.1 |
| 2007/0176486 A1 * | 8/2007 | Nakamura | 303/115.1 |
| 2008/0106143 A1 * | 5/2008 | Yazaki et al. | 303/13 |

FOREIGN PATENT DOCUMENTS

| | | |
|---|---|---|
| JP | A-2006-264675 | 10/2006 |
| JP | A-2008-157425 | 7/2008 |
| JP | A-2010-042743 | 2/2012 |
| WO | WO 99/00281 A1 | 1/1999 |

* cited by examiner

FIG.3
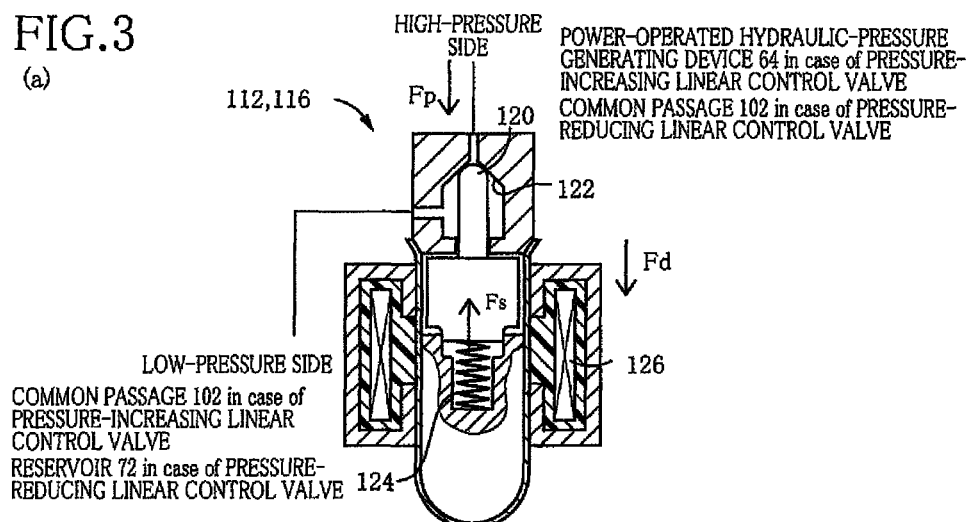
(a)
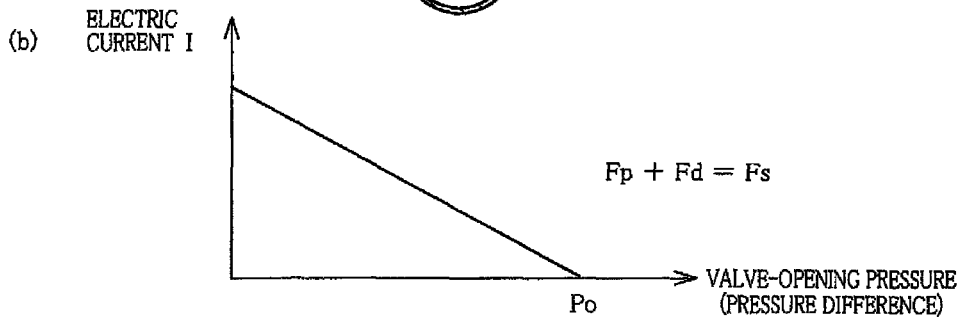
(b)
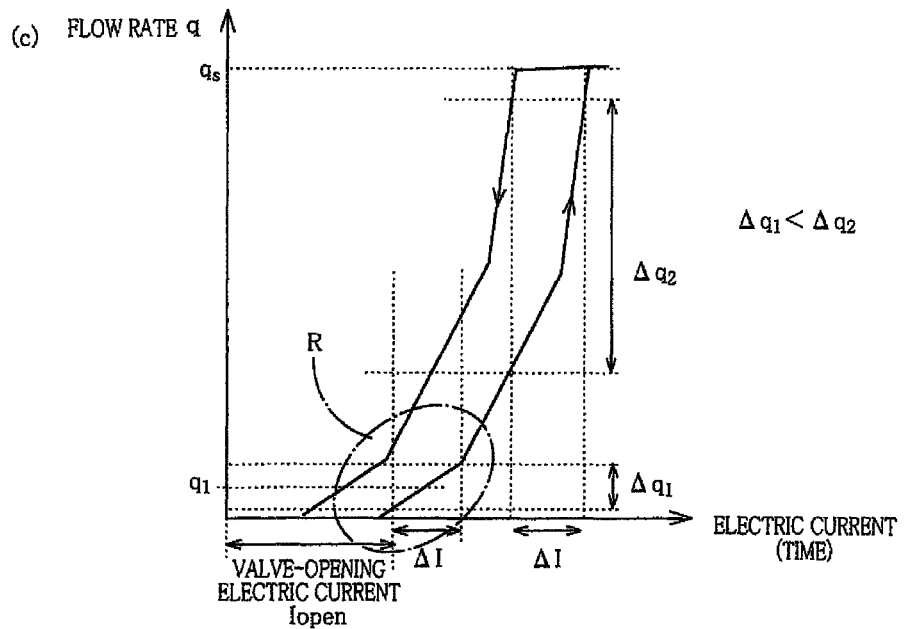
(c)

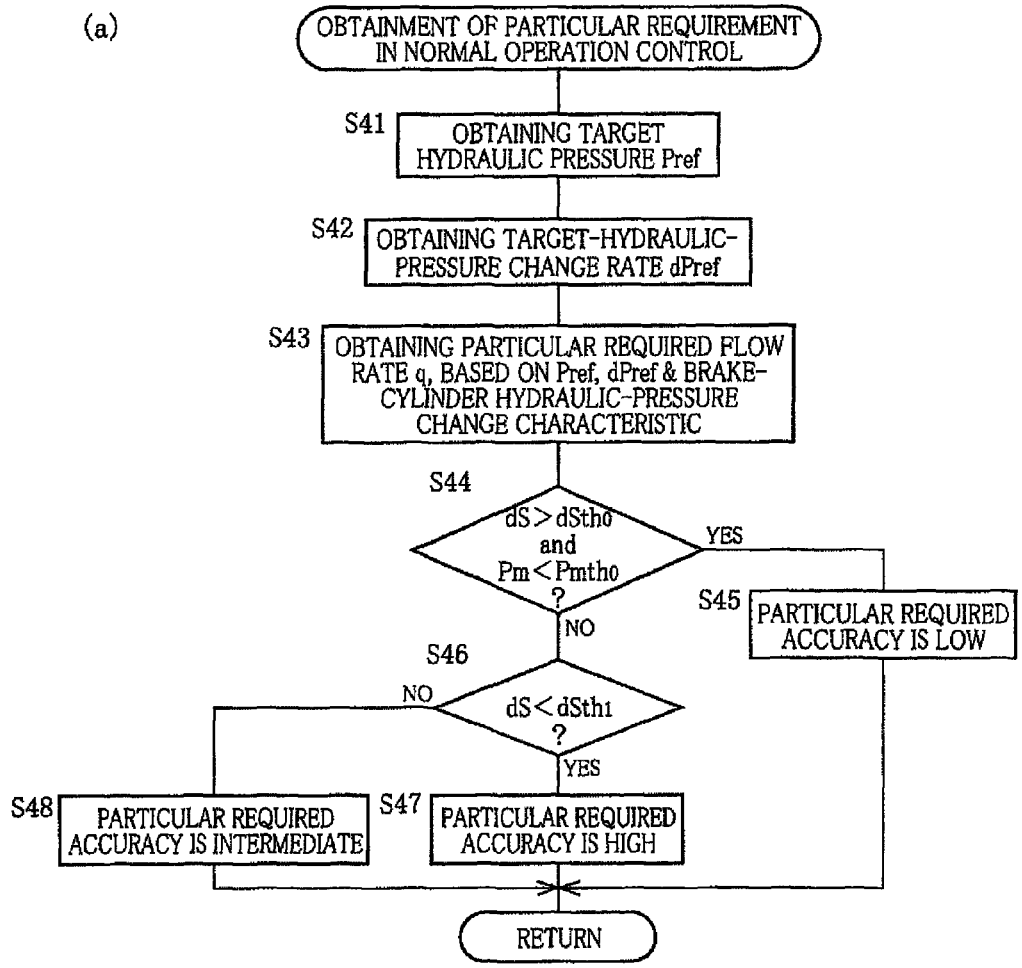
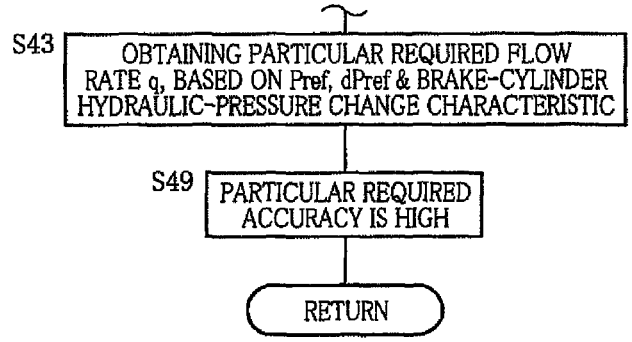
FIG.10

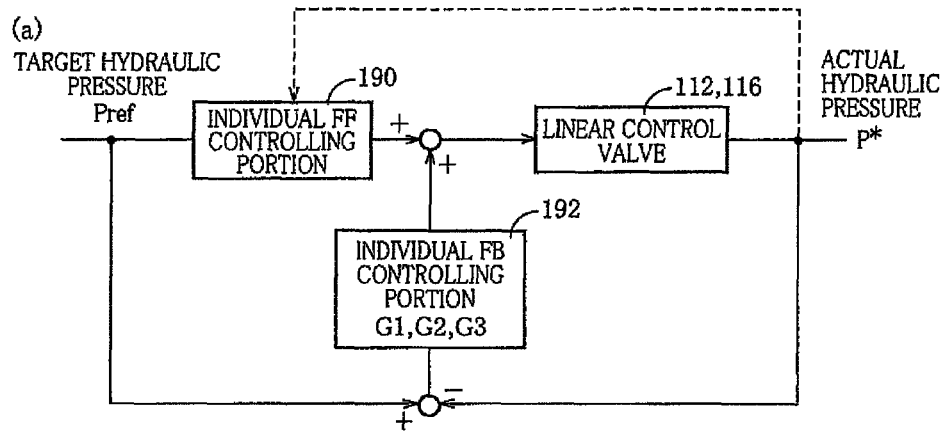
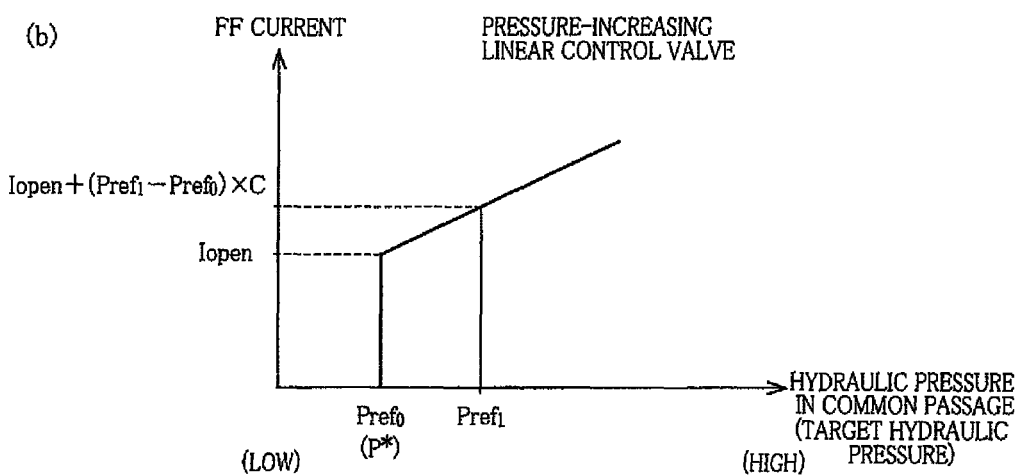
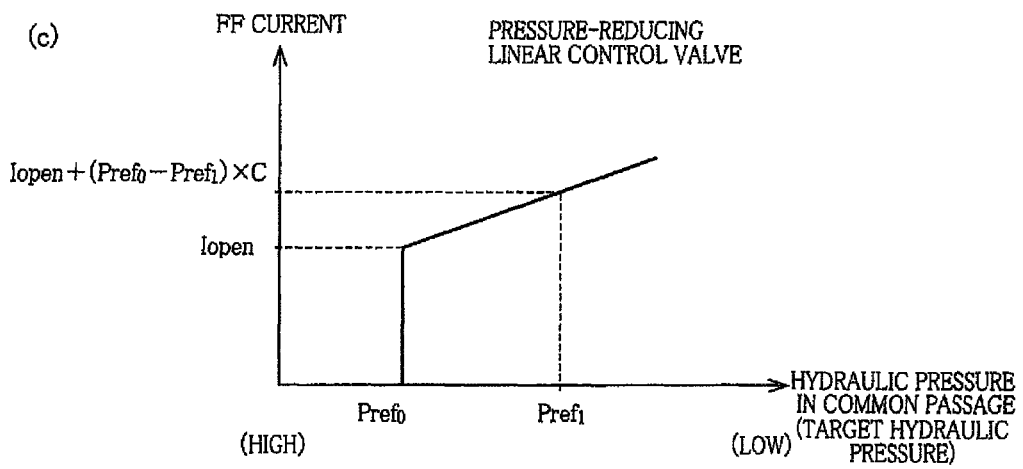
FIG.13

COMBINATIONS OF VALVE OPERATIONS/CONTROLS

| | DURING PRESSURE-INCREASING CONTROL | | DURING PRESSURE-REDUCING CONTROL | |
|---|---|---|---|---|
| | INDIVIDUAL CONTROL | COMBINATION CONTROL | INDIVIDUAL CONTROL | COMBINATION CONTROL |
| PRESSURE-INCREASING LINEAR CONTROL VALVE | CONTROL | CONTROL A ※ | ——— | CONTROL C (STANDBY) |
| PRESSURE-REDUCING LINEAR CONTROL VALVE | ——— | CONTROL C (STANDBY) | CONTROL | CONTROL A ※ |
| PRESSURE-INCREASING ON/OFF CONTROL VALVE | ——— | DUTY CONTROL OR PULSE CONTROL | ——— | ——— |
| PRESSURE-REDUCING ON/OFF CONTROL VALVE | ——— | ——— | ——— | DUTY CONTROL OR PULSE CONTROL |

※ WITH VARIATION IN REQUIRED FLOW RATE

FIG.21

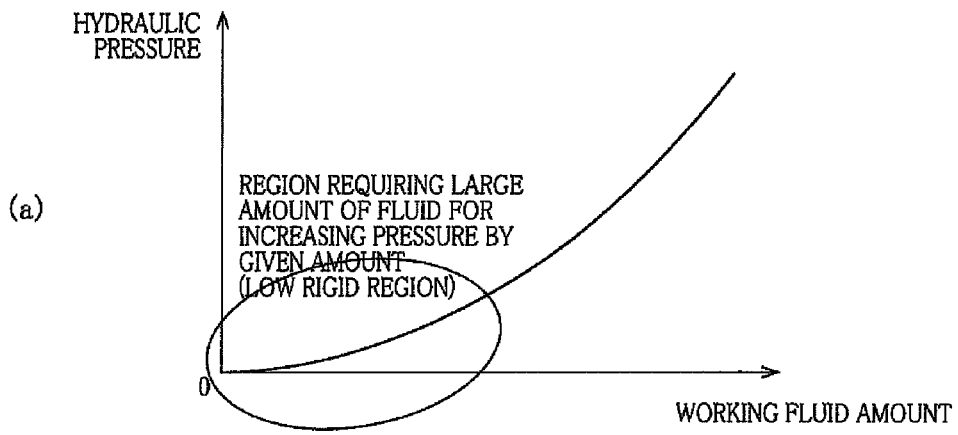
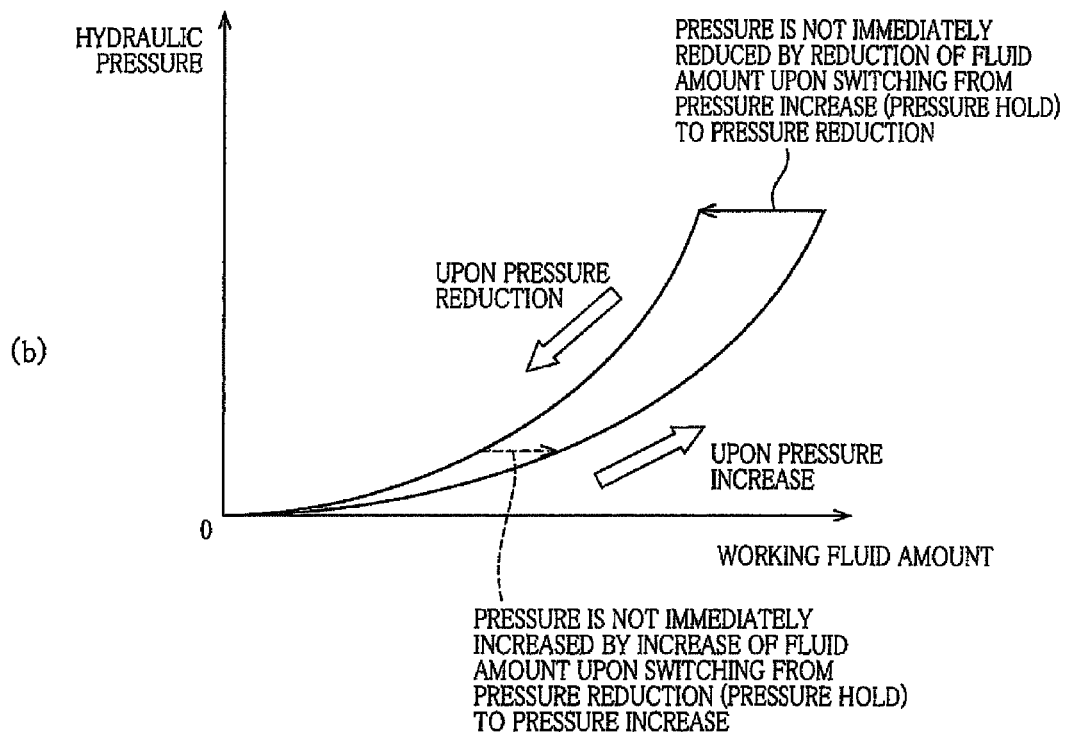
FIG.26

HYDRAULIC BRAKE SYSTEM

TECHNICAL FIELD

The present invention relates to a hydraulic brake system that is provided with a hydraulic brake for restraining rotation of a wheel.

BACKGROUND ART

Patent literature 1 discloses a hydraulic brake system including (a) a manually-operated hydraulic-pressure generating device, (b) a power-operated hydraulic-pressure generating device including a pump device and an accumulator, (c) a reservoir, (d) a common passage to which a plurality of brake cylinders are connected, (e) a pressure-increasing linear control valve provided between the common passage and the power-operated hydraulic-pressure generating device and a pressure-reducing linear control valve provided between the common passage and the reservoir, (f) an ON/OFF control valve provided between the common passage and the manually-operated hydraulic-pressure generating device, and (g) a hydraulic-pressure control device configured to control a hydraulic pressure in the common passage, by controlling the linear control valves and the ON/OFF control valves. In this hydraulic brake system, when a brake application is to be released, the pressure-reducing linear control valve is placed into its open state, before the ON/OFF control valve is switched from its closed state to its open state, so that the hydraulic pressure in each of the brake cylinders can be rapidly returned to the atmospheric pressure whereby a brake dragging can be satisfactorily prevented.

Patent literature 2 discloses a hydraulic brake system including (a) a manually-operated hydraulic-pressure generating device, (b) a power-operated hydraulic-pressure generating device, (c) a reservoir, (d) a common passage, (e) a pressure-increasing linear control valve provided between the common passage and the power-operated hydraulic-pressure generating device, (x) a plurality of individual pressure-holding valves each of which is provided between the common passage and a corresponding one of the brake cylinders, and (y) a plurality of individual pressure-reducing valves each of which is provided between the reservoir and a corresponding one of the brake cylinders, wherein at least one of the plurality of pressure-reducing valves is constituted by a linear control valve such that a hydraulic pressure in the common passage is controlled by controlling the at least one of the pressure-reducing valves constituted by the linear control valve. Since the hydraulic pressure in the common passage is controlled by utilizing the individual pressure-reducing valves, it is possible to reduce a required number of the electromagnetic valves.

Patent literature 3 discloses a hydraulic brake system including (a) a manually-operated hydraulic-pressure generating device, (b) a power-operated hydraulic-pressure generating device, (c) a reservoir, (d) a common passage, (p) a plurality of pressure-increasing individual linear control valves each of which is provided between the common passage and a corresponding one of the brake cylinders and each of which is disposed in parallel with the other of the pressure-increasing individual linear control valves, and (q) a plurality of pressure-reducing individual linear control valves each of which is provided between the reservoir and a corresponding one of the brake cylinders and each of which is disposed in parallel with the other of the pressure-reducing individual linear control valves. An electric current is supplied to at least one of the plurality of pressure-increasing individual linear control valves, by an amount that is determined based on a target hydraulic pressure and a flow rate of a corresponding at least one of the brake cylinders. Owing to the provision of the plurality of individual linear control valves, it is possible to increase a rate of flow of a working fluid into each of the brake cylinders and a rate of flow of the working fluid from each of the brake cylinders.

Patent literature 4 discloses a transmission in which a single linear valve is provided for a plurality of actuators. In this arrangement, a required number of the linear valves can be made smaller than an arrangement in which a linear valve is provided for each one of the actuators, so that the manufacturing cost can be reduced.

PRIOR ART LITERATURES

Patent Literatures

[Patent Literature 1] JP-2010-42743A
[Patent Literature 2] JP-2006-264675A
[Patent Literature 3] JP-2006-240339A
[Patent Literature 4] JP-2008-157425A

DISCLOSURE OF THE INVENTION

Object to be Achieved by the Invention

An object of the present invention is to improve a hydraulic brake system.

Measures for Achieving the Object and Effect

A hydraulic brake system according to the present invention includes a linear control valve and an ON/OFF control valve which are disposed in parallel with each other between at least one brake cylinder and a hydraulic-pressure generating device and/or a linear control valve and an ON/OFF control valve which are disposed in parallel with each other between the at least one brake cylinder and a reservoir.

In this arrangement with the linear control valve and the ON/OFF control valve disposed in parallel with each other between the at least one brake cylinder and the hydraulic-pressure generating device and/or the linear control valve and the ON/OFF control valve disposed in parallel with each other between the at least one brake cylinder and the reservoir, a rate of flow of a working fluid into each of the brake cylinders and/or a rate of flow of the working fluid from each of the brake cylinders can be made higher than in an arrangement with only a linear control valve disposed between the at least one brake cylinder and the hydraulic-pressure generating device and/or only a linear control valve disposed between the at least one brake cylinder and the reservoir.

Claimable Invention

There will be described various modes of the invention deemed to contain claimable features for which protection is sought. Hereinafter, the invention deemed to contain the claimable features will be referred to as "claimable invention" where appropriate. The claimable invention includes at least "the present invention" or "the invention of the present application" which is an invention described in claims, and could include also specific concept of the invention of the present application, generic concept of the invention of the present application and other concept of the invention of the present application. Each of these modes of the invention is numbered like the appended claims, for easier understanding of the technical features disclosed in the present specification. It is to be understood that the claimable invention is not limited to the technical features or any combinations thereof which will be described in each of these modes. That is, the scope of the claimable invention should be interpreted in the light of the following descriptions accompanying the various modes and preferred embodiments of the invention. In a limit in accordance with such an interpretation, a mode of the claimable invention can be constituted by not only each one of these modes but also either a mode provided by any one of these modes and additional components incorporated therein or a mode provided by any one of these modes without some of components recited therein.

(1) A hydraulic brake system including:
a hydraulic pressure source provided for a vehicle, and including a hydraulic-pressure generating device and a reservoir;
a plurality of hydraulic brakes provided for respective wheels of the vehicle, and configured to restrain rotations of the respective wheels; and
a control valve device including at least one hydraulic-pressure control valve group disposed between the hydraulic-pressure generating device and at least one of brake cylinders of the hydraulic brakes and/or between the reservoir and the at least one of the brake cylinders,
the hydraulic brake system being characterized in that:
each of the at least one hydraulic-pressure control valve group includes (a) at least one ON/OFF control valve and (b) at least one linear control valve that are disposed in parallel with each other,
each of the at least one ON/OFF control valve is opened and closed by an ON/OFF control that is applied to supply of an electric current to a solenoid of the each of the at least one ON/OFF control valve, and
each of the at least one linear control valve is capable of continuously controlling a pressure difference between a high-pressure side and a low-pressure side of the each of the at least one linear control valve, by a continuous control that is applied to supply of an electric current to a solenoid of the each of the at least one linear control valve.

The hydraulic-pressure generating device may be either a device including a manually-operated hydraulic-pressure generating device capable of generating a hydraulic pressure by operation of a brake operating member by an operator, or a device including a power-operated hydraulic-pressure generating device capable of generating a hydraulic pressure when being activated by supply of an electric power to the device, irrespective of operation of the brake operating member by the operator.

The control valve device may include either one or both of the hydraulic-pressure control valve group disposed between the hydraulic-pressure generating device and at least one of the brake cylinders and the hydraulic-pressure control valve group disposed between the reservoir and the at least one of the brake cylinders.

(2) The hydraulic brake system includes a common passage to which the brake cylinders of the hydraulic brakes are connected, wherein the at least one hydraulic-pressure control valve group may be disposed between the hydraulic-pressure generating device and the common passage and/or between the reservoir and the common passage.

In the hydraulic brake system described in this mode, the at least one hydraulic-pressure control valve group, each of which includes the ON/OFF control valve and the linear control valve disposed in parallel with each other, is disposed between the common passage and at least one of the hydraulic-pressure generating device and the reservoir, so that the plurality of brake cylinders connected to the common passage are commonly controlled. Therefore, as compared with an arrangement, as in the hydraulic brake system disclosed in Patent Literature 3, in which a plurality of linear control valves disposed in parallel with each other are provided for each one of the brake cylinders, it is possible to reduce a required number of the linear control valves and accordingly to restrain increase in cost.

(3) Each of the at least one ON/OFF control valve is an ON/OFF electromagnetic seat valve including a valve body, a valve seat, a spring and a solenoid having a coil and a plunger.

(4) Each of the at least one linear control valve is a linear electromagnetic seat valve including a valve body, a valve seat, a spring and a solenoid having a coil and a plunger.

Each of the ON/OFF control valve and the linear control valve may be either a spool valve or a seat valve. However, the seat valve is preferable since it provides a high degree of fluid tightness when being closed. For example, each of the ON/OFF control valve and the linear control valve may be either a normally close valve in which the valve body is seated on the valve seat by a biasing force of the spring while an electric current is not being supplied to the coil of the solenoid (hereinafter simply referred to as "the solenoid" in place of "the coil of the solenoid"), or a normally open valve in which the valve body is separated from the valve seat by a biasing force of the spring while an electric current is not being supplied to the solenoid.

In the linear control valve, an amount of the electric current supplied to the solenoid is continuously controlled. In the ON/OFF control valve, an ON/OFF control is applied to supply of the electric current supplied to the solenoid. There is a case where the ON/OFF control valve is subjected to a control (duty control, pulse control) by which the valve is alternately placed in its ON state and OFF state. Further, as described in detail in embodiments of the invention, there is a case where pulsation in the ON/OFF control valve or in an entirety of each of the at least one hydraulic-pressure control valve group can be suppressed by the duty control.

The linear control valve and the ON/OFF control valve are substantially the same in construction. However, the linear control valve and the ON/OFF control valve are usually different in a drive circuit for controlling the electric current supplied to the solenoid. In general, the drive circuit used for the ON/OFF control valve is lower in cost than the drive circuit used for the linear control valve. Further, the drive circuit used for the ON/OFF control valve may be a circuit capable of performing the duty ratio with a predetermined frequency, so that the cost can be further reduced. The predetermined frequency may be, for example, a frequency which enables the pulsation to be suppressed and which is determined depending on construction of each of the at least one hydraulic-pressure control valve group, or a frequency which is commonly employed for controlling the ON/OFF control valve.

(5) The hydraulic-pressure generating device includes a power-operated hydraulic-pressure generating device that is to be activated by supply of an electric power thereto so as to generate a hydraulic pressure, wherein the power-operated hydraulic-pressure generating device is connected to the common passage, and wherein the control valve device includes a pressure-increasing control valve group disposed between the power-operated hydraulic-pressure generating device and the common passage.

(6) At least one of the brake cylinders is connected to the common passage via at least one individual passage, wherein the hydraulic-pressure generating device includes a manually-operated hydraulic-pressure generating device that is configured to generate a hydraulic pressure by operation of a brake operating member by an operator, and wherein the manually-operated hydraulic-pressure generating device is connected to at least one of the at least one individual passage.

In the hydraulic brake system described in this mode, the power-operated hydraulic-pressure generating device is connected to the common passage while the manually-operated hydraulic-pressure generating device is not connected to the common passage. Thus, it is difficult to control the hydraulic pressure in the common passage, by using the hydraulic pressure of the manually-operated hydraulic-pressure generating device.

Meanwhile, where the manually-operated hydraulic-pressure generating device is connected to the common passage via the ON/OFF control valve, as in the brake systems disclosed in Patent Literatures 1, 2, a rate of flow of a working fluid supplied to the common passage can be increased by controlling the ON/OFF control valve, whereby a rate of flow of the working fluid supplied to each of the brake cylinders can be increased.

On the other hand, in the hydraulic brake system in which the manually-operated hydraulic-pressure generating device is not connected to the common passage, a rate of flow of the working fluid supplied to each of the brake cylinders can be increased by utilizing the hydraulic pressure of the power-operated hydraulic-pressure generating device even without utilizing the hydraulic pressure of the manually-operated hydraulic-pressure generating device, by employing an arrangement in which the linear control valve and the ON/OFF control valve are disposed in parallel with each other between the power-operated hydraulic-pressure generating device and the common passage.

Further, since the manually-operated hydraulic-pressure generating device is connected to the individual passage, the hydraulic pressure can be more reliably supplied to the brake cylinder in the event of system error.

Further, since the hydraulic pressure of the power-operated hydraulic-pressure generating device is more stable than the hydraulic pressure of the manually-operated hydraulic-pressure generating device, the hydraulic pressure in the common passage can be accurately controlled by utilizing the hydraulic pressure of the power-operated hydraulic-pressure generating device.

It is noted that the hydraulic-pressure generating device may include two manually-operated hydraulic-pressure generating devices that are connected to the respective individual passages to which the brake cylinder for the front left wheel and the brake cylinder for the front right wheel are connected, respectively.

Moreover, the present invention is applicable also to a hydraulic brake system in which the manually-operated hydraulic-pressure generating device is connected to the common passage.

(7) Each of the at least one hydraulic-pressure control valve group consists of the at least one ON/OFF control valve and a linear control valve as the at least one linear control valve.

Each of the at least one hydraulic-pressure control valve group, which is disposed between the hydraulic-pressure generating device and the common passage or between the reservoir and the common passage, includes the single linear control valve and the at least one ON/OFF control valve that are disposed in parallel with each other. Although the quantities of the linear control valve and the ON/OFF control valve do not necessarily have to be particular numbers, it is preferable, from a point of view restraining increase in cost, that each of the at least one hydraulic-pressure control valve group consists of a single linear control valve and a certain number of ON/OFF control valve required for compensating flow rate insufficiency.

It is noted that the flow rate insufficiency can be compensated by adjusting an area of opening of the ON/OFF control valve in place of increasing the number of the ON/OFF control valve.

Further, the flow rate insufficiency in the pressure-increasing control valve group can be compensated also by employing, as the power-operated hydraulic-pressure generating device, a device capable of outputting a high hydraulic pressure (namely, by increasing the capacity of the power-operated hydraulic-pressure generating device).

Further, the pressure-increasing control valve group disposed between the hydraulic-pressure generating device and the common passage and the pressure-reducing control valve group disposed between the reservoir and the common passage may be either the same or different in construction (such as quantities of the linear control valve and ON/OFF control valve).

(8) Each of the at least one hydraulic-pressure control valve group includes at least one flow restrictor disposed in series with (a) the at least one ON/OFF control valve and the at least one linear control valve that are disposed in parallel with each other and/or (b) the at least one linear control valve.

A rate of flow of the working fluid supplied to the common passage through the pressure-increasing control valve group is dependent on, for example, a pressure difference between the common passage (i.e., low-pressure side) and the hydraulic-pressure generating device (i.e., high-pressure side) and a flow passage area (i.e., opening area of each of the control valves). The flow rate is increased with increase of the pressure difference where the flow passage area is not changed, and is increased with increase of the flow passage area where the pressure difference is not changed.

Where the pressure difference is a certain value, the quantity of the linear control valve and the quantity of the ON/OFF control valve are determined by comparing (i) a maximum flow rate qref that could be required for controlling the hydraulic pressure in the common passage, with (ii) a total flow rate Q that is a sum of a maximum flow rate qa* allowable in the linear control valve (with the pressure difference being the certain value) and a maximum flow rate qb* realizable in the ON/OFF control valve (with the pressure difference being the certain valve), such that the total flow rate Q is not lower than the required maximum flow rate qref (Q≥qref).

The total flow rate Q is expressed by an expression given below, where "n" and "m" represent the quantity of the linear control valve and the quantity of the ON/OFF control valve, respectively.

$$Q = n \cdot qa^* + m \cdot qb^*$$

The maximum flow rate qref, which could be required for controlling the hydraulic pressure in the common passage, may be, for example, a value where an estimated maximum value of gradient of increase of a target hydraulic pressure is established while the pressure difference is the certain value. The maximum flow rate qa*, which is allowable in the linear control valve, is dependent on the opening area when the electric current is supplied to the linear control valve by a maximum suppliable amount (that is dependent on the solenoid and the drive circuit) while the pressure difference is the certain value, as described in detail in the embodiments, where the linear control valve is a normally closed valve. The maximum flow rate qb* realizable in the ON/OFF control valve is a value dependent on the opening area when the supply of the electric current to the solenoid is placed in the ON state or OFF state. It is noted that the maximum flow rate in each of the linear control valve and ON/OFF control valve is dependent on a cross sectional area of a portion in which a cross section is minimized within the control valve.

It is desirable that the at least one ON/OFF control valve is provided such that the total flow rate Q is equal to the maximum flow rate qref that could be required for controlling the hydraulic pressure in the common passage. However, where the total flow rate Q is larger than the required flow rate qref, a flow restrictor (which may be an orifice, for example) may be provided in series with at least one of the at least one ON/OFF control valve, so as to reduce the flow passage area.

Further, there is a case in which vibration (pulsation) occurring in the ON/OFF control valve can be suppressed by the provision of the flow restrictor.

(9) The brake system may include a hydraulic-pressure control device configured to control a hydraulic pressure in the at least one of the brake cylinders of the hydraulic brakes, by controlling the control valve device.

(10) The brake system may include a hydraulic-pressure control device configured to control a hydraulic pressure in the common passage, by controlling the control valve device.

Where at least one of the brake cylinders is connected to the common passage, the hydraulic pressure in the at least one of the brake cylinders which is connected to the common passage is controlled by controlling the hydraulic pressure in the common passage. Irrespective of whether or not at least one of the brake cylinders is connected to the common passage, the hydraulic pressure in at least one of the brake cylinders is controlled by controlling the control valve device provided for the at least one of the brake cylinders. (It is noted that there is a case in which the control valve device provided for the at least one of the brake cylinders is constituted by the control valve device provided for the common passage.) Therefore, in the following description relating to the hydraulic-pressure control device, the target hydraulic pressure and the actual hydraulic pressure in the common passage will be read as a target hydraulic pressure and an actual hydraulic pressure in the at least one of the brake cylinders, where appropriate.

(11) The hydraulic-pressure control device may include (i) a linear-control-valve individual controlling portion configured, when the least one ON/OFF control valve is being closed, to continuously control an amount of the electric current supplied to the solenoid of each of the at least one linear control valve, and/or (ii) an ON/OFF-control-valve combination controlling portion configured to continuously control the amount of the electric current supplied to the solenoid of each of the at least one linear control valve and to control ON/OFF of the supply of the electric current to the solenoid of each of the at least one ON/OFF control valve.

The at least one linear control valve and the at least one ON/OFF control valve are both controlled by the ON/OFF-control-valve combination controlling portion. Regarding the at least one ON/OFF control valve, an average rate of the flow of the working fluid can be controlled, with the supply of the electric current to the solenoid of each of the at least one ON/OFF control valve being alternately placed in the ON state and OFF state. The at least one ON/OFF control valve may be controlled through, for example, a duty control, a pulse control or a continuous ON control.

It is noted that the hydraulic-pressure control device may include (iii) an ON/OFF-control-valve individual controlling portion configured to control the hydraulic pressure in the common passage by controlling the at least one ON/OFF control valve (without controlling the linear control valve).

(12) The hydraulic-pressure control device may include a selecting portion configured to select one of the linear-control-valve individual controlling portion and the ON/OFF-control-valve combination controlling portion, based on at least one of a required response speed and a required accuracy that are required for controlling the hydraulic pressure in the common passage.

[Case of Selection Based on Required Response Speed]

The required response speed required for controlling the hydraulic pressure in the common passage, is dependent on a state of the vehicle. The vehicle state includes a state of running of the vehicle and a state of the device installed on the vehicle. The installed device state includes a state of operation of the brake operating member by the vehicle operator. Specifically, where a brake hydraulic pressure control is executed based on the vehicle state, there is a case in which the required response speed is determined depending, for example, on type of the hydraulic pressure control (e.g., purpose of the hydraulic pressure control), or a rate of change of a target hydraulic pressure in the common passage in execution of the hydraulic pressure control. The required response speed determined depending on the rate of change of the target hydraulic pressure, can be considered to be a response speed determined depending on the state of operation of the brake operating member by the vehicle operator.

For example, the selecting portion may be configured to select the ON/OFF-control-valve combination controlling portion when the required response speed is higher than a first threshold value, and to select the linear-control-valve individual controlling portion when the required response speed is not higher than the first threshold value. The first threshold value may be, for example, a value (fixed value) determined depending on the maximum flow rate that is allowable in the linear control valve or a value (variable value) determined depending on the maximum flow rate that is allowable, at the point of time of the determination, in the linear control valve. The maximum flow rate allowable at the point of time of the determination is dependent on, for example, a pressure difference between the high-pressure side and the low-pressure side.

Although the first threshold value may be a value determined depending on the maximum flow rate of the linear control valve, it is desirable that the first threshold value is a value smaller than the maximum flow rate. For example, where an ON/OFF-control-valve combination control is initiated when the required response speed becomes higher than the first threshold value that is set to the maximum flow rate, there is a case in which the required response speed cannot be realized due to, for example, an amount of the pressure difference at the point of time of the initiation of the ON/OFF-control-valve combination control. Further, there is a case in which the rate of change of the actual hydraulic pressure in the brake cylinder is not increased continuously with increase of the required response speed. On the other hand, where the first threshold value is set to the value smaller than the maximum flow rate of the linear control valve, it is possible to avoid a situation where the required response speed cannot be realized or a situation where the rate of change of the hydraulic pressure in the brake cylinder is not constant.

Further, the first threshold value may be determined depending on a kind of the required response speed (primary required response speed) that is determined depending on, for example, the purpose of the executed hydraulic pressure control, and one of the linear-control-valve individual controlling portion and the ON/OFF-control-valve combination controlling portion is selected depending on another kind of the required response speed (secondary required response speed) that is determined depending on the state of operation of the brake operating member by the vehicle operator. For example, the first threshold value may be set to a value smaller when the primary required response speed is high than when the primary required response speed is low. Then, the ON/OFF-control-valve combination controlling portion may be selected when the secondary required response speed is higher than the first threshold value, and the linear-control-valve individual controlling portion may be selected when the secondary required response speed is not higher than the first threshold value.

It is noted that the required response speed described in this mode may be considered to include at least one of a control-type-dependent required response speed and a particular required flow rate which are described in the embodiment.

[Case of Selection Based on Required Accuracy]

Regarding the accuracy required in the hydraulic pressure control, there are, for example, a case in which the accuracy is determined depending on the type (purpose) of the executed brake hydraulic pressure control and a case in which the accuracy is determined depending on the state of operation of the brake operating member by the vehicle operator. For example, it can be considered that the required accuracy is low when an emergency assist control is executed, and that the required accuracy is high when a normal operation control (i.e., a control executed during a non-emergency operation) is executed. Further, it can be considered that the required accuracy is low at an initial stage of the operation of the brake operating member by the vehicle operator or at a stage when a speed of the operation is not lower than a given speed, and that the required accuracy is high when an operating stroke distance of the operating member or an operating force applied to the operating member is kept substantially constant. The required accuracy can be changed either in steps or gradually. For example, the required accuracy can be reduced gradually with increase of the speed of the operation of the brake operating member.

In a linear-control-valve individual control, the hydraulic pressure control can be executed with a higher accuracy than in the ON/OFF-control-valve combination control. In view of this, the selecting portion may be configured such that the linear-control-valve individual control is easily executed when the required accuracy is high and such that the ON/OFF-control-valve combination control is easily executed when the required accuracy is low.

It is noted that the required accuracy described in this mode may be considered to include at least one of a control-type-dependent required accuracy and an particular required accuracy that are described in the embodiments.

The emergency assist control may include at least one of an emergency-operation assist control and a collision avoidance control that is to be executed based on a relative positional relationship between the vehicle and a preceding vehicle.

[Case of Selection Based on Required Response Speed & Required Accuracy]

For example, the ON/OFF-control-valve combination control may be executed when the required response speed is higher than a second threshold value that is determined depending on (a level of) the required accuracy, and the linear-control-valve individual control may be executed when the required response speed is not higher than the second threshold value.

The second threshold value may be a value which is determined depending on the maximum flow rate and the level of the required accuracy and which is larger when the required accuracy is high than when the required accuracy is low. When the level of the required accuracy is low, it is considered not inconvenient that the accuracy is reduced by execution of the ON/OFF-control-valve combination control in case of the required response speed being high. On the other hand, when the level of the required accuracy is high, it is desirable that the linear-control-valve individual control is executed as far as it is possible.

The second threshold value is determined depending on at least the required accuracy, and may be determined depending on not only the required accuracy but also other factors such as the hydraulic pressure and the target hydraulic pressure in the common passage.

(13) The hydraulic-pressure control device may include a required-flow-rate-based selecting portion configured to select the ON/OFF-control-valve combination controlling portion when a required flow rate required for controlling the hydraulic pressure in the common passage is higher than a third threshold value, and to select the linear-control-valve individual controlling portion when the required flow rate is not higher than the third threshold value.

The required flow rate in the common passage can be determined depending on a change amount of the target hydraulic pressure in the common passage and a characteristic of change of the hydraulic pressure in the brake cylinder. The target hydraulic pressure in the common passage corresponds to, in principle, the target hydraulic pressure that is common to the plurality of brake cylinders. The required flow rate is, in principle, higher when the change amount of the target hydraulic pressure is large than when the change amount of the target hydraulic pressure is small. Further, the target hydraulic pressure can be obtained based on the state of operation of the brake operating member by the vehicle operator and/or the running state of the vehicle.

The third threshold value may be equal to the above-described first or second threshold value.

(14) The hydraulic-pressure control device may include a tolerable-vibration-level-based selecting portion configured to select one of the linear-control-valve individual controlling portion and the ON/OFF-control-valve combination controlling portion, depending on a vibration suppression level that is required when the hydraulic pressure in the common passage is controlled.

The required vibration-suppression level is dependent on a tolerable vibration level. For example, the required vibration-suppression level is lower when the emergency assist control is being executed than when a normal-operation hydraulic pressure control is being executed. In other words, the tolerable vibration level is higher when the emergency assist control is being executed than when a normal-operation hydraulic pressure control is being executed. In view of this, the tolerable-vibration-level-based selecting portion may be configured such that the ON/OFF-control-valve combination control is easily executed when the emergency assist control is being executed.

Since the vibration occurring in the linear control valve is smaller than the vibration occurring in the ON/OFF control valve, the vibration during execution of the control by the linear-control-valve individual controlling portion is smaller than the vibration during execution of the control by the ON/OFF-control-valve combination controlling portion. However, the ON/OFF-control-valve combination controlling portion can be adapted to control the linear control valve and the ON/OFF control valve such that the vibration generated in control of the linear control valve and the vibration generated in control of the ON/OFF control valve can be cancelled by each other.

Thus, one of the linear-control-valve individual controlling portion and the ON/OFF-control-valve combination controlling portion may be selected depending on the vibration suppression level, by taking account of facts as described above.

(15) The hydraulic-pressure control device may include (a) a threshold-value-based selecting portion that is configured to select the ON/OFF-control-valve combination controlling portion when the required flow rate required for controlling the hydraulic pressure in the common passage is higher than a fourth threshold value, and to select the linear-control-valve individual controlling portion when the required flow rate required for controlling the hydraulic pressure in the common passage is not higher than the fourth threshold value, and (b) a fourth-threshold-value determining portion that is configured to determine the fourth threshold value, based on (i) an actual value of the hydraulic pressure in the common passage, (ii) a target value of the hydraulic pressure in the common passage, (iii) at least one of requirements dependent on type of a control executed for controlling the hydraulic pressure, and/or (iv) a maximum flow rate allowable in the at least one linear control valve.

Regarding (i), (ii) and (iv)

The maximum flow rate of the working fluid, which is allowed in the linear control valve, is dependent on, for example, the hydraulic pressure and the target hydraulic pressure in the common passage.

Where the linear control valve constitutes a pressure-increasing linear control valve that is disposed between the hydraulic-pressure generating device and the common passage, the maximum flow rate allowable in the pressure-increasing linear control valve is higher when the hydraulic pressure in the common passage is low than when the hydraulic pressure in the common passage is high. This is because the pressure difference between the high-pressure side and the low-pressure side of the linear control valve is large when the hydraulic pressure in the common passage is low. In view of this, it is preferable to determine the fourth threshold value such that the determined fourth threshold value is larger when the actual or target hydraulic pressure in the common passage is low than when the actual or target hydraulic pressure in the common passage is high.

Where the linear control valve constitutes a pressure-reducing linear control valve that is disposed between the common passage and the reservoir, the maximum flow rate is higher when the hydraulic pressure in the common passage is high than when the hydraulic pressure in the common passage is low. In view of this, it is preferable to determine the fourth threshold value such that the determined fourth threshold value is larger when the actual or target hydraulic pressure in the common passage is high than when the actual or target hydraulic pressure in the common passage is low.

Regarding (iii)

The requirements dependent on type of the hydraulic pressure control include the required accuracy, required response speed and (level of) required vibration suppression. For example, in the emergency assist control, it is considered that the required accuracy is low, the required response speed is high and the required vibration-suppression level is low. On the other hand, in the normal operation control (i.e., control in which neither the emergency operation nor the slip control is executed), it is considered that the required accuracy is high, the required response speed is intermediate and the required vibration-suppression level is high. In the slip control, it is considered that the required accuracy is low, the required response speed is high and the required vibration-suppression level is low, in view of that the slip control is a control that is to be executed for rapidly improving the critical state. Further, in the slip control, it is also considered that the required vibration-suppression level is high, because there is a case in which the slip control is initiated irrespective of intention of the vehicle operator.

It is desirable that the fourth threshold value is set to a large value when the required accuracy is high, and is set to a small value when the required accuracy is low.

It is desirable that the fourth threshold value is set to a small value when the required response speed is high, and is set to a large value when the required response speed is low.

It is desirable that the fourth threshold value is set to a large value when the required vibration-suppression level is high, and is set to a small value when the required vibration-suppression level is low.

It is noted that each of the requirements (required accuracy, required response speed, required vibration-suppression level) which are dependent on type of the control, may be referred to as "type-dependent requirement", "control-purpose-dependent requirement", for example.

(16) The hydraulic-pressure control device may include (a) a region-based selecting portion configured to select the linear-control-valve individual controlling portion when the required flow rate and the required accuracy, which are required for controlling the hydraulic pressure in the common passage, are in a linear-control-valve individual control region, and configured to select the ON/OFF-control-valve combination controlling portion when the required flow rate and the required accuracy, which are required for controlling the hydraulic pressure in the common passage, are in an ON/OFF-control-valve combination control region, and (b) a boundary-line determining portion configured to determine a boundary line between the linear-control-valve individual control region and the ON/OFF-control-valve combination control region such that the boundary line is determined based on at least one of (i) an actual value of the hydraulic pressure in the common passage, (ii) a target value of the hydraulic pressure in the common passage, (iii) a requirement dependent on a type of a control executed for controlling the hydraulic pressure, and (iv) a maximum flow rate allowable in each of the at least one linear control valve.

There is a case in which the required accuracy (particular required accuracy) required in the hydraulic pressure control is the same as the required accuracy (type-dependent required accuracy) and also a case in which the particular required accuracy is different from the type-dependent required accuracy. For example, in the normal operation control, it can be regarded that the type-dependent required accuracy is high. On the other hand, at an initial stage of a braking operation or at a stage when the speed of operation of the brake operating member by the vehicle operator is high, it can be regarded that the required accuracy is low. When a state of the operation of the brake operating member by the vehicle operator is held unchanged (i.e., when a change of the speed of the operation of the brake operating member or a change of an operating force applied to the brake operating member is small), it can be regarded that the required accuracy is high. Thus, it can be considered that the particular required accuracy is dependent on the state of the operation of the brake operating member by the vehicle operator.

Further, it can be regarded that the type-dependent required accuracy is intermediate in the slip control. On the other hand, it can be considered that the required accuracy is high when the hydraulic pressure is to be increased and that the required accuracy is low when the hydraulic pressure is to be reduced or held unchanged. In the pressure-reducing control and pressure-holding control, the hydraulic pressure in the brake cylinder is controlled to a value independent on the hydraulic pressure in the common passage. In the pressure-increasing control, it is desirable that the hydraulic pressure in the common passage is controlled to a desired value, since the hydraulic pressure is supplied from the common passage to the brake cylinder in the pressure-increasing control. Thus, it is possible to determine the particular required accuracy such that the determined particular required accuracy varies depending on whether the hydraulic pressure is being increased, reduced or held unchanged.

(17) The ON/OFF-control-valve combination controlling portion may include at least one of (i) a duty controlling portion configured to periodically switch supply of the electric current to the solenoid of each of the at least one ON/OFF control valve, between an ON state and an OFF state, (ii) a pulse controlling portion configured to switch the supply of the electric current, in a pulse-like manner, between the ON state and the OFF state, and (iii) a continuous ON controlling portion configured to continuously hold the ON state of the supply of the electric current.

The duty controlling portion is configured to control an average rate of flow of the hydraulic pressure through the common passage within one sample time, by periodically repeating the ON state and the OFF state with the one sample time. Where the ON/OFF control valve is a normally closed valve, the average rate of flow of the hydraulic pressure through the common passage within one sample time can be made higher when a duty ratio, i.e., a ratio of ON time to (ON time+OFF time) is high than when the duty ratio is low.

It is noted that there is a case in which the vibration of the hydraulic pressure control valve group can be suppressed by executing the duty control for the ON/OFF control valve. That is, although pulsation could occur as a result of execution of PWM (Pulse Width Modulation) by which an electric current supplied to the linear control valve is controlled, such pulsation could be suppressed by executing the duty control for the ON/OFF control valve.

The pulse controlling portion is configured to switch the electric current supply between the ON state and the OFF state at a time interval that is longer than the one sample time, so that there is a case in which the ON state or OFF state is held for two sample times. In the pulse control, there is no case, in principle, in which the pulse controlling portion switches the electric current supply between the ON state and the OFF state during one sample time. In the pulse control, it can be considered that the average flow rate during a plurality of sample times including one sample time in which the ON state is held, is controlled, or that the flow rate in the ON/OFF control valve is maximized during one sample time in which the ON state is held.

When the supply of the electric current to the ON/OFF control valve is placed in a continuous ON state, it is possible to establish a high flow rate.

(18) The linear-control-valve individual controlling portion may include an individual feed-back controlling portion configured to execute a feed-back control for supply of the electric current to the solenoid of each of the at least one linear control valve, wherein the ON/OFF-control-valve combination controlling portion may include a combination feed-back controlling portion configured to execute a feed-back control for supply of the electric current to the solenoid of each of the at least one linear control valve, by using a gain that is different from a gain used in the individual feed-back controlling portion.

The combination control gain (i.e., gain used in the ON/OFF-control-valve combination control) is set to a value different from a value of the individual control gain (i.e., gain used in the individual feed-back controlling portion). The value of the combination control gain may be either larger or smaller than the value of the individual control gain.

Since the hydraulic pressure in the common passage is changed by controlling the ON/OFF control valve in the ON/OFF-control-valve combination control, it is desirable that, for example, the combination control gain is smaller than the individual control gain. This is because the feed-back control for the linear control valve could be disturbed by the control of the ON/OFF control valve. By setting the combination control gain to a smaller value, it is possible to improve the control accuracy and also to suppress the vibration.

It is noted that the linear-control-valve individual controlling portion may include also an individual feed-forward controlling portion configured to execute a feed-forward control for supply of an electric current to the solenoid of the solenoid of the linear control valve. Similarly, the ON/OFF-control-valve combination controlling portion may include a combination feed-forward controlling portion.

Further, the combination control gain may be set a value larger than the value of the individual control gain.

(19) The ON/OFF-control-valve combination controlling portion may include at least one of (a) a combination feed-forward controlling portion configured to supply, to the solenoid of each of the at least one linear control valve, the electric current that includes a valve-opening electric current dependent on an actual pressure difference between the high-pressure side and the low-pressure side and an electric current dependent on an amount of change of a target value of the hydraulic pressure in the common passage and (b) a target-hydraulic-pressure-based pressure-difference controlling portion configured to supply, to the solenoid of each of the at least one linear control valve, a valve-opening electric current dependent on a pressure difference between a target value of the hydraulic pressure in the common passage and an actual value of the hydraulic pressure on a side of the each of the at least one linear control valve which is remote from the common passage.

The hydraulic pressure in the common passage can be rapidly caused to become close to the target hydraulic pressure, by execution of the target-hydraulic-pressure-based pressure-difference control and/or execution of the combination feed-forward control.

(20) The ON/OFF-control-valve combination controlling portion may include (a) a target-hydraulic-pressure-change-based controlling portion configured to supply, to the solenoid of each of the at least one linear control valve, an electric current dependent on an amount of change of a target value of the hydraulic pressure in the common passage and (b) a target-hydraulic-pressure-based pressure-difference controlling portion configured to supply, to the solenoid of each of the at least one linear control valve, a valve-opening electric current dependent on a pressure difference between a target value of the hydraulic pressure in the common passage and an actual value of the hydraulic pressure on a side of the each of the at least one linear control valve which is remote from the common passage.

The hydraulic pressure in the common passage can be rapidly caused to become close to the target hydraulic pressure, by supplying an electric current corresponding to a sum of the electric current determined by the target-hydraulic-pressure-change-based controlling portion and the electric current determined by the target-hydraulic-pressure-based pressure-difference controlling portion.

(21) The ON/OFF-control-valve combination controlling portion may include a response-speed-based selecting portion configured to select the combination feed-back controlling portion when a required response speed, which is required for controlling the hydraulic pressure in the common passage in case of selection of the ON/OFF-control-valve combination controlling portion, is lower than a predetermined speed, the response-speed-based selecting portion being configured to select at least one of the target-hydraulic-pressure-based pressure-difference controlling portion and the combination feed-forward controlling portion when the required response speed is not lower than the predetermined speed.

The supply of the electric current to the linear control valve is controlled such that the actual hydraulic pressure in the common passage is more rapidly caused to become close to the target hydraulic pressure when the required response speed, upon initiation of the ON/OFF-control-valve combination control, is high than when being low.

(22) Each of the at least one linear control valve may be configured to allow flow of a working fluid at a higher rate when an amount of the electric current supplied to the solenoid is large than when the amount of the electric current is small, wherein the ON/OFF-control-valve combination controlling portion may include a combination-linear-control-valve-flow-rate controlling portion configured to control a rate of flow of the working fluid allowed by each of the at least one linear control valve, by controlling an amount of the electric current supplied to the solenoid.

As long as the pressure difference between the high-pressure side and the low-pressure side of the linear control valve is held unchanged, an opening degree of the linear control valve is larger and the allowed rate of flow of the working fluid is larger when the amount of the electric current supplied to the solenoid is large than when being small.

The control by the combination-linear-control-valve-flow-rate controlling portion may be executed also by the linear-control-valve individual controlling portion.

(23) The ON/OFF-control-valve combination controlling portion may include (a) an ON/OFF-control-valve-flow-rate controlling portion configured to control an average rate of a working fluid flowing through each of the at least one ON/OFF control valve, by causing the electric current, which is supplied to the each of the at least one ON/OFF control valve, to be alternately turned on and off, and (b) a ratio determining portion configured to determine, based on a level of accuracy required for controlling the hydraulic pressure in the common passage, a ratio between the average rate of the working fluid allowed in the each of the at least one ON/OFF control valve and a rate of the working fluid allowed in each of the at least one linear control valve.

(24) The ON/OFF-control-valve combination controlling portion may include (i) an ON/OFF-control-valve priority controlling portion configured to control supply of the electric current to the solenoid of each of the at least one ON/OFF control valve, with a higher priority being given to the supply of the electric current to the solenoid of the each of the at least one ON/OFF control valve, (ii) a linear-control-valve priority controlling portion configured to control the supply of the electric current to the solenoid of each of the at least one linear control valve, with a higher priority being given to the supply of the electric current to the solenoid of each of the at least one linear control valve, and (iii) a priority-control selecting portion configured to select the linear-control-valve priority controlling portion when a level of accuracy required for controlling the hydraulic pressure in the common passage is higher than a given level, and to select the ON/OFF-control-valve priority controlling portion when the level of the required accuracy is not higher than the given level.

The ON/OFF-control-valve priority controlling portion is configured to control the ON/OFF control valve and the linear control valve such that the required rate of flow of the working fluid is realized mainly in the ON/OFF control valve and such that a deficiency of the required rate of flow of the working fluid is compensated in the linear control valve. In the ON/OFF control valve, it is possible to realize a maximum rate of flow controllable within a range smaller than the required rate.

The linear-control-valve priority controlling portion is configured to control the linear control valve within an accurate range in which the flow rate is accurately controllable, wherein the accurate range is dependent on characteristics of the linear control valve. Thus, the flow rate realized in the linear control valve is dependent on the accurate range. Then, the ON/OFF control valve is controlled such that a deficiency of the required rate of flow is compensated in the ON/OFF control valve. In the linear control valve, it is also possible to realize a maximum rate of flow controllable within a range smaller than the required rate.

Further, it is possible to select the linear-control-valve priority controlling portion when the required accuracy is higher than the given level, and to select the ON/OFF-control-valve priority controlling portion when the required accuracy is not higher than the given level.

It is common that the ratio between the rate of the flow established in the linear control valve and the rate of the flow established in the ON/OFF control valve varies depending on whether the control is executed by the linear-control-valve priority controlling portion or the ON/OFF-control-valve priority controlling portion. In this sense, it can be considered that the ratio determining portion corresponds to the priority-control selecting portion.

(25) The control valve device may include at least one of a pressure-increasing control valve group disposed between the common passage and the hydraulic-pressure generating device and a pressure-reducing control valve group disposed between the common passage and the reservoir.

Where the control valve device includes both of the pressure-increasing control valve group and the pressure-reducing control valve group, it is possible to increase the flow rate when the hydraulic pressure in the common passage is to be either increased or reduced.

(26) The ON/OFF-control-valve combination controlling portion may include a standby electric-current supplying portion configured, while one of the pressure-increasing control valve group and the pressure-reducing control valve group is being controlled by the ON/OFF-control-valve combination controlling portion, to supply the electric current to the solenoid of each of the at least one linear control valve of the other of the pressure-increasing control valve group and the pressure-reducing control valve group, by a standby amount that causes the each of the at least one linear control valve to be switched from a closed state to an opening state when the hydraulic pressure in the common passage reaches a standby hydraulic pressure that is a threshold value dependent on a target value of the hydraulic pressure.

When the control is being executed by the ON/OFF-control-valve combination controlling portion, the flow rate is increased whereby the rate of change of the hydraulic pressure is increased. Therefore, the hydraulic pressure in the common passage could be overshot thereby causing a control hunting. Further, there is also a case in which it is difficult to hold the actual hydraulic pressure in the neighborhood of the target hydraulic pressure.

In view of this, during the pressure-increasing control, the linear control valve of the pressure-reducing control valve group may be switched from the closed state to the open state when the hydraulic pressure in the common passage reaches the standby hydraulic pressure that is determined depending on the target hydraulic pressure (i.e., a value larger than the target hydraulic pressure), thereby making it possible to avoid an excessive increase of the hydraulic pressure in the common passage and to restrain the control hunting. The linear control valve of the pressure-reducing control valve group is disposed between the common passage and the reservoir. It can be regarded that the hydraulic pressure in the reservoir is kept substantially constant. Therefore, when the hydraulic pressure in the common passage is equal to the standby hydraulic pressure, the pressure difference is a value corresponding to the standby hydraulic pressure, so that a valve-opening electric current corresponding to the pressure difference can be obtained based on, for example, an operational characteristic table (e.g., a table representing a relationship between the pressure difference and the valve-opening electric current) that is prestored in a storage portion.

Similarly, during the pressure-reducing control, the electric current is supplied, by a standby amount, to the solenoid of the pressure-increasing linear control valve. The standby hydraulic pressure is set to a value smaller than the target hydraulic pressure. The hydraulic pressure on the high-pressure side of the pressure-increasing linear control valve corresponds to the hydraulic pressure in the hydraulic-pressure generating device. The standby electric current amount is set to the valve-opening electric current corresponding to the pressure difference that is established when the hydraulic pressure on the low-pressure side becomes equal to the standby hydraulic pressure.

An absolute value of the difference between the standby hydraulic pressure and the target hydraulic pressure may be either a fixed value or a variable value. The absolute value of the difference may be referred to as an allowable fluctuation value.

(27) The standby electric-current supplying portion may include a standby-control threshold-value determining portion configured to determine an absolute value of a difference between the standby hydraulic pressure and a target value of the hydraulic pressure, based on at least one of a required accuracy, a required response speed and a required vibration suppression level which are required when the hydraulic pressure in the common passage is controlled.

Where the standby hydraulic pressure is set to a value close to the target hydraulic pressure, (where the allowable fluctuation value is set to a small value) the hydraulic pressure in the common passage can be accurately caused to become close to the target hydraulic pressure. However, where the allowable fluctuation value is set to a small value, a frequency of opening and closing of the linear control valve is increased, thereby causing problems such as generation of vibration or operational noise.

Where the standby hydraulic pressure is set to a value far from the target hydraulic pressure, (where the allowable fluctuation value is set to a large value) the responsiveness can be improved, for example, since the linear control valve subjected to the standby electric-current control becomes harder to be opened. Where the allowable fluctuation value is increased, it is possible to reduce the frequency of generation of the operational noise in the linear control valve and accordingly to suppress the vibration.

Therefore, the allowable fluctuation value can be determined by taking account of the above-described facts. For example, the allowable fluctuation value may be set to a small value when the required accuracy is high and the required vibration-suppression level is low, and is set to a large value when the required response speed is high.

Further, when the required accuracy is high, the allowable fluctuation value can be set to a small value, irrespective of the required vibration-suppression level.

It is noted that the allowable fluctuation value may be determined depending on a dead zone width that is used upon determination as to which one of the pressure-increasing mode, pressure-reducing mode and pressure-holding mode is to established. For example, the allowable fluctuation value may be substantially equal to or smaller than the dead zone width.

(28) The hydraulic-pressure control device may include a delay-recovering ON/OFF-control-valve-combination-control executing portion configured, when a delay in controlling the hydraulic pressure in the common passage by the linear-control-valve individual controlling portion is larger than a predetermined delay, to forcedly cause the ON/OFF-control-valve combination controlling portion to control the hydraulic pressure in the common passage.

The control delay can be obtained, for example, based on at least one of a delay time and a deviation. It can be regarded that the control delay is large when the delay time is long and/or when an absolute value of the deviation is large.

(29) The delay-recovering ON/OFF-control-valve-combination-control executing portion may include a delay-time-based implementing portion configured, when a time of the delay in controlling the hydraulic pressure in the common passage by the linear-control-valve individual controlling portion exceeds a predetermined length of time, to forcedly cause the ON/OFF-control-valve combination controlling portion to control the hydraulic pressure in the common passage.

The control can be executed by the ON/OFF-control-valve combination controlling portion, for example, when a deviation of the actual hydraulic pressure from the target hydraulic pressure is not smaller than a predetermined value and the deviation not smaller than the predetermined value is kept for a time larger than the predetermined length of time.

Further, the control can be executed by the ON/OFF-control-valve combination controlling portion, for example, also when a time from a point at which the target hydraulic pressure is changed to become a certain value Px, to a point at which the actual hydraulic pressure reaches the target hydraulic pressure Px, exceeds the predetermined length of time.

(30) The ON/OFF-control-valve combination controlling portion may include a delay-recovering pulse controlling portion configured to execute a pulse control for the electric current supplied to the solenoid of each of the at least one ON/OFF control valve, in response to a command from the delay-recovering ON/OFF-control-valve-combination-control executing portion.

The pulse control is a control appropriate to be executed for restraining the delay by causing the working fluid to flow via the ON/OFF control valve.

In the delay-recovering pulse control, the pulse control may be executed, in a response to the command, in accordance with either a predetermined pattern or a pattern that is determined each time the pulse control is executed.

It is noted that the duty control may be executed in a response to the command from the delay-recovering ON/OFF-control-valve-combination-control executing portion.

(31) The delay-recovering pulse controlling portion may include a pattern-based controlling portion configured to control the electric current supplied to the solenoid of each of the at least one ON/OFF control valve, in accordance with a pattern dependent on a degree of the delay in controlling the hydraulic pressure in the common passage.

It is possible to employ a pattern in which, for example, the open time is longer when the control delay is large than when the control delay is small.

(32) The hydraulic-pressure control device may include an activation-initiation ON/OFF-control-valve-combinationcontrol selecting portion configured to select the ON/OFF-control-valve combination controlling portion in a period from a point of time when activation of each of the plurality of hydraulic brakes is initiated until a point of time when a first given condition is satisfied.

(33) The hydraulic-pressure control device may include an activation-initiation ON/OFF-control-valve-combination-control selecting portion configured to select the ON/OFF-control-valve combination controlling portion in a period from a point of time when activation of each of the plurality of hydraulic brakes is initiated until a point of time when a first given time elapses.

(34) The hydraulic-pressure control device may include an activation-initiation ON/OFF-control-valve-combination-control selecting portion configured to select the ON/OFF-control-valve combination controlling portion, in a period from a point of time when activation of each of the plurality of hydraulic brakes is initiated until a point of time when an absolute value of a difference between a target value of the hydraulic pressure in the common passage and an actual value of the hydraulic pressure in the common passage becomes smaller than a given value.

Due to a hydraulic-pressure change characteristic of the brake cylinder, at an initial stage of activation of the hydraulic brake, an amount of the working fluid required for increasing the hydraulic pressure by a certain pressure is large whereby an activation delay easily takes place. On the other hand, in the hydraulic brake system described in mode (32), the ON/OFF-control-valve combination control is executed in the period from initiation of activation of the hydraulic brake until satisfaction of the first given condition, so that the activation delay can be restrained.

The first given condition may include, for example, (a) a condition that "the first given time has elapsed from initiation of the activation of the hydraulic brake", (b) a condition that "a value, which is obtained by subtracting the actual hydraulic pressure in the common passage from the target hydraulic pressure in the common passage, has become not larger than a given value", and/or (c) a condition that "the actual hydraulic pressure in the common passage has become higher than a given amount (that may be set to a value outside a range in which a consumed amount of the working fluid is large)". The first given condition may be determined based on the hydraulic-pressure change characteristic of the brake cylinder, and may be determined in view of the region in which the consumed amount of the working fluid is large.

The ON/OFF control valve is controlled based on the hydraulic-pressure change characteristic of the brake cylinder, such that the activation delay of the hydraulic brake can be restrained. For example, the ON/OFF control valve may be controlled through, for example, a continuous ON control, a duty control or a pulse control. A continuous ON time, a duty ratio, a pulse width and the like are determined based on the hydraulic-pressure change characteristic of the brake cylinder.

(35) The hydraulic-pressures control device may include a control-content-change ON/OFF-control-valve-combination-control selecting portion configured to select the ON/OFF-control-valve combination controlling portion, in a period from a point of time when a content of control of the hydraulic pressure in the common passage is changed in accordance with a predetermined pattern until a point of time when a second given condition is satisfied.

(36) The hydraulic-pressure control device may include a control-content-change ON/OFF-control-valve-combination-control selecting portion configured to select the ON/OFF-control-valve combination controlling portion, in a period from a point of time when a content of control of the hydraulic pressure in the common passage is changed in accordance with a predetermined pattern until a point of time when a second given time elapses.

(37) The hydraulic-pressure control device may include a control-content-change ON/OFF-control-valve-combination-control selecting portion configured to select the ON/OFF-control-valve combination controlling portion, in a period from a point of time when a content of control of the hydraulic pressure in the common passage is changed in accordance with a predetermined pattern until a point of time when an absolute value of a difference between a target value of the hydraulic pressure in the common passage and an actual value of the hydraulic pressure in the common passage becomes smaller than a given value.

There is a hysteresis in change of the hydraulic pressure in the brake cylinder. Therefore, when the control for increasing (or holding) the hydraulic pressure in the brake cylinder is changed to the control for reducing the hydraulic pressure in the brake cylinder, and/or when the control for reducing (or holding) the hydraulic pressure in the brake cylinder is changed to the control for increasing the hydraulic pressure in the brake cylinder, the hydraulic pressure is not changed immediately so that a delay takes place.

On the other hand, in the hydraulic brake system described in mode (35), the ON/OFF-control-valve combination control is executed in the period from change of the content of the control until satisfaction of the second given condition. Consequently, it is possible to increase the rate of inflow of the working fluid and/or the rate of outflow of the working fluid, and accordingly to restrain the control delay.

The content of control of the hydraulic pressure means a direction of control of the hydraulic pressure, namely, means increasing, reducing or holding the hydraulic pressure, for example. When the hydraulic pressure is to be increased, a pressure-increasing mode is established. When the hydraulic pressure is to be reduced, a pressure-reducing mode is established. When the hydraulic pressure is to be held unchanged, a pressure-holding mode is established. Thus, the control content can be represented by a kind of the mode.

The second given condition may include, for example, (a) a condition that "the second given time has elapsed from change of the control content in accordance with the predetermined pattern", (b) a condition that "a value, which is obtained by subtracting the actual hydraulic pressure in the common passage from the target hydraulic pressure in the common passage, has become not larger than a given value", and/or (c) a condition that "the actual hydraulic pressure in the common passage has been changed by an amount not smaller than a given amount".

The ON/OFF control valve may be controlled based on the hysteresis characteristic of the brake cylinder, such that the control delay can be restrained. A duty ratio, a pulse width and the like are determined based on the hysteresis characteristic.

(38) The at least one hydraulic-pressure control valve group may include a plurality of hydraulic-pressure control valve groups disposed between the respective brake cylinders of the hydraulic brakes and the hydraulic-pressure generating device and/or a plurality of hydraulic-pressure control valve groups disposed between the respective brake cylinders of the hydraulic brakes and the reservoir.

In the hydraulic brake system described in this mode, the at least one hydraulic pressure control valve group includes the hydraulic pressure control valve groups each of which is disposed between a corresponding one of the brake cylinders and the hydraulic-pressure generating device and/or the hydraulic pressure control valve groups each of which is disposed between a corresponding one the brake cylinders and the reservoir. Where the hydraulic-pressure generating device as well as the plurality of brake cylinders is connected to the common passage, the at least one hydraulic pressure control valve group (pressure-increasing control valve group) is disposed between the common passage and the brake cylinders.

In the hydraulic brake system described in this mode, since the ON/OFF control valve is provided for each one of the brake cylinders, it is possible to restrain a delay in change of the hydraulic pressure more satisfactorily as compared with an arrangement in which the linear control valve is provided but the ON/OFF control valve is not provided. The hydraulic brake system described in this mode is effective, particularly, for a large-sized vehicle or the like in which a volume of each brake cylinder is large.

Further, in the hydraulic brake system described in this mode, the linear control valve and the ON/OFF control valve are disposed in parallel with each other. Therefore, a required quantity of the linear control valves can be reduced as long as an amount of inflow of the working fluid into each brake cylinder and an mount of outflow of the working fluid from each brake cylinder do not have to be changed, whereby a cost increase can be restrained, as compared with the hydraulic brake system disclosed in Patent Literature 3 in which a plurality of liner control valves disposed in parallel with each other are provided for each one of the brake cylinders.

(39) The control valve device may include a plurality of hydraulic-pressure control valve devices provided for the respective brake cylinders, wherein the hydraulic-pressure control device may include an individual hydraulic-pressure controlling portion configured to control hydraulic pressures in the respective brake cylinders individually from each other by controlling the hydraulic-pressure control valve devices individually from each other.

The hydraulic pressures in the respective brake cylinders are controlled by controlling the plurality of individual hydraulic-pressure control valve devices. The hydraulic pressures in the respective brake cylinders may be controlled, so as to be either different from each other or the same as each other.

The features recited in the above-described modes may be applied to the hydraulic brake system described in this mode, by reading the hydraulic pressure and the target hydraulic pressure in the common passage, as the hydraulic pressure and the target hydraulic pressure in each of the brake cylinders.

BRIEF DESCRIPTION OF DRAWINGS

FIG. 3 (*a*) is a cross sectional view of a pressure-increasing linear control valve or a pressure-reducing linear control valve included in the above-described hydraulic brake system.

FIG. 3 (*b*) is a view showing a valve opening characteristic of each of the above-described pressure-increasing linear control valve and pressure-reducing linear control valve.

FIG. 3 (*c*) is a view (model) conceptually showing a flow-rate control characteristic of each of the above-described pressure-increasing linear control valve and pressure-reducing linear control valve.

FIG. 4 (*b*) is a view (model) conceptually showing a flow-rate control characteristic of each of the above-described pressure-increasing ON/OFF control valve and pressure-reducing ON/OFF control valve.

FIG. 4 (*c*) is a view showing a hydraulic-pressure change characteristic in brake cylinders included in the above-described hydraulic brake system.

FIG. 10 (*a*) and FIG. 10 (*b*) are flow charts showing a part (S4: obtainment of a particular required accuracy and a particular required flow rate during a normal operation control) of the above-described controlled-valve selecting program.

FIG. 13 (*a*) is a block diagram showing a linear-control-valve individual controlling portion included in the above-described hydraulic brake system.

FIG. 13 (*b*) and FIG. 13 (*c*) are views for explaining methods of obtaining a feed-forward current.

FIG. 15 (*c*) is a block diagram showing another ON/OFF-control-valve combination controlling portion included in the above-described hydraulic brake system.

FIG. 16 (*b*) is a flow chart showing an ON/OFF-control-valve priority control program.

FIG. 16 (*c*) is a flow chart showing a linear-control-valve priority control program.

FIG. 21 is a view summarizing content of the above-described ON/OFF-control-valve combination control I.

FIG. 26 is a set of views showing a brake cylinder characteristic and a hysteresis characteristic in a hydraulic brake system according to embodiment 2 of the present invention.

MODES FOR CARRYING OUT THE INVENTION

Figure 1:
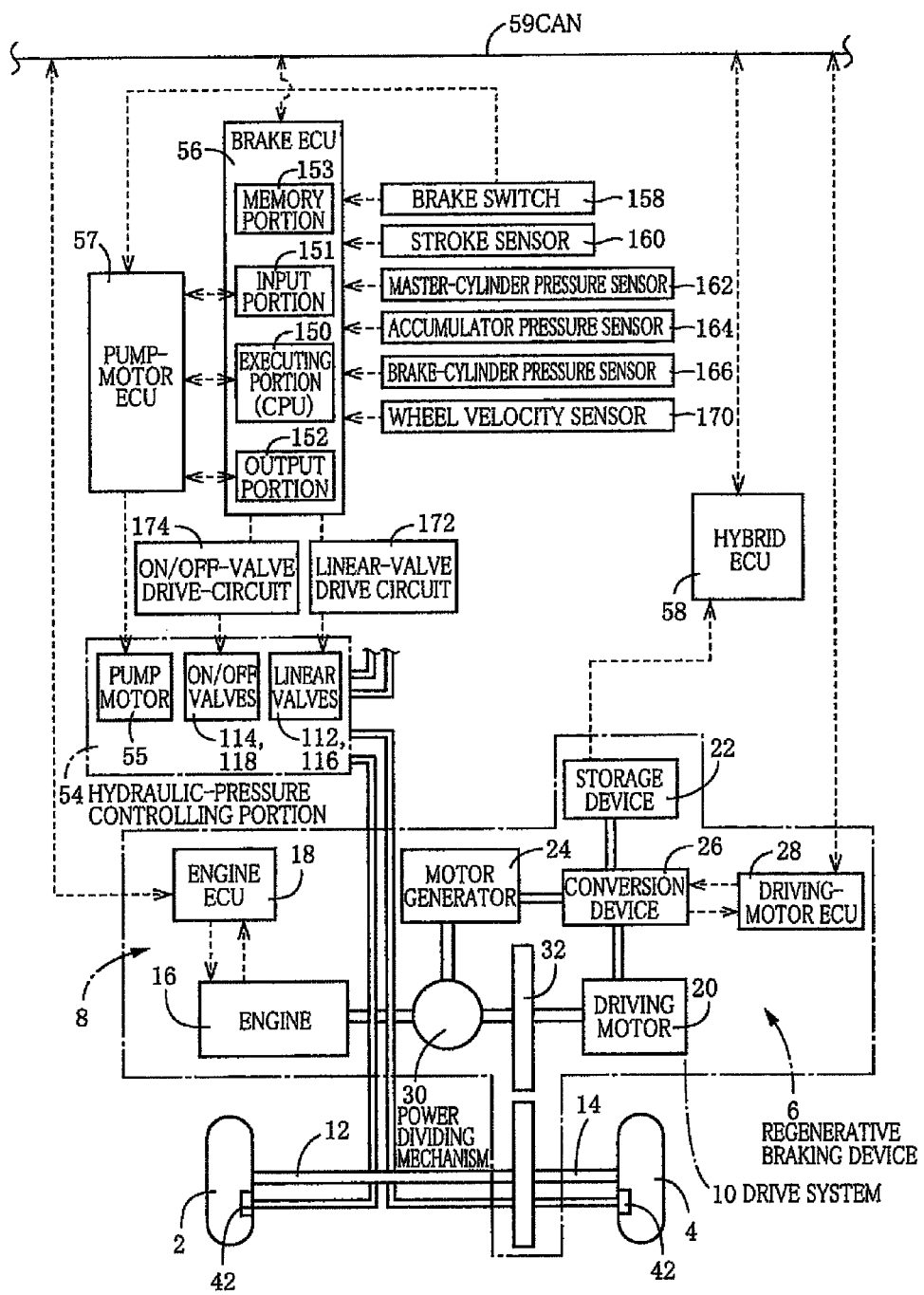
FIG. 1 is a view showing an entirety of a vehicle in which a hydraulic brake system according to embodiment 1 of the present invention.

There will be described a hydraulic brake system as an embodiment of the present invention, with reference to drawings.

[Embodiment 1]
<Vehicle>

There will be first described a vehicle on which a hydraulic brake system as the brake system according to the embodiment 1 is installed.

This vehicle is a hybrid vehicle including driving units in the form of an electric motor and an engine, so that front left and right wheels 2, 4 as drive wheels are to be driven by a drive system 10 including an electric drive device 6 and an internal-combustion drive device 8. A drive power of the drive system 10 can be transmitted to the front left and right wheels 2, 4 via drive shafts 12, 14. The internal-combustion drive device 8 includes an engine 16 and an engine ECU 18 that is configured to control activation of the engine 16. The electric drive device 6 includes a driving electric motor (hereinafter referred to as a driving motor) 20, a storage device 22, a motor generator 24, a conversion device 26, a driving-motor ECU 28 and a power dividing mechanism 30. The driving motor 20, motor generator 24, engine 16 and power dividing mechanism 30 (to which the driving motor 20, motor generator 24 and engine 16 are connected) are controlled so as to selectively establish a state in which only a driving torque of the driving motor 20 is transmitted to an output member 32, a state in which a driving torque of the engine 16 and the driving torque of the driving motor 20 are both transmitted to the output member 32, and a state in which an output of the engine 16 is outputted to the motor generator 24 and the output member 32. The driving force transmitted to the output member 32 is transmitted to the drive shafts 12, 14 via a speed reducer and differential gears.

The conversion device 26 includes an inverter, and is controlled by the driving-motor ECU 28. With electric current control of the inverter, the conversion device 26 selectively establishes at least a driving state in which the driving motor 20 is rotated by electric energy supplied from the storage device 22 to the driving motor 20 and a charging state in which the conversion device 26 serves as a generator upon regenerative braking so as to charge the storage device 22 with electric energy. During the charging state, a regenerative braking torque is applied to each of the front left and right wheels 4, 2. In this sense, the electric drive device 6 can be considered as a regenerative braking device.

The hydraulic brake system includes brake cylinders 42 of respective hydraulic brakes 40 provided for the respective front left and right wheels 2, 4, brake cylinders 52 of respective hydraulic brakes 50 provided for the respective rear left and right wheels 46, 48 (see FIG. 2), and a hydraulic-pressure controlling portion 54 configured to control hydraulic pressures of the respective brake cylinders 42, 52. As described below, the hydraulic-pressure controlling portion 54 includes a plurality of electromagnetic ON/OFF valves and a pump motor 55 as a drive source of power hydraulic pressure source which is to be driven by supply of electric energy to the pump motor 55, so that a solenoid of each of the plurality of electromagnetic ON/OFF valves is controlled based on commands of a brake ECU 56 that is constituted principally by a computer while the pump motor 55 is controlled based on commands of a pump-motor ECU 57.

Further, the vehicle is provided with a hybrid ECU 58. The hybrid ECU 58, brake ECU 56, engine ECU 18 and driving-motor ECU 28 are connected to one another via a CAN (car area network) 59, so that these ECUs 58, 56, 18, 28 are communicable to one another, and required information are transmitted among the ECUs 58, 56, 18, 28 as needed.

The present hydraulic brake system is installable also on a plug-in hybrid vehicle, an electric vehicle and a fuel battery vehicle. In an electric vehicle, the internal-combustion drive device 8 is not required. In a fuel battery vehicle, the driving motor is driven by, for example, a fuel battery stack.

Further, the present hydraulic brake system is installable also on an internal-combustion drive vehicle. In such a vehicle not equipped with the electric drive device 6, a regenerative braking torque is not applied to the driving wheels 2, 4 so that a regenerative cooperative control is not executed. The hydraulic pressures in the brake cylinders 42, 52 are controlled to correspond to a total required braking torque, as described later.

Further, to elements included in the present hydraulic brake system, electric energy is supplied from a common electric power source (e.g., storage device 22).

<Hydraulic Brake System>

The hydraulic brake system will be next described. In the following description, each of the brake cylinders, hydraulic brakes and electromagnetic ON/OFF valves will be referred together with, as a suffix, one of reference signs (FL, FR, RL, RR) indicative of the respective front left, front right, rear left and rear right wheels, where it should be clarified which one of the four wheels the referred brake cylinder, hydraulic brake or electromagnetic ON/OFF valve corresponds to. However, each of the brake cylinders, hydraulic brakes and electromagnetic ON/OFF valves will be referred without such reference signs, where it is referred to as a representative of those provided for the four wheels, or where the above-described clarification is not required.

Figure 2:
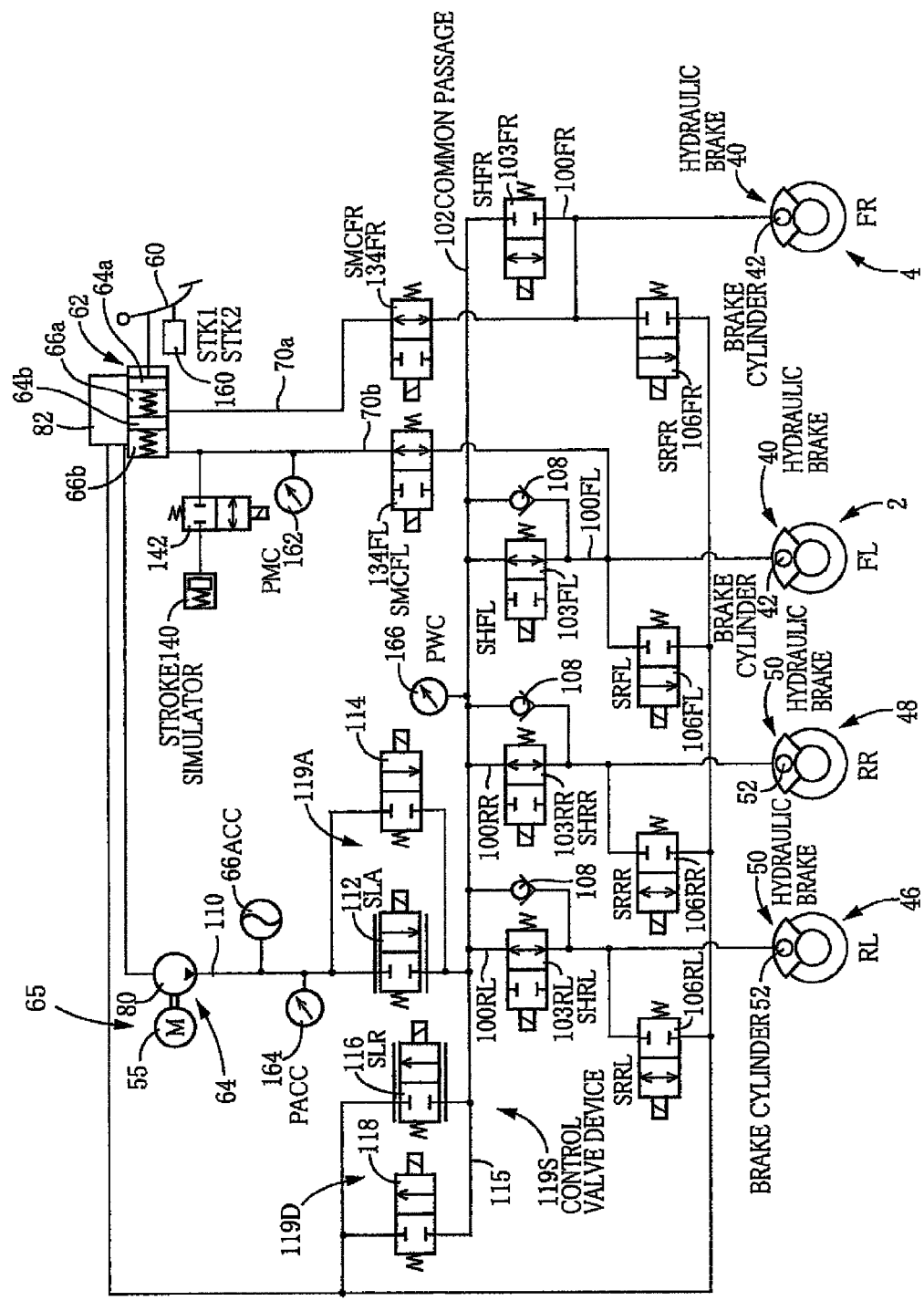
FIG. 2 is a hydraulic pressure circuit diagram of the above-described hydraulic brake system.

The present brake system includes a brake circuit shown FIG. 2 in which reference sign "60" denotes a brake pedal as a brake operating member, reference sign "62" denotes a master cylinder as a manual hydraulic pressure source which is configured to generate hydraulic pressure by operation of the brake pedal 60, and reference sign "64" denotes a power hydraulic pressure source including a pump device 65 and an accumulator 66. The hydraulic brakes 40, 50 are to be activated by hydraulic pressures of the respective brake cylinders 42, 52. In the present embodiment, each of the hydraulic brakes 40, 50 is a disk brake.

It is noted that each of the hydraulic brakes 40, 50 may be a drum brake. It is further noted that each of the hydraulic brakes 40 provided for the front wheels 2, 4 may be a disk brake while each of the hydraulic brakes 50 provided for the rear wheels 46, 48 may be a drum brake.

The master cylinder 62 is a tandem cylinder, and includes two pressurizing pistons 64a, 64b associated with the brake pedal 60. The master cylinder 62 has pressurizing chambers 66a, 66b such that the pressurizing chamber 66a is located on a front side of the pressurizing piston 64a while the pressurizing chamber 66b is located on a front side of the pressurizing piston 64b. When the brake pedal 60 is operatively depressed, the pressurizing pistons 64a, 64b are moved forwardly whereby hydraulic pressures are generated in the respective pressure chambers 66a, 66b, independently of each other.

Further, to the pressurizing chamber 66a, 66b, master cylinder passages 70a, 70b are connected, respectively.

In the power-operated hydraulic-pressure generating device 64, the pump device 65 includes the above-described pump motor 55 and a pump 80, so that the working fluid is pumped from the reservoir 82 by activation of the pump 80, and the pumped working fluid is accumulated in the accumulator 66. The pump motor 55 is controlled based on commands supplied from the pump-motor ECU 57 such that the pressure of the working fluid accumulated in the accumulator 66 is held within a predetermined range.

The brake ECU 56 supplies information indicating that the accumulator pressure (i.e., hydraulic pressure of the working fluid accumulated in the accumulator 66) becomes lower than a lower limit of the predetermined range and that the accumulator pressure reaches an upper limit of the predetermine range, (or supplies information representing an amount of the accumulator pressure), to the pump motor ECU 57. The pump motor 55 is started when the accumulator pressure becomes lower than the lower limit of the predetermined range, and is stopped when the accumulator pressure exceeds the upper limit of the predetermined range. As long as the hydraulic brake system functions normally, the pump motor 55 is controlled such that the accumulator pressure is held in within the predetermined range.

On the other hands, the brake cylinders 42FL, 42FR provided for the front left and right wheels 2, 4 and the brake cylinders 52RL, 52RR provided for the rear left and right wheels 46, 48 are connected to a common passage 102 via respective individual passages 100FL, 100FR, 100RL, 100RR, respectively.

The individual passages 100FL, 100FR, 100RL, 100RR are provided with respective pressure increasing valves (SHij: i=F, R; j=L, R) 103FL, 103FR, 103RL, 103RR. Between the brake cylinders 42FL, 42FR, 52RL, 52RR and the reservoir 82, there are disposed pressure reducing valves (SRij: i=F, R; j=L, R) 106FL, 106FR, 106RL, 106RR. The pressure increasing valves 103 and pressure reducing valves 106 are used, for example, when an anti-lock control is executed.

The pressure increasing valve 103FR provided for the front right wheel 4 is a normally-close electromagnetic ON/OFF valve that is to be placed in a closed state when electric current is not being supplied to a solenoid thereof. Each of the other pressure increasing valves 103FL, 103RL, 103RR provided for the front left, rear left and rear right wheels 2, 46, 48, respectively, is a normally-open electromagnetic ON/OFF valve that is to be placed in an open state when electric current is not being supplied to a solenoid thereof. Check valves 108 are disposed in parallel with the respective normally-open pressure increasing valves 103FL, 103RL, 103RR. Each of the check valves 108 allows flow of the working fluid in a direction away from a corresponding one of the brake cylinders 42, 52 toward the common passage 102, and inhibits flow of the working fluid in the opposite direction away from the common passage 102 toward the corresponding one of the brake cylinders 42, 52. The check valve 108 is not provided for the normally-close pressure increasing valve 103FR. Each of the check valves 108 is provided for enabling the hydraulic pressure to be rapidly returned from the corresponding brake cylinder to the common passage 102 upon execution of a pressure-reducing control, for avoiding the hydraulic pressure in the corresponding brake cylinder from being made excessively large relative to the hydraulic pressure in the common passage 102.

It is noted that each of the pressure reducing valves 106FL, 106FR, 106RL, 106RR is a normally-close electromagnetic ON/OFF valve.

To the common passage 102 to which the brake cylinders 42, 52 are connected, the power-operated hydraulic-pressure generating device 64 is also connected via a controlled-pressure passage 110.

The controlled-pressure passage 110 is provided with a pressure-increasing linear control valve (SLA) 112 and a pressure-increasing electromagnetic ON/OFF valve 114 that are disposed in parallel with each other. A pressure-reducing control passage 115 interconnecting the controlled-pressure passage 110 (common passage 102) and the reservoir 82, is provided with a pressure-reducing linear control valve (SLR) 116 and a pressure-reducing electromagnetic ON/OFF valve 118 that are disposed in parallel with each other.

In the present embodiment, a pressure-increasing control valve group 119A is constituted principally by the pressure-increasing linear control valve 112 and the pressure-increasing electromagnetic ON/OFF valve 114, while a pressure-reducing control valve group 119D is constituted principally by the pressure-reducing linear control valve 116 and the pressure-reducing electromagnetic ON/OFF valve 118. Further, a control valve device 119S is constituted principally by the pressure-increasing linear control valve 112, pressure-increasing electromagnetic ON/OFF valve 114, pressure-reducing linear control valve 116 and pressure-reducing electromagnetic ON/OFF valve 118. Further, the controlled-pressure passage 110 may be referred also to as a pressure-increasing control passage.

By controlling the control valve device 119S, the hydraulic pressure in the common passage 102 is controlled whereby the hydraulic pressures in the brake cylinders 42, 52 are controlled commonly to each other.

[Linear Control Valve]

As shown in FIG. 3 (a), each of the pressure-increasing linear control valve 112 and pressure-reducing linear control valve 116 includes a valve body 120, a valve seat 122 (that cooperates with the valve body 120 to constitute a seating valve), a spring 124 and a solenoid 126. The spring 124 generates a biasing force Fs forcing the valve body 120 in a direction toward the valve seat 122. The solenoid 126, when electric current is being applied thereto, generates an electromagnetic driving force Fd forcing the valve body 120 in a direction away from the valve seat 122.

Further, in the pressure-increasing linear control valve 112, a pressure-difference-based force Fp, which is generated based on a difference between pressure in the power-operated hydraulic-pressure generating device 64 and pressure in the common passage 102, acts on the valve body 120, forcing the valve body 120 to be displaced in a direction away from the valve seat 122. In the pressure-reducing linear control valve 116, a pressure-difference-based force Fp, which is generated based on a difference between pressure in the common passage 102 (controlled-pressure passage 110) and pressure in the reservoir 82, acts on the valve body 120, forcing the valve body 120 to be displaced in a direction away from the valve seat 122 (Fd+Fp: Fs). In each of the valves 112, 116, the pressure-difference-based force Fp is controlled by controlling the electric current that is supplied to the solenoid 126, whereby the hydraulic pressure in the common passage 102 is controlled.

FIG. 3 (b) shows a valve-opening characteristic of the pressure-increasing linear control valve 112, which is a relationship between a current amount I (valve-opening electric current amount) supplied to the solenoid 126 and a valve opening pressure (pressure difference). From FIG. 3 (b), it is understood that when the pressure-increasing linear control valve 112 is to be switched from the closed state to the open state, a larger valve-opening electric current amount I is required when the pressure difference (hereinafter simply referred to as high/low pressure difference, where appropriate) between the pressure on the high-pressure side and the pressure on the low-pressure side is small than when being large. The pressure-reducing linear control valve 116 has substantially the same valve-opening characteristic as the pressure-increasing linear control valve 112.

FIG. 3 (c) shows a flow-rate control characteristic, which is a relationship between a current amount I supplied to the solenoid 126 and a flow rate q of the working fluid allowed in the pressure-increasing linear control valve 112. As long as the high/low pressure difference is constant (Fp: constant), when the electric current amount I supplied to the solenoid 126 is increased so as to increase the electromagnetic driving force Fd, an opening degree of the pressure-increasing linear control valve 112 is increased whereby the allowable flow rate q of the working fluid is increased.

However, as shown in FIG. 3 (c), between the flow rate q and the supplied electric current I, there is a relationship represented by a polygonal line. Further, between the flow rate q and the supplied electric current I, there is also a hysteresis. That is, in an entire range in which the electric current is to be controlled, a constant of proportion between the electric current I and the flow rate q is changed. It is assumed that the change of the constant of the proportion is caused by a fact that, as long as the pressure difference remains unchanged, the opening degree is lager when the supplied electric current I and the electromagnetic driving force Fd are large, than when the supplied electric current I and the electromagnetic driving force Fd are small.

As is apparent from FIG. 3 (c), there are a region in which the change of the flow rate q relative to the amount of increase of the supplied electric current I is small ($\Delta q1/\Delta I$) and a region in which the change of the flow rate q relative to the amount of increase of the supplied electric current I is small ($\Delta q2/\Delta I$) ($\Delta q1 < \Delta q2$). In the region in which the change of the flow rate q is small, i.e., a region R surrounded by one-dot chain line, the flow rate is more accurately controllable in the pressure-increasing linear control valve 112.

It is noted that the horizontal axis can be considered as a temporal axis where a gradient of increase of the supplied electric current I (i.e., an amount of increase of the supplied electric current I relative to time) is constant.

The pressure-reducing linear control valve 116 has substantially the same flow-rate control characteristic as the pressure-increasing linear control valve 112.

A shift amount of an electric current indicated by a straight line representing the characteristic in FIG. 3 (c) corresponds to a valve-opening electric current Iopen while the above-described pressure difference is being established. When each of the linear control valves 112, 116 is activated with a pressure difference that is different from the above-described pressure difference (with which the characteristic of FIG. 3 (c) is obtained), the shift amount (i.e., valve-opening electric current Iopen) is different from that is shown in FIG. 3 (c).

Further, an upper limit qs (i.e., upper limit flow rate dependent on the pressure difference) of the flow rate q is smaller when the pressure difference is small than when the pressure difference is large. This is because a maximum suppliable electric current amount is determined so that the opening degree cannot be made sufficiently large when the pressure difference is small.

Hereinafter, each of the pressure-increasing linear control valve 112 and the pressure-reducing linear control valve 116 will be simply referred to as linear control valve where appropriate. Further, the flow-rate control characteristic of the linear control valve, which is a relationship between the electric current and the flow rate, will be referred to as a model of the linear control valve where appropriate.

[ON/OFF Control Valve]

Each of the pressure-increasing electromagnetic ON/OFF valve 114 and the pressure-reducing electromagnetic ON/OFF valve 118 has substantially the same construction as that of each of the linear control valves 112, 116, which is shown in FIG. 3 (a), and is capable of taking an open state and a closed state through an ON/OFF control that is applied to supply of an electric current to the solenoid. The amount of the supplied electric current I is not controlled. In this sense, each of the pressure-increasing electromagnetic ON/OFF valve and the pressure-reducing electromagnetic ON/OFF valve will be referred to as ON/OFF valve or ON/OFF control valve where appropriate.

Figure 4:
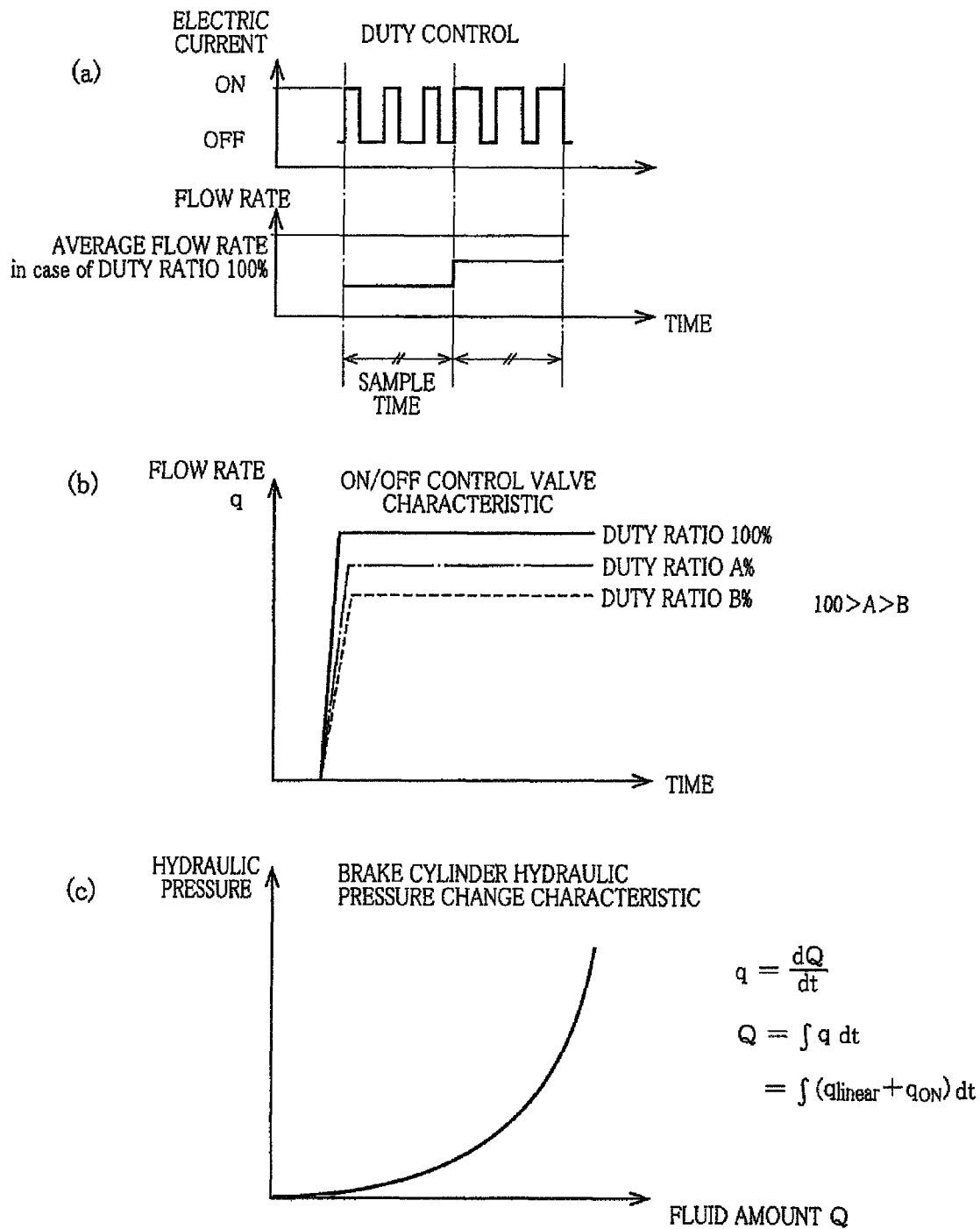
FIG. 4 (*a*) is a view conceptually showing a duty control performed for a pressure-increasing ON/OFF control valve and a pressure-reducing ON/OFF control valve that are included in the above-described hydraulic brake system.
Figure 5:
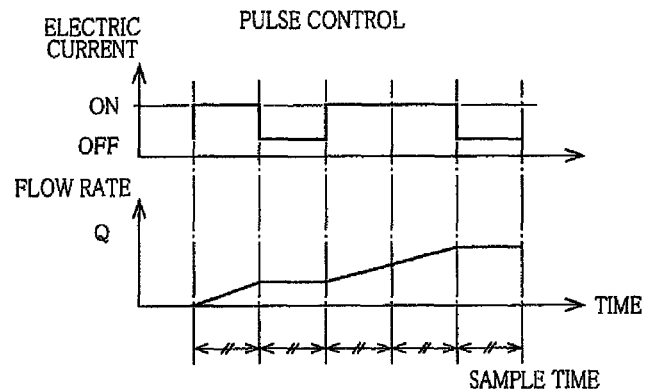
FIG. 5 is a view conceptually showing a pulse control that is executed for the above-described pressure-increasing ON/OFF control valve and pressure-reducing ON/OFF control valve.

As shown in FIG. 4 (a) and FIG. 5, each of the ON/OFF control valves 114, 118 is subjected to a control (e.g., duty control or pulse control) in which the supply of the electric current to the solenoid is alternately placed in the ON state and OFF state. By the control in which the supply of the electric current is switched alternately between the ON state and OFF state, an average flow rate (i.e., an average flow rate within one sample time or an average flow rate within a plurality of sample times) of the working fluid flowing through each of the ON/OFF control valves 114, 118 is controlled.

The duty control is a control in which the electric current supply is switched between the ON state and OFF state within one sample time, in accordance with a given duty ratio {ON time/(ON time+OFF time)}.

FIG. 4(b) shows a relationship between the time and the flow rate q when the duty control is being executed in a case where the pressure difference between the high-pressure side and low-pressure side of each of the ON/OFF control valves 114, 118 is held constant. The average flow rate within one sample time is higher when the duty ratio is high than when the duty ratio is low.

The pulse control is a control in which the supply of the electric current is switched between the ON state and OFF state such that either of the ON state and OFF state is kept for at least one sample time as an unit time, as shown in FIG. 5. In the pulse control, the average flow rate throughout a plurality of sample times is controlled.

[Pressure-Increasing Control Valve Group]

The flow rate established in the pressure-increasing linear control valve 112 of the pressure-increasing control valve group 119A is low when the hydraulic pressure in the common passage 102 is high and the high/low pressure difference is small. Therefore, when the hydraulic pressure in the common passage 102 is high, there is a case in which a required flow rate cannot be established in execution of the hydraulic pressure control.

Figure 6:
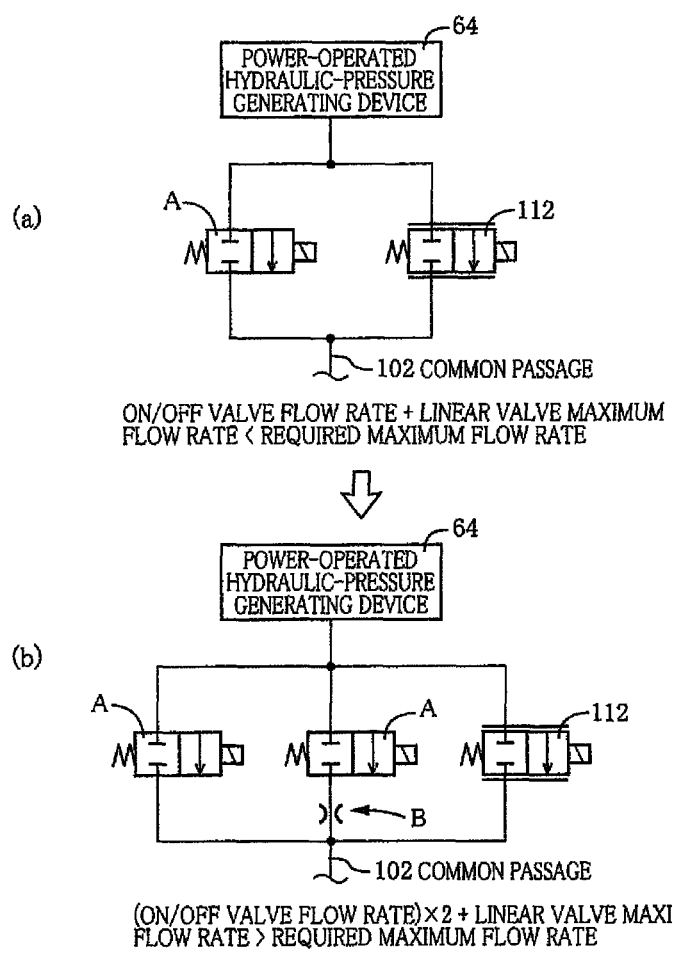
FIG. 6 is a set of views showing a pressure-increasing control valve group and its neighborhood in the above-described hydraulic brake system, for explaining its design concept.

On the other hand, in the present embodiment, since the pressure-increasing ON/OFF control valve 116 is disposed in parallel with the pressure-increasing linear control valve 112, it is possible to establish a required flow rate owing to activations of both of the pressure-increasing linear control valve 112 and pressure-increasing ON/OFF control valve 116, even when the hydraulic pressure in the common passage 102 is high.

Where a required flow rate cannot be established with the high/low pressure difference being an arbitrary value in a control for controlling the hydraulic pressure in the common passage 102, in the arrangement in which the pressure-increasing linear control valve 112 and a single pressure-increasing ON/OFF control valve A are disposed in parallel with each other, as shown in FIG. 6 (a), the arrangement may be modified such that the quantity of the pressure-increasing ON/OFF control valve A is increased as shown in FIG. 6 (b).

Further, where the flow rate allowable by cooperation of the two pressure-increasing ON/OFF control valves A and the single pressure-increasing linear control valve 112 is higher than the required flow rate, a flow restrictor B (that may be constituted by an orifice) may be disposed in series with at least one of the ON/OFF control valves A, for restraining the entire flow rate. There are a case (not shown) in which the flow restrictor is disposed for each one of the two ON/OFF control valves A and a case in which the flow restrictor is disposed for one of the two ON/OFF control valves A.

Thus, it is possible to adjust the allowable flow rate of the working fluid, by adjusting the number of the ON/OFF control valve or valves A that are disposed in parallel with the pressure-increasing linear control valve 112, so that the required flow rate can be established when the high/low pressure difference becomes an arbitrary value.

Further, there is a case in which vibration (pulsation) occurring in the pressure-increasing control valve group 119A or in the ON/OFF control valve A can be suppressed by the provision of the flow restrictor B.

It is noted that the orifice B does not have to be disposed where the flow rate established by cooperation of the two ON/OFF control valve A and the single pressure-increasing linear control valve 112 is equal to the required flow rate.

Further, the entire flow rate can be adjusted also by adjusting the opening area of the electromagnetic ON/OFF valve A.

[Pressure-Reducing Control Valve Group]

When the hydraulic pressure in the common passage 102 is high, the allowable flow rate of the working fluid is high, since the high/low pressure difference in the pressure-reducing linear control valve 116 is large when the hydraulic pressure in the common passage 102 is high. However, when the hydraulic pressure in the common passage 102 is low, the required flow rate cannot be established, since the high/low pressure difference in the pressure-reducing linear control valve 116 is large so that the allowable flow rate of the working fluid is low.

On the other hand, since the pressure-reducing electromagnetic ON/OFF valve 118 is disposed in parallel with the pressure-reducing linear control valve 116, it is possible to establish a required flow rate, even when the hydraulic pressure in the common passage 102 is low but the required flow rate is high.

The pressure-reducing control valve group 119D and the pressure-increasing control valve group 119A are designed with respect to, for example, the quantity of the ON/OFF control valve or valves, as described above. The quantity of the ON/OFF control valve or valves belonging to the pressure-reducing control valve group 119D and the quantity of the ON/OFF control valve or valves belonging to the pressure-increasing control valve group 119A are not necessarily the same as each other, but can be different from each other.

Meanwhile, the first master cylinder passage 70a is connected to a portion of the individual passage 100FR provided for the front right wheel 4, which portion is located on a downstream side of the pressure increasing valve 103FR, namely, is portion is located between the pressure increasing valve 103FR and the brake cylinder 42FR. The second master cylinder passage 70b is connected to a portion of the individual passage 100FL provided for the front left wheel 2, which portion is located on a downstream side of the pressure increasing valve 103FL, namely, is portion is located between the pressure increasing valve 103FL and the brake cylinder 42FL. That is, each of the first and second master cylinder passages 70a, 70b is connected directly to a corresponding one of the brake cylinders 42FR, 42FL, without each of the first and second master cylinder passages 70a, 70b being connected to the common passage 102.

A first master cut-off valve (SMCFR) 134FR is provided on a midway of the first master cylinder passage 70a, while a second master cut-off valve (SMCFL) 134FL is provided on a midway of the second master cylinder passage 70b. Each of the first and second master cut-off valves 134FR, 134FL is a normally-open electromagnetic ON/OFF valve.

Further, a stroke simulator 140 is connected to the second master cylinder passage 70b via a simulator controlling valve 142 that is a normally-close electromagnetic ON/OFF valve.

As described above, in the present embodiment, the above-described pump motor 55, output hydraulic-pressure control valve device 118, master cut-off valves 134, pressure increasing valves 103 and pressure reducing valves 106 cooperate to constitute the hydraulic-pressure controlling portion 54.

As shown in FIG. 1, the brake ECU 56 is constituted principally by a computer including an executing portion (CPU) 150, an input portion 151, an output portion 152 and a memory portion 153. To the input portion 151, there are connected, for example, a brake switch 158, a stroke sensor 160, a master-cylinder pressure sensor 162 as a manual hydraulic-pressure sensor, an accumulator pressure sensor 164, a brake-cylinder pressure sensor 166, a level warning switch 168 and a wheel velocity sensor 170.

The brake switch 158 is a switch, which is turned from its OFF state to its ON state when the brake pedal 60 is operated. In the present embodiment, the brake switch 158 is placed in its ON state when the brake pedal 60 is advanced from the reverse end position by a predetermined amount or more than the predetermined amount.

The stroke sensor 160 is configured to detect an operating stroke (STK) of the brake pedal 60. In the present embodiment, the stroke sensor 160 is constituted by two sensor switches both of which are configured to detect the operating stroke of the brake pedal 60 (i.e., deviation of the brake pedal 60 from the reverse end position). Thus, the stroke sensor 160 has two systems, so that the stroke can be detected by one of the two sensor switches even in the event of failure of the other of the two sensor switches.

The master-cylinder pressure sensor 162 is configured to detect the hydraulic pressure in the pressurizing chamber of the master cylinder 62.

The accumulator pressure sensor 164 is configured to detect pressure (PACO) of the working fluid accumulated in the accumulator 66.

The brake-cylinder pressure sensor 166 is provided in the common passage 102, and is configured to detect pressure (PWC) in the brake cylinders 42, 52. When each of the pressure increasing valves 103 is placed in the open state, the common passage 102 is held in communication with each of the brake cylinders 42, 52, so that the hydraulic pressure in each of the brake cylinders 42, 52 can be made equal to the hydraulic pressure in the common passage 102. Further, the brake-cylinder pressure sensor 166 may be also referred to as a controlled hydraulic-pressure sensor, since the hydraulic pressure of the power-operated hydraulic-pressure generating device 64, which is controlled by the control valve device 119S, is supplied to the common passage 102 that is provided with the brake-cylinder pressure sensor 166.

The wheel velocity sensor 170 is provided for each of the front right wheel 4, front left wheel 2, rear right wheel 48 and rear left wheel 46, so as to detect rotational velocity of each of the wheels. A running velocity of the vehicle is obtained based on the rotational velocities of the four wheels.

Further, to the output portion 152, there are connected, for example, the pump-motor ECU 57 and solenoids of all of the electromagnetic valves (hereinafter simply referred to as "all the electromagnetic valves" where appropriate) which are included in the brake circuit such as the pressure-increasing linear control valve 112, pressure-reducing linear control valve 116, pressure-increasing electromagnetic ON/OFF valve 114, pressure-reducing electromagnetic ON/OFF valve 118, pressure increasing valves 103, pressure reducing valves 106, master cut-off valves 134 and simulator controlling valve 142 of the hydraulic-pressure controlling portion 54. In the present embodiment, the pressure-increasing linear control valve 112 and pressure-reducing linear control valve 116 are connected to the output portion 152 via a linear-control-valve drive circuit 172, while the pressure-increasing electromagnetic ON/OFF valve 114 and pressure-reducing electromagnetic ON/OFF valve 118 are connected to the output portion 152 via an ON/OFF-control-valve drive circuit 174.

The linear-control-valve drive circuit 172 is a circuit capable of controlling the supplied electric current within a wide range, by means of PWM. On the other hand, the ON/OFF-control-valve drive circuit 174 is a circuit capable of executing a control limited to a narrower range, as compared with the linear-control-valve drive circuit 172. In the present embodiment, the ON/OFF-control-valve drive circuit 174 is a circuit capable of executing exclusively a duty control with a frequency which makes it possible to suppress the pulsation and which enables each of the pressure-increasing electromagnetic ON/OFF valve 114 and pressure-reducing electromagnetic ON/OFF valve 118 to allow the working fluid to flow at a flow rate higher than the upper limit of the flow rate allowable in each of the linear control valves 112, 116 as long as the pressure difference between the high-pressure side and the low-pressure side is the same. The frequency, which makes it possible to suppress the pulsation in the control valve device 119S, can be predetermined in experiment, simulation or the like.

Moreover, the memory portion 153 stores therein various programs, tables and the like.

The pump-motor ECU 57 is also constituted by a computer including an executing portion, a memory portion, an input portion and an output portion. To the input portion, there are connected the above-described brake switch 158 and brake ECU 56. To the output portion, a drive circuit (not shown) of the pump motor 55 is connected.

In the pump-motor ECU57, states of the input portion 151, output portion 152 and CPU 150 of the brake ECU 56 (e.g., electric signals representing electric current value, voltage value and the like) are detected, and it is judged whether or not each of these components is activated normally.

As described below, the pump-motor ECU 57 is configured to control the pump motor 55, for example, in the event of failure of the brake ECU 56. The pump-motor ECU 57 is configured to start controlling the pump motor 55 upon satisfaction of failure-state control starting condition. This failure-state control starting condition is satisfied, for example, (1) when the pump-motor ECU 57 receives, from the brake ECU 56, information representing failure of the control system of the brake system, during the ON state of the brake switch 158, and (2) when the brake ECU 56 is not activated normally (e.g., in the event of failure of the brake ECU 56 as such, in the event of breaking of the signal wires between the brake ECU 56 and the sensors, and in the event of breaking of the signal wires between the brake ECU 56 and the solenoids of the valves), during the ON state of the brake switch 158.

<Operations in Hydraulic Brake System>

[Outline of Operations]

(1) In Case of Normality of System

The hydraulic pressures in the brake cylinders 42, 25 are controlled by controlling the control valve device 119S, with the master cut-off valves 134FL, 134FR being placed in the close states, the pressure increasing valves 103FL, 103FR, 103RL, 103RR being placed in the open states, the pressure reducing valve 106FL, 106FR, 106RL, 106RR being placed in the closed states and the simulator controlling valve 142 being placed in the open state. In this case of normality of the system, a regenerative cooperative control is in principle executed.

The regenerative cooperative control is executed for equalizing an actual total braking torque to a total required braking torque, wherein the actual total braking torque is a sum of the regenerative braking torque applied to the driving wheels 2, 4 and a friction braking torque applied to the driven wheels 46, 48 as well as to the driving wheels 2, 4.

The total required braking torque is determined in the brake ECU 56. In most cases, the total required braking torque is obtained (as a braking torque required by the vehicle operator) based on, for example, values obtained based on values detected by the stroke sensor 160 and the master-cylinder pressure sensor 162. Then, a required regenerative braking torque is determined based on the above-described total required braking torque and information which is supplied from the hybrid ECU 58 and which contains data indicative of a generator-side upper limit value and a storage-side upper limit value. The generator-side upper limit value is an upper limit value of the regenerative braking torque, which is dependent on, for example, number of rotations of the driving motor 20, while the storage-side upper limit value is an upper limit value of the regenerative braking torque, which is dependent on, for example, a charging capacity of the storage device 22. That is, the smallest one of the total required braking torque (required value), generator-side upper limit value and storage-side upper limit value is determined as the required regenerative braking torque, and then information representing the determined required regenerative braking torque is supplied to the hybrid ECU 58. The hybrid ECU 58 supplies information representing the required regenerative braking torque, to the driving-motor ECU 28. Then, the driving-motor ECU 28 supplies a control command to the conversion device 26 such that the braking torque applied to the front left and right wheels 2, 4 by the driving motor 20 is made equal to the required regenerative braking torque. In this instance, the driving motor 20 is controlled by the conversion device 26. The driving-motor ECU 28 supplies information representing operation state of the driving motor 20 such as an actual number of revolutions, to the hybrid ECU 58. In the hybrid ECU 58, an actual regenerative braking torque is obtained based on the actual operation state of the driving motor 20, and information representing a value of the actual regenerative braking torque is supplied to the brake ECU 56.

The brake ECU 56 determines a required hydraulic braking torque based on, for example, a value obtained by subtracting the actual regenerative braking torque from the total required braking torque, and then controls valves such as the pressure-increasing linear control valve 112 and pressure-reducing linear control valve 116, such that the brake cylinder hydraulic pressure becomes close to a target hydraulic pressure (i.e., target hydraulic pressure in the common passage 102) that establishes the required hydraulic braking torque. In the present embodiment, there are a case in which a linear-control-valve individual control is executed and also a case in which an ON/OFF-control-valve combination control (that may be referred also to as ON/OFF-control-valve cooperation control). In the case of execution of the linear-control-valve individual control, the linear control valve 112 or 116 is subjected to the control. In the case of execution of the ON/OFF-control-valve combination control, the ON/OFF control valve 114 or 118 as well as the linear control valve 112 or 116 is subjected to the control. The linear-control-valve individual control and the ON/OFF-control-valve combination control will be described later.

When the brake pedal 60 is released, the hydraulic pressure in each brake cylinder 52 is returned to the common passage 102 via the corresponding pressure increasing valve 103 or check valve 108, and then is returned to the master cylinder 62 via the pressure increasing valve 103FL and master cylinder passage 70b. Meanwhile, the hydraulic pressure in each brake cylinder 42 is returned to the mater cylinder 62 via a corresponding one of the master cylinder passages 70a, 70b.

It is noted that the execution of the regenerative cooperative control is not essential.

(2) In Case of Failure of System

All of the electromagnetic valves are placed back in the respective original positions, as shown in FIG. 2, by stopping supply of the electric current to the solenoids of the valves. If the power-operated hydraulic-pressure generating device 64 functions normally with the pump motor 55 being controllable by the pump motor ECU 57, the pump motor 55 is controlled such that a discharge pressure of the pump 80 is not lower than the valve opening pressure of the pressure-increasing linear control valve 112 or pressure-increasing ON/OFF control valve 114 (i.e., a pressure by which the valve 112 or 114 is opened without the electric current being supplied to the solenoid thereof) whereby the pump pressure is supplied to the common passage 102. Thus, the pump pressure is supplied to the brake cylinders 52 of the rear left and right wheels 46, 48 and the brake cylinder 42 of the front left wheel 2, and is supplied also to the brake cylinder 42 of the front right wheel 4 via the master cylinder passage 70b, master cylinder 62 and master cylinder passage 70a. Consequently, the hydraulic pressure generated by the power-operated hydraulic-pressure generating device 64 can be supplied to each of the four brake cylinders 42, 52 whereby the brakes 40, 50 are activated.

Since the pressure increasing valve 103FR is a normally-close valve, it is possible to avoid the working fluid supplied to the brake cylinder 42 of the front right wheel 4, from flowing to the common passage 102. Further, since the check valve 108 is not provided for the pressure increasing valve 103FR of the front right wheel 4, the working fluid is not supplied to the common passage 102 via the check valve 108.

Further, even if the fluid leakage occurs in either one of the brake cylinders 42 of the front right and left wheels 4, 2, it is possible to avoid the other of the brake cylinders 42 from being influenced by the fluid leakage occurring in the one of the brake cylinders 42, because the one and other of the brake cylinders 42 can be isolated from each other, even without supply of the electric current to the solenoids of the valves. Since the pressure increasing valve 103FR is a normally-close valve, the one and other of the brake cylinders 42 is isolated from each other, with the electric current being not supplied to the solenoid of the pressure increasing valve 103FR.

[Details of Operations (in Linear-Control-Valve Individual Control and ON/OFF-Control-Valve Combination Control)]

In the present system, as long as the system functions normally, the linear-control-valve individual control is in principle executed. However, when predetermined conditions are satisfied, the ON/OFF-control-valve combination control is executed.

(1) Selection of Control (Selection of Valve to be Controlled)

Figure 7:
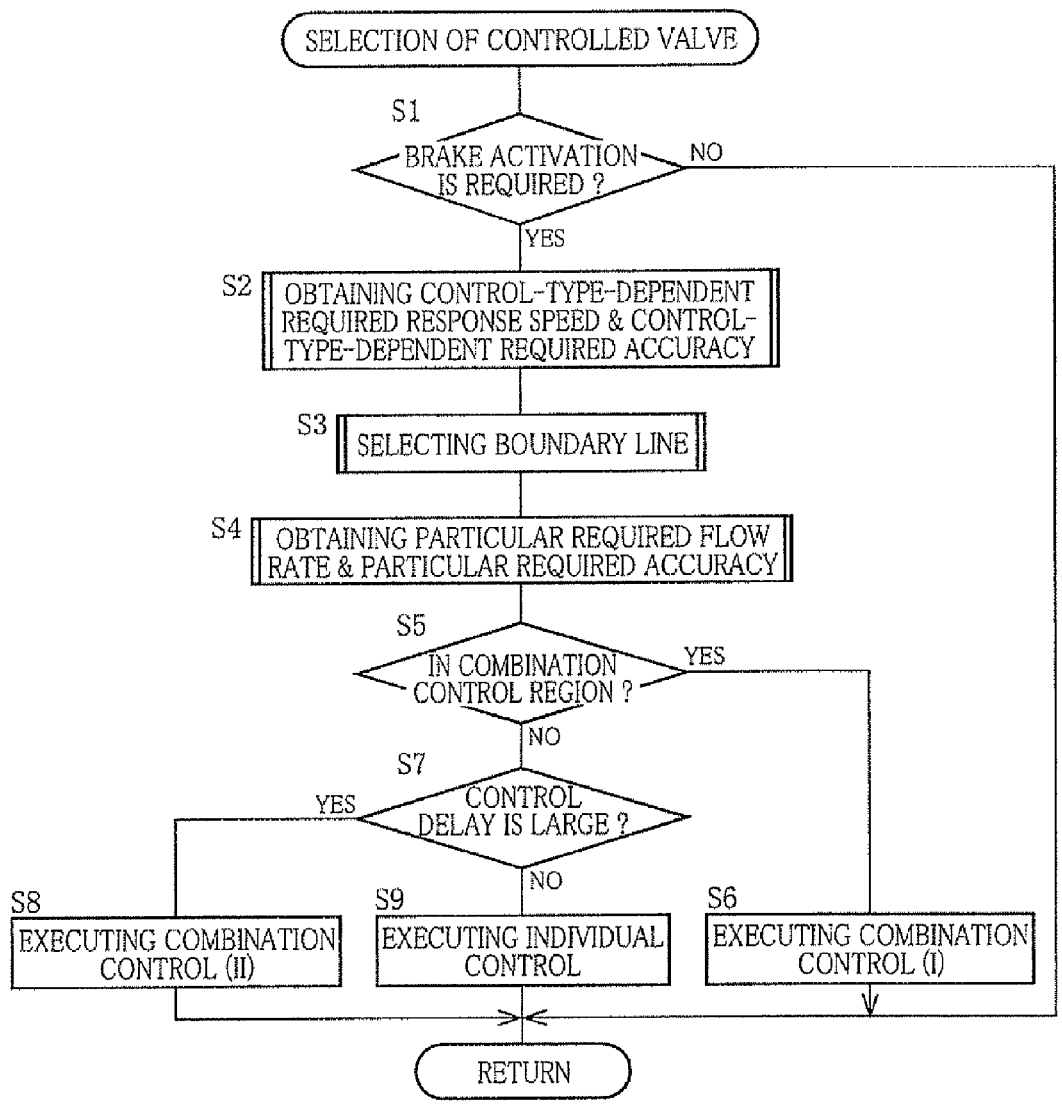
FIG. 7 is a flow chart showing a controlled-valve selecting program that is stored in a storage portion of a brake ECU of the hydraulic brake system.

One of the linear-control-valve individual control and the ON/OFF-control-valve combination control is selected by carrying out a controlled-valve selecting program that is represented by flow chart of FIG. 7. The selection of one of the linear-control-valve individual control and the ON/OFF-control-valve combination control (i.e., selection of one of the controlling portions) is substantially the same as the selection of the valve or valves that are to be subjected to be controlled.

The controlled-valve selecting program, which is represented by the flow chart of FIG. 7, is carried out at a predetermined time interval.

In step S1, it is judged whether the hydraulic brakes 40, 50 are requested to be activated or not. When there is no request for activations of the brakes 40, 50, step S2 and other steps following step S2 are not implemented.

Figure 8:
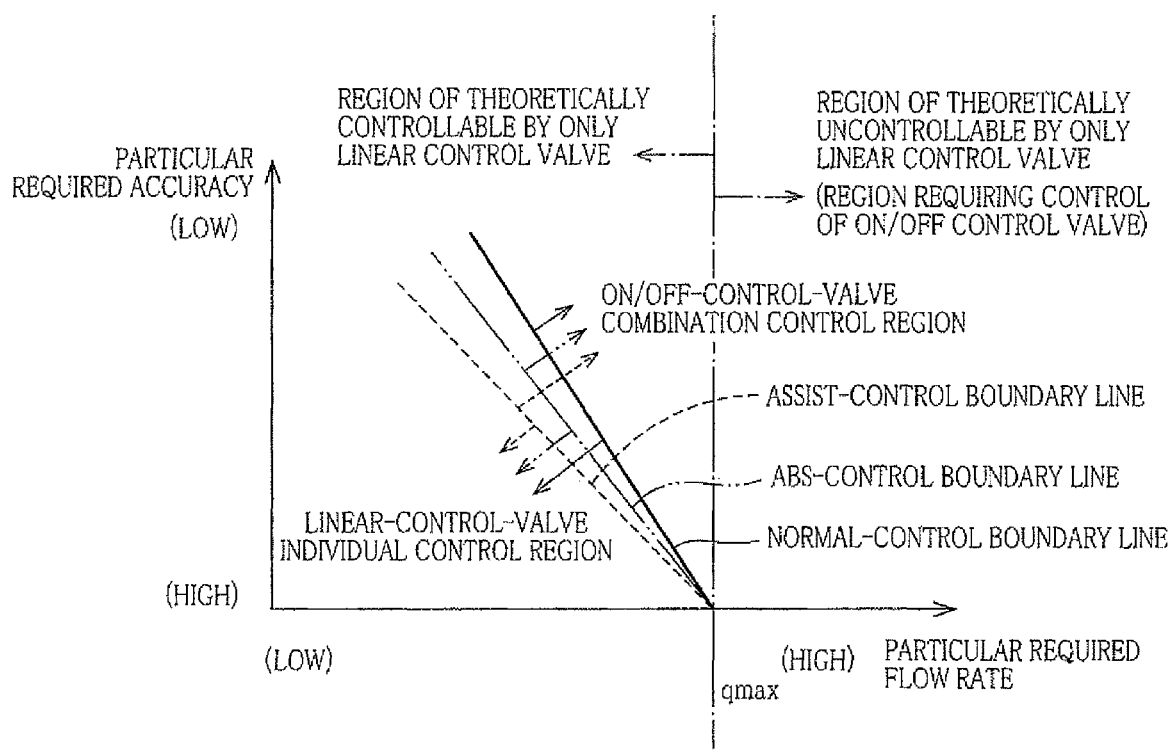
FIG. 8 is a map conceptually showing a control-region determining table stored in the above-described storage portion.

When the hydraulic brakes 40, 50 are requested to be activated, step S2 is implemented to obtain a required response speed and a required accuracy that are determined depending on type of the control, and step S3 is implemented to select one of boundary lines that are shown in FIG. 8.

Then, in step S4, a specific value of the required flow rate and a specific degree of the required accuracy, which are required for controlling the hydraulic pressure in the common passage 102, are obtained. In step S5, it is judged, in accordance with a control-region judgment map, whether a combination of the required flow rate and required accuracy falls in a linear-control-valve individual control region or in an ON/OFF-control-valve combination control region that is shown in FIG. 8.

When the combination of the required flow rate and required accuracy falls in the ON/OFF-control-valve combination control region, step S6 is implemented to select the ON/OFF-control-valve combination control I.

On the other hand, when the combination falls in the linear control-valve individual control region, step S7 is implemented to judge whether the control delay is larger than a given degree or not. When the control delay is larger than the given degree, step S8 is implemented to select the ON/OFF-control-valve combination control II. When the control delay is not larger than the given degree, step S9 is implemented to select the linear-control-valve individual control (i.e., a so-called ordinary linear-control-valve control).

Thus, in the present embodiment, when the combination of the required flow rate and required accuracy falls in the ON/OFF-control-valve combination control region shown in FIG. 8, the ON/OFF-control-valve combination control I is selected. When the control delay is large, the ON/OFF-control-valve combination control II is selected even if the combination does not fall in the ON/OFF-control-valve combination control region shown in FIG. 8.

It is noted that the selection of either one of the ON/OFF-control-valve combination controls I, II corresponds to a case in which the pressure-increasing linear control valve 112, pressure-reducing linear control valve 116, pressure-increasing ON/OFF control valve 114 and pressure-reducing linear control valve 118 are selected as the controlled valves, and that the selection of the linear-control-valve individual control corresponds to a case in which the pressure-increasing linear control valve 112 and pressure-reducing linear control valve 116 are selected as the controlled valves.

The above-described requirements determined depending on the type of the control are requirements determined depending on type of the brake-cylinder hydraulic-pressure control. The above-described requirements are determined depending on, for example, purpose of execution of the control such as an emergency assist control, a normal operation control and a slip control, and are inherent to the control.

The requirements include, for example, a required accuracy, a required response speed and a required vibration-suppression level, which will be hereinafter referred to as a control-type-dependent required accuracy, a control-type-dependent required response speed and a control-type-dependent required vibration-suppression level, respectively.

The requirements specifically determined in the hydraulic pressure control are specific requirements which relate to a change of the brake-cylinder hydraulic pressure (i.e., hydraulic pressure in the common passage 102) and which are determined depending on, for example, a value of the target hydraulic pressure in the brake cylinder (common passage), a gradient of change of the target hydraulic pressure with respect to time and a control accuracy of the target hydraulic pressure. The requirements include, for example, the required accuracy and the required accuracy, which will be hereinafter referred to as a particular required accuracy and a particular required flow rate, respectively.

The particular required flow rate is determined based on the target hydraulic pressure, a rate of change of the target hydraulic pressure and a characteristic of change of the brake-cylinder hydraulic pressure which is shown in FIG. 4 (c). The target hydraulic pressure is set to a value corresponding to the required hydraulic braking torque, as described above, when the regenerative cooperative control is executed, and is set to a value determined based on an operation state of the brake pedal 60 operated by the vehicle operator, namely, based on values detected by the stroke sensor 160 and the master-cylinder pressure sensor 162, when the regenerative cooperative control is not executed. Since the total required braking torque is determined based on the operation state of the brake pedal 60 operated by the vehicle operator even when the regenerative cooperative control is executed, it can be considered that the target hydraulic pressure is determined based on an intention of the vehicle operator.

There are a case in which the particular required flow rate and the particular required accuracy are the same as the control-type-dependent required response speed and the control-type-dependent required accuracy, respectively, and also a case in which the particular required flow rate and the particular required accuracy are different from the control-type-dependent required response speed and the control-type-dependent required accuracy, respectively.

Hereinafter, the boundary lines, the linear-control-valve individual control and the ON/OFF-control-valve combination controls I, II will be described.

(1-1) Determination of Boundary Line

As described above, in each of the linear control valves 112, 116, a position of the valve body 120 relative to a position of the valve seat 122 is dependent on a relationship among the pressure-difference-based force Fp (based on the high/low pressure difference), the electromagnetic driving force Fd and the biasing force Fs of the spring 124. That is, the opening degree (opening area) of each of the linear control valves 112, 116 is dependent on the relationship among the pressure-difference-based force Fp, electromagnetic driving force Fd and biasing force Fs. The allowable flow rate of the working fluid in each of the linear control valves 112, 116 is dependent on the opening area, high/low pressure difference and the like. The maximum flow rate of the working fluid in each of the linear control valves 112, 116 is a predetermined value that is inherent to construction of each of the valves 112, 116. The maximum flow rate in each of the linear control valves 112, 116 corresponds to a flow rate of the working fluid allowable in each of the valves 112, 116 when the pressure difference between the high-pressure side and low-pressure side is maximized and the electric current is supplied to the solenoid 126 by a maximum amount, namely, when the opening area in each of the valves 112, 116 is maximized and the pressure difference is maximized. A maximum value of the pressure difference in the pressure-increasing linear control valve 112 is determined depending on, for example, capacity of the power-operated hydraulic-pressure generating device 64, while a maximum value of the pressure difference in the pressure-reducing linear control valve 116 is determined depending on the brake-cylinder hydraulic pressure. The maximum flow rate $q_{max}$ in each of the linear control valves 112, 116 is a theoretically establishable maximum flow rate, i.e., a flow rate establishable when the pressure difference is maximized, and is represented by one-dot chain line in FIG. 8.

When the particular required flow rate is higher than the maximum flow rate $q_{max}$ in each of the linear control valves 112, 116, the required flow rate cannot be established in each of the valves 112, 116.

On the other hand, by activating not only the linear control valve 112 or 116 but also the ON/OFF control valve 114 or 118, it is possible to establish the particular required flow rate that exceeds the maximum flow rate $q_{max}$.

However, if the control of the ON/OFF control valve 114 or 118 is initiated when the particular required flow rate has exceeded the maximum flow rate $q_{max}$, there is an undesirable risk that the control could be discontinuous. Further, as described above, there is a case in which the maximum flow rate qmax cannot be established in each of the linear control valves 112, 116, for example, depending on the hydraulic pressure in the common passage 102.

When the control of the ON/OFF control valve 114 or 118 is initiated, it is common that there are caused problems such as increase of the operational noise and increase of the vibration. Further, reduction of the control accuracy is undeniable. Therefore, there is a case in which it is undesirable that the control of the ON/OFF control valve 114 or 118 is initiated when the particular required flow rate can be established by the linear control valve 112 or 116 without the ON/OFF control valve 114 or 118.

On the other hand, there is a case in which the vehicle operator or passenger does not mind the operational noise or vibration, depending on the operational state of the hydraulic brakes 40, 50. Further, there are a case in which a high accuracy is not required in control of the hydraulic pressure due to the control purpose, a case in which a high responsiveness is required and a case in which the control of each of the ON/OFF control valves 114, 118 is initiated at an early stage.

In the present embodiment, there are prepared a plurality of predetermined boundary lines each of which divides a two-dimensional surface of the particular required accuracy and the particular required flow rate, into a linear-control-valve individual control region and an ON/OFF-control-valve combination control region, such that one of the plurality of boundary lines is selected based on the control-type-dependent requirement or requirements (including at least one of the control-type-dependent required vibration-suppression level, control-type-dependent required response speed, control-type-dependent required accuracy and the like).

Then, it is judged, based on the selected boundary line, whether the particular requirement (i.e., combination of the particular required accuracy and the particular required flow rate) falls in the linear-control-valve individual control region or in the ON/OFF-control-valve combination control region, so that the selection of the controlled valve or valves (i.e., selection of the control) is made.

It is noted that, as shown in FIG. 8, each of the boundary lines is a line indicating that the particular required flow rate is increased with increase of the particular required accuracy, and that the ON/OFF-control-valve combination control region is located on one of opposite sides of each of the boundary lines on which the particular required flow rate is higher while the linear-control-valve individual control region is located on the other of the opposite sides of each of the boundary lines on which the particular required flow rate is lower.

It is considered that a highly accurate control is required when a normal braking operation (i.e., non-emergency operation) is executed, because the vehicle operator wishes to obtain a braking force as required by the operator. Further, it is considered that generation of the operational noise and vibration is undesired and that a considerably high responsiveness is not required.

In view of the above, it is considered that, during execution of the normal operation control, the control-type-dependent required vibration-suppression level and the control-type-dependent required accuracy are high while the control-type-dependent required response speed is low (slow). Therefore, the boundary line is determined as indicated by solid line, so that the linear-control-valve individual control region is widened whereby the ON/OFF-control-valve combination control becomes harder to be initiated.

The emergency-operation assist control is executed when an emergency operation is carried out by the vehicle operator, and rapidly requires a large braking force. In this case, it is considered not inconvenient that the operational noise and vibration are generated, and it is considered that the high responsiveness is desired. Further, it is considered that the high accuracy is not required.

In view of the above, it is considered that, during execution of the emergency-operation assist control, the control-type-dependent required vibration-suppression level and the control-type-dependent required accuracy are low while the control-type-dependent required response speed is high (fast). Therefore, the boundary line is determined as indicated by broken line, so that the ON/OFF-control-valve combination control region is widened whereby the ON/OFF-control-valve combination control becomes easier to be initiated.

The anti-lock control is a control which is to be executed, based on a state of slipping of each tire and a road surface, such that the brake-cylinder hydraulic pressure is reduced and increased in a manner that enables the slipping state to become suitable in relation with a friction coefficient of the road surface. The execution of the anti-lock control is initiated upon satisfaction of a predetermined initiation condition. This predetermined initiation condition is satisfied, for example, when the slipping is excessively increased. The execution of the anti-lock control is terminated upon satisfaction of a predetermined anti-lock control terminating condition. This terminating condition is satisfied, for example, when the vehicle has been stopped or when the brake pedal 60 has been released. Further, a suitable one of a pressure-reducing mode, a pressure-increasing mode and a pressure-holding mode is established based on, for example, a degree of the slipping.

In the anti-lock control, the hydraulic pressure in each of the brake cylinders 42, 52 is reduced and increased by using the pressure reducing valve 106 and pressure increasing valve 103 which are provided from the anti-lock control, so that the hydraulic pressure in each of the brake cylinders 42, 52 is influenced by the hydraulic pressure in the common passage 102 upon increase of the hydraulic pressure in each of the brake cylinders 42, 52, and so that the hydraulic pressure in each of the brake cylinders 42, 52 is not influenced by the hydraulic pressure in the common passage 102 upon reduction of the hydraulic pressure in each of the brake cylinders 42, 52.

In view of the above, it is considered that the requirements required in the anti-lock control are intermediate between the requirements required in the normal operation control and the requirements required in the emergency-operation assist control, with respect to the control-type required vibration-suppression level, control-type-dependent required accuracy and control-type-dependent required response speed. Therefore, the boundary line is determined as indicated by two-dot chain line.

The above-described boundary lines are represented by information, which is pre-stored as a table in the ROM of the brake ECU.

Figure 9:
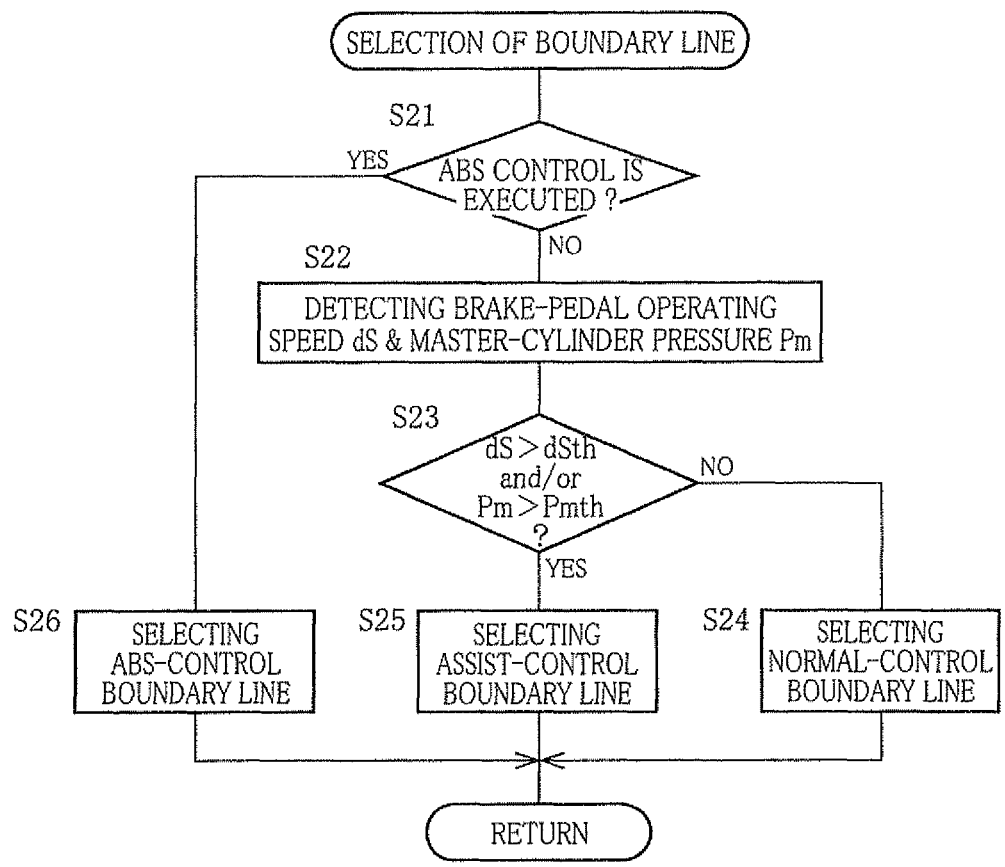
FIG. 9 is a flow chart showing a part (S3: selection of a boundary line) of the above-described controlled-valve selecting program.

A boundary-line selecting routine of step S3 is represented by a flow chart of FIG. 9.

In step S21, it is judged whether the anti-lock control is being executed or not. This judgment is made, for example, by seeing whether ABS flag is being set or not.

When the anti-lock control is not being executed, step S22 is implemented to judge whether the operation applied to the brake pedal 60 by the vehicle operator corresponds to an emergency operation or not. In the present embodiment, an operating speed dS of the brake pedal 60 and an operating force Pm applied to the brake pedal 60 are obtained based on values detected by the stroke sensor 160 and the master-cylinder pressure sensor 162. In step S23, it is judged whether the operating speed dS is higher than an abrupt-operation judgment threshold value dSth or not, and it is also judged whether the operating force Pm is larger than an emergency-operation judgment threshold value Pmth or not. When it is judged that the operating speed dS is higher than the abrupt-operation judgment threshold value dSth and/or it is judged that the operating force Pm is larger than the emergency-operation judgment threshold value Pmth, it is judged that an emergency operation is being carried out.

When the emergency operation is not being carried out, a normal operation control is executed. To this end, step S24 is implemented to select a normal-operation-control boundary line (solid line).

On the other hand, when it is judged that the operating speed dS is higher than the abrupt-operation judgment threshold value dSth and/or it is judged that the operating force Pm is larger than the emergency-operation judgment threshold value Pmth, an emergency-operation assist control is executed. To this end, step S25 is implemented to select an assist-control boundary line (broken line).

Further, when the ABS flag is being set, step S26 is implemented to select an anti-lock control boundary line (one-dot chain line).

(1-2) Region Judgment during Normal Operation Control

Although it can be regarded that the requirement (particular required accuracy) for accuracy in controlling the hydraulic pressure in the common passage 102 (hydraulic pressure in each of the brake cylinders 42, 52) is always high during execution of the normal operation control, it is also possible to consider that the particular required accuracy is determined depending on the operating speed of the brake pedal 60. It is noted that, although the operating speed of the brake pedal 60 has, in principle, one-to-one correspondence with the required flow rate, there is a case in which the operating speed of the brake pedal 60 does not have one-to-one correspondence with the required flow rate during execution of the regenerative cooperative control.

FIG. 10 (a) is a flow chart showing, by way of example, a routine which is implemented in step S4, during execution of the normal operation control, for obtaining the particular required accuracy and the particular required flow rate.

In step S41, a target hydraulic pressure Pref is obtained. In step S42, a target-hydraulic-pressure change rate dPref is obtained. In step S43, a particular required flow rate q is obtained based on the target hydraulic pressure Pref, the target-hydraulic-pressure change rate dPref and the brake-cylinder hydraulic-pressure change characteristic shown in FIG. 4 (c). That is, a required fluid amount ΔQ (change amount ΔQ of fluid) which is required in the brake cylinder is obtained based on the brake-cylinder hydraulic-pressure change characteristic, target hydraulic pressure Pref and actual hydraulic pressure P* at the current point of time, and then the particular required flow rate q is obtained based on the required fluid amount ΔQ and the target-hydraulic-pressure change rate dPref.

In step S44, it is judged, based on a value detected by the stroke sensor 160, whether or not the operating speed dS is higher than an initial-operation judgment threshold value $dSth_0$, and it is also judged whether or not a master-cylinder hydraulic pressure (corresponding to the brake operating force) Pm as a value detected by the master-cylinder pressure sensor 162 is lower than an initial-hydraulic-pressure judgment threshold value $Pth_0$. The initial-operation judgment threshold value $dSth_0$ is a value lower than the abrupt-operation judgment threshold value dSth. These conditions are satisfied in an initial-braking-operation state. When a positive judgment (YES) is obtained in step S44, the control flow goes to step S45 in which it is detected that the particular required accuracy is low. During the initial-braking-operation state, it is not inconvenient that the hydraulic-pressure control accuracy is low but it is desirable that the actual hydraulic pressure reaches rapidly the target hydraulic pressure.

On the other hand, when a negative judgment (NO) is obtained in step S44, the control flow goes to step S46 in which it is judged whether the operating speed dS is lower than a slow-operation judgment threshold value $dSth_1$ that is lower than the initial-operation judgment threshold value $dSth_0$. The operating speed dS is lower than the slow-operation judgment threshold value $dSth_1$, for example, when the brake operation state is held unchanged. When the brake operation state is held unchanged (i.e., when the operating stroke distance and the operating force are held substantially constant), it is considered desirable that the brake-cylinder hydraulic pressure is accurately controlled, so that the control flow goes to step S47 in which it is regarded that the particular required accuracy is high. Further, when the operating speed dS is not lower than the slow-operation judgment threshold value $dSth_1$, the control flow goes to step S48 in which it is regarded that the particular required accuracy is intermediate.

Thus, during the normal operation control, the particular required accuracy is determined based on the operating speed dS and the operating force Pm, and the required flow rate is determined based on, for example, the target-hydraulic-pressure change rate.

It is judged which one of the regions (defined by the normal-operation-control boundary line represented by the solid line in FIG. 8) the combination of the particular required accuracy and particular required flow rate falls in, namely, it is judged whether the combination of the combination of the particular required accuracy and particular required flow rate falls in the linear-control-valve individual control region or in the ON/OFF-control-valve combination control region. In an initial braking state, since the particular required accuracy is low, the ON/OFF-control-valve combination control is selected when the particular required flow rate exceeds the boundary line, so that it can be considered that the ON/OFF-control-valve combination control I is easily executed.

When the brake operation state is held unchanged, since the particular required accuracy is high, the particular required flow rate is, commonly, on a lower side of the boundary line, so that it can be considered that the ON/OFF-control-valve combination control I is hard to be selected and that the linear-control-valve individual control is easy to be selected. Described more precisely, the ON/OFF-control-valve combination control II is selected, if the delay is large even when the combination falls in the linear-control-valve individual control region.

In the other case, the particular required accuracy is intermediate, so that the ON/OFF-control-valve combination control I is selected when the particular required flow rate exceeds the boundary line.

When the regenerative cooperative control is executed, at an initial braking stage, since the required braking torque based on an intention of the vehicle operator is obtained mainly by the regenerative braking torque, it can be considered that the braking torque acting on each of the wheels 2, 4 is a little influenced by the control executed for controlling the hydraulic pressure in the common passage 102. However, at the initial braking stage, there is a case in which the hydraulic brakes 40, 50 are activated (total required braking torque=required hydraulic braking torque), for supplying the working fluid to the brake cylinders 42, 52 in advance, so as to reduce a braking delay due to, for example, a delay in activation of regenerative braking, and so as to reduce a delay in activation of each of the hydraulic brakes 40, 50 when the activation of each of the hydraulic brakes 40, 50 is initiated in the regenerative cooperative control. Thus, at the initial braking stage, it is effective to cause the ON/OFF-control-valve combination control I to be easily executed so as to rapidly increase the hydraulic pressure in the common passage 102 and to supply the hydraulic pressure to the brake cylinders 42, 52.

It is noted that, if the present embodiment is applied to the hydraulic brake system in which the regenerative cooperative control is not executed, it is possible to reduce a braking initiation delay and to enable the hydraulic brakes 40, 50 to be rapidly activated.

Further, also in the hydraulic brake system in which the regenerative cooperative control is executed, the present embodiment is effective when a sufficient regenerative braking torque cannot be obtained, for example, due to condition of the storage device 22.

Further, the method of obtaining the degree of the particular required accuracy in the normal operation control is not limited to the above details, so that it can be also considered that the particular required accuracy is always high. FIG. 10 (*b*) is a flow chart showing, by way of example, a case in which it can be considered that the particular required accuracy is always high. In the present embodiment, during execution of the normal operation control, it is regarded in step S49 that the particular required accuracy is high always (irrespective of whether the operating speed and operating force are large or small). It is judged, based on the particular required flow rate, which one of the linear-control-valve individual control and the ON/OFF-control-valve combination control should be executed. In this case, it is considered that the ON/OFF-control-valve combination control is hard to be selected.

Further, the particular required accuracy may be obtained as a value which is gradually reduced with increase of a rate of change of the operating stroke distance of the brake pedal 60.

Figure 11:
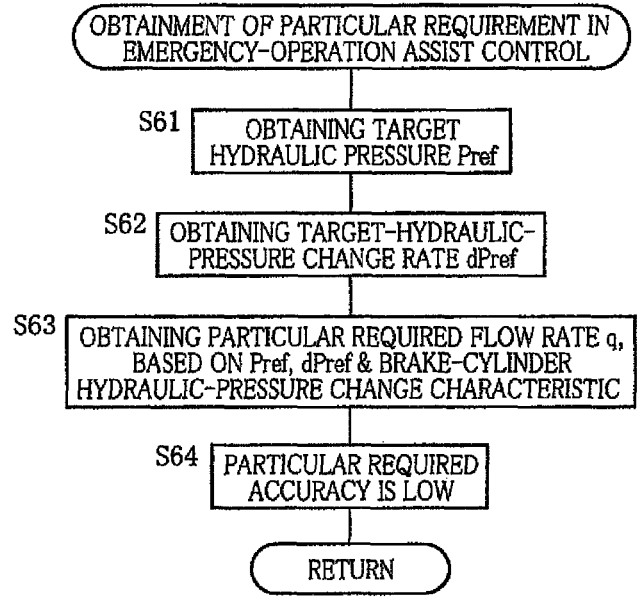
FIG. 11 is a flow chart showing a part (S4: obtainment of the particular required accuracy and the particular required flow rate during an emergency-operation assist control) of the above-described controlled-valve selecting program.

(1-3) Obtainment of Particular Requirement in Emergency-Operation Assist Control FIG. 11 is a flow chart showing, by way of example, obtainment of the particular required accuracy and particular required flow rate in step S4 during the emergency-operation assist control.

In step S61, the target hydraulic pressure Pref is obtained. In step S62, the target-hydraulic-pressure change rate dPref is obtained. In step S63, the particular required flow rate is obtained. Further, in step S64, it is regarded that the particular required accuracy is low. In this case, the particular required accuracy and the control-type-dependent required accuracy are same as each other.

As shown in FIG. 8, in the emergency-operation assist control, the assist-control boundary line represented by the broken line is determined. Since the particular required accuracy is low, the ON/OFF-control-valve combination control is easy to be selected even if the particular required flow rate is low.

(1-4) Obtainment of Particular Requirement in Anti-Lock Control

During execution of the anti-lock control, although the hydraulic pressure in the common passage 102 may be controlled to either a value irrespective of the operation state established by the vehicle operator or a value dependent on the operation state, the hydraulic pressure in the common passage 102 is controlled to become close to the target hydraulic pressure that is determined depending on the operation state established by the vehicle operator in the present embodiment. However, since the brake-cylinder hydraulic pressure is not directly determined by the hydraulic pressure in the common passage 102, it is considered that the particular required accuracy is intermediate. Further, although the particular required flow rate can be obtained substantially in the same manner as in the execution of the normal operation control, the particular required flow rate may be a value that is dependent on the target-hydraulic-pressure change rate dPref. This is because the hydraulic pressure in the common passage 102 is not necessarily supplied to each of the brake cylinders 42, 52 without the hydraulic pressure being changed.

Figure 12:
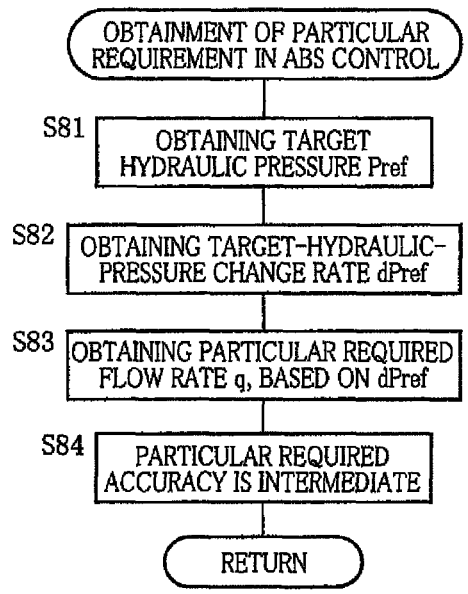
FIG. 12 is a flow chart showing a part (S4: obtainment of the particular required accuracy and the particular required flow rate during an anti-lock control) of the above-described controlled-valve selecting program.

In the present embodiment, the obtainment of the particular requirement in step S4 during execution of the anti-lock control is made by executing an anti-lock-control particular-requirement obtaining routine represented by flow chart of FIG. 12 (*a*).

In steps S81 and S82, the target hydraulic pressure Pref and the change rate dPref of the target hydraulic pressure are obtained. Then, in step S83, the particular required flow rate q is obtained based on the change rate dPref of the target hydraulic pressure. Further, in step S84, it is regarded that the particular required accuracy is intermediate.

During the anti-lock control, it is judged which one of the linear-control-valve individual control region and ON/OFF-control-valve combination control region (which are separated by the boundary line represented by two-dot chain line) the combination of the particular required accuracy and the particular required flow rate falls in. That is, the judgment as to whether the linear-control-valve individual control or the ON/OFF-control-valve combination control should be executed is made based on the particular required accuracy and the particular required flow rate.

The method of obtaining the degree of the particular required accuracy and the particular required flow rate in the anti-lock control is not limited to the above details. There are a case in which the anti-lock control is executed when the vehicle is running on a road surface having a high friction coefficient and a case in which the anti-lock control is executed when the vehicle is running on a road surface having a low friction coefficient. It is common that the brake-cylinder hydraulic pressure is increased to become closer to the hydraulic pressure in the common passage 102 during the pressure-increasing control when the anti-lock control is executed with the vehicle running on the high-friction-coefficient road surface, than when the anti-lock control is executed with the vehicle running on the low-friction-coefficient road surface. Therefore, when the vehicle is running on the high-friction-coefficient road surface, it is desirable that the hydraulic pressure in the common passage 102 is controlled to be close to the target hydraulic pressure Pref. On the other hand, when the vehicle is running on the low-friction-coefficient road surface, the brake-cylinder hydraulic pressure is increased by a small amount during the pressure-increasing control, so that it is not inconvenient that the hydraulic pressure in the common passage 102 is lower than the target hydraulic pressure.

In view of the above, when the vehicle is running on the high-friction-coefficient road surface, the particular required flow rate q is set to a value (q=dPref·K) dependent on the target-hydraulic-pressure change rate dPref. When the vehicle is running on the low-friction-coefficient road surface, the particular required flow rate q may be set to a value (q=dPref·K*) (K>K*) which is lower than when the vehicle is running on the high-friction-coefficient road surface, even without change of the target-hydraulic-pressure change rate dPref.

Further, it may be regarded that the particular required accuracy is high when the hydraulic pressure is increased, and that the particular required accuracy is low when the hydraulic pressure is reduced or held unchanged.

The required response speed and the like of the brake-cylinder hydraulic pressure in the anti-lock control are determined mainly depending on the controls of the pressure increasing valves 103 and the pressure reducing valves 106, and are a little influenced by the control of the hydraulic pressure in the common passage 102. Therefore, it is considered that there is a low need of execution of the ON/OFF-control-valve combination control during execution of the anti-lock control. Thus, it is also possible to inhibit execution of the ON/OFF-control-valve combination control during execution of the anti-lock control.

In the present embodiment, the hydraulic-pressure control device is constituted principally by the brake ECU 56 and the drive circuits 172, 174. A required-response-speed-based selecting portion and a required-accuracy-based selecting portion are constituted principally by portions of the hydraulic-pressure control device which are assigned to store and implement steps S2-S5 of the controlled-valve selecting program. An ON/OFF-control-valve-combination-control selecting portion is constituted principally by portions of the hydraulic-pressure control device which are assigned to store and implement steps S5 and S6 of the controlled-valve selecting program.

(1-5) Others

Although the control region is determined as described above in the present embodiment, the manner of determination of the control region is not limited to the above details.

For example, when the boundary line is to be determined, it is possible to consider the target hydraulic pressure Pref or actual hydraulic pressure P* in the common passage 102 (or in each of the brake cylinders 42, 52) and the direction of the control of the brake-cylinder hydraulic pressure (i.e., whether it is the pressure-increasing control or pressure-reducing control). The flow rate of the working fluid, which is allowed in the pressure-increasing linear control valve 112, is reduced when the hydraulic pressure in the common passage 102 is increased and accordingly the high/low pressure difference (i.e., the pressure difference between the high-pressure side and the low-pressure side) is reduced, because the opening degree of the valve 102 is reduced even with the electromagnetic driving force Fd being held unchanged. On the other hand, the flow rate of the working fluid, which is allowed in the pressure-reducing linear control valve 116, is increased when the hydraulic pressure in the common passage 102 is increased and accordingly the high/low pressure difference is increased, because the opening degree of the valve 116 is increased.

Figure 23:
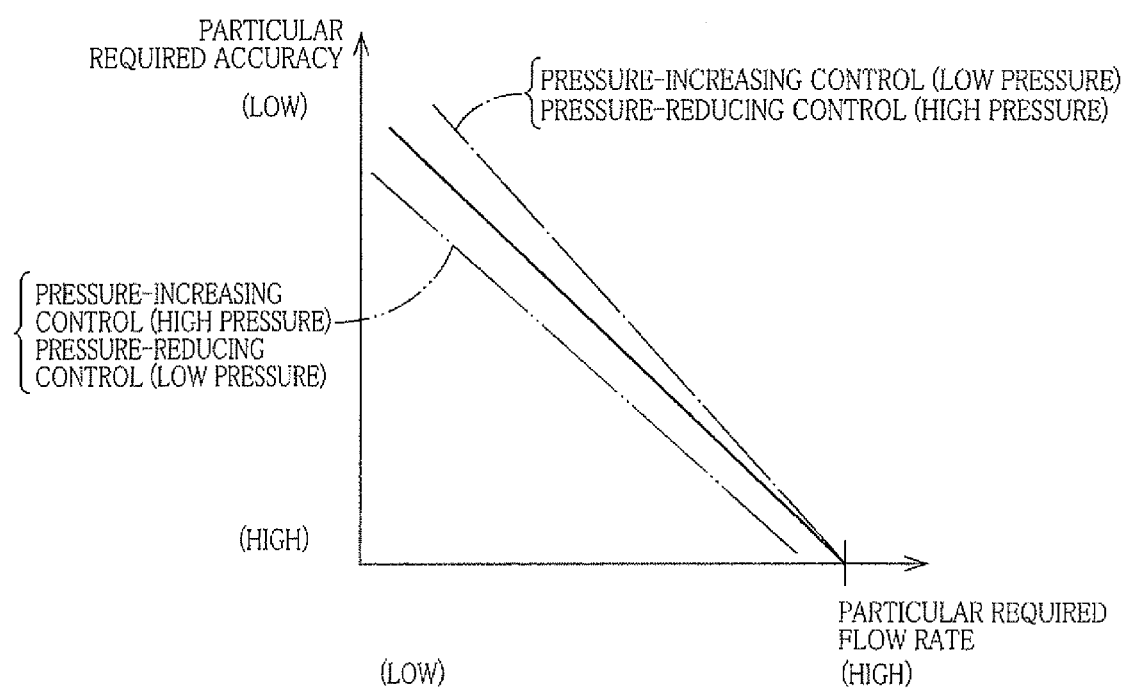
FIG. 23 is a view conceptually showing another control-region determining table stored in the storage portion of the above-described brake ECU.

FIG. 23 is a view showing a manner of determination of the boundary line with the above being taken into account.

In this embodiment, during execution of the pressure-increasing control, when the target hydraulic pressure Pref or actual hydraulic pressure P* (hereinafter abbreviated to as hydraulic pressure or the like where appropriate) in the common passage 102 is high, the boundary line represented by two-dot chain line is selected since the maximum flow rate in the pressure-increasing linear control valve 112 is reduced. When the hydraulic pressure or the like Pref, P* is low, the boundary line represented by one-dot chain line is selected since the maximum flow rate in the valve 112 is increased.

During execution of the pressure-reducing control, when the hydraulic pressure or the like Pref, P* in the common passage 102 is high, the boundary line represented by one-dot chain line is selected since the maximum flow rate in the pressure-reducing linear control valve 116 is increased. When the hydraulic pressure or the like Pref, P* is low, the boundary line represented by two-dot chain line is selected.

This manner of determination of the boundary line may be applied equally in the normal operation control, emergency-operation assist control and anti-lock control.

Further, in a case in which the particular required flow rate is not higher than a threshold value that is determined based on the hydraulic pressure or the like Pref, P* in the common passage 102 and at least one of the control-type-dependent required accuracy and control-type-dependent required response speed, it may be regarded that this case falls in the linear-control-valve individual control region. In a case in which the particular required flow rate is higher than the threshold value, it may be regarded that this case falls in the ON/OFF-control-valve combination control region. In this embodiment, the required flow rate is compared with the threshold value that separates the linear-control-valve individual control region and the ON/OFF-control-valve combination control range from each other (one-dimensional).

Figure 24:
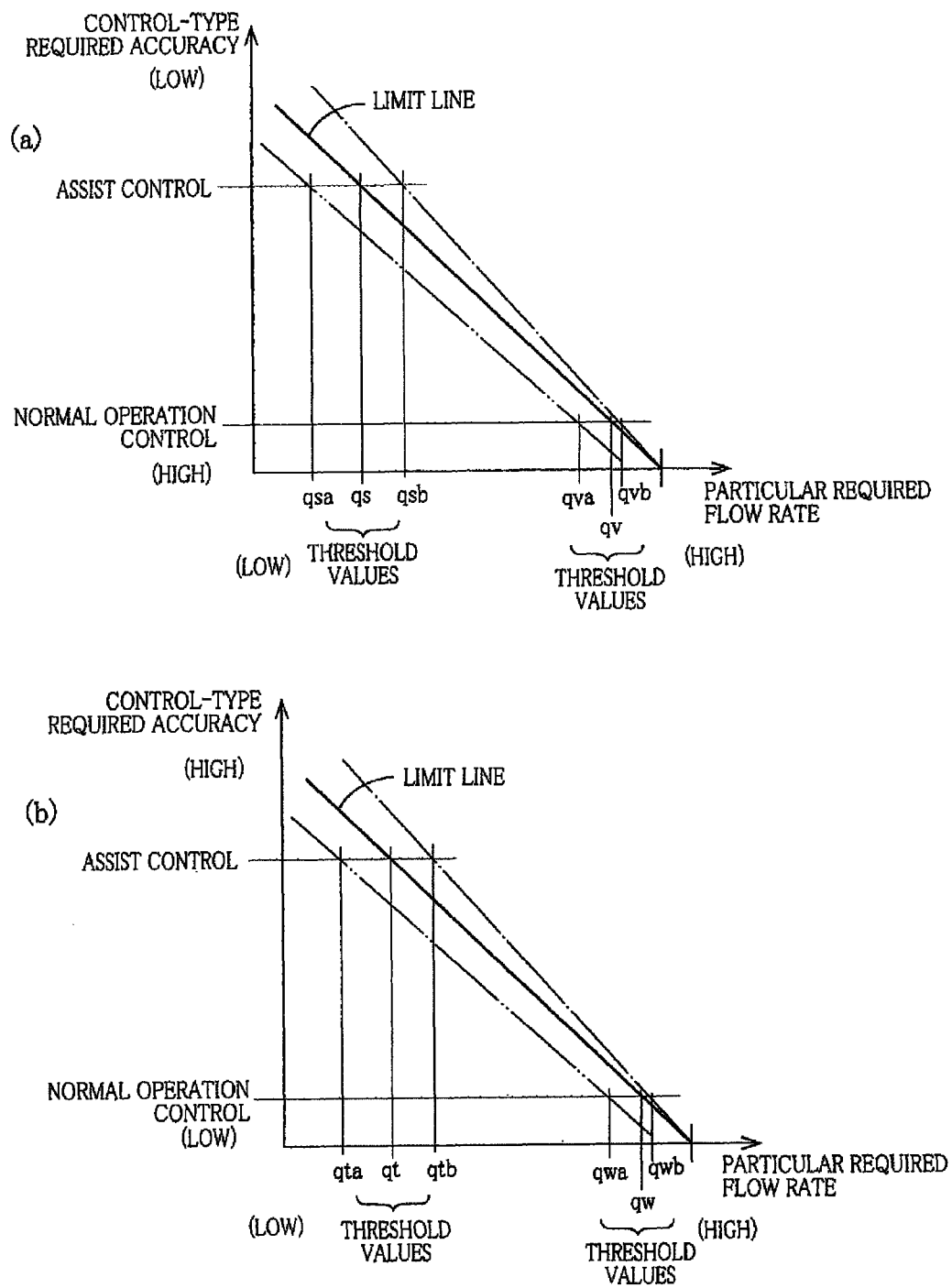
FIG. 24 is a set of maps conceptually showing particular-required-flow-rate-based threshold-value determining tables stored in the storage portion of the above-described brake ECU.

FIG. 24 shows this embodiment by way of example.

A solid line shown in each of FIG. 24 (a), (b) represents a predetermined limit line of a region in which the hydraulic pressure in the common passage 102 is controllable by only the linear control valves 112, 116 while the control-type-dependent requirement is satisfied. The solid line shown in FIG. 24 (a) is the limit line that is determined such that the control-type-dependent required accuracy can be realized in the region defined by the limit line. The solid line shown in FIG. 24 (b) is the limit line that is determined such that the control-type-dependent required response speed can be realized in the region defined by the limit line. A two-dot chain line shown in each of FIG. 24 (a), (b) represents a limit line of the region when the hydraulic pressure or the like Pref, P* in the common passage 102 is high during execution of the pressure-increasing control, and also a limit line of the region when the hydraulic pressure or the like Pref, P* in the common passage 102 is low during execution of the pressure-reducing control. An one-dot chain line shown in each of FIG. 24 (a), (b) represents a limit line of the region when the hydraulic pressure or the like Pref, P* in the common passage 102 is low during execution of the pressure-increasing control, and also a limit line of the region when the hydraulic pressure or the like Pref, P* in the common passage 102 is high during execution of the pressure-reducing control.

According to a required-flow-rate-based threshold-value determining table shown in FIG. 24 (a), when the emergency-operation assist control is executed, the threshold value of the particular required flow rate is set to qs since the control-type-dependent required accuracy is low. Further, if the hydraulic pressure or the like Pref, P* in the common passage 102 is also taken into consideration, the threshold value will be between qsa and qsb. In a case in which the particular required flow rate q in the emergency-operation assist control is lower than the threshold value qs (which is herein referred to as "qs" although it could be a value between "qsa" and "qsb") (q<qs), it is regarded that this case falls in the linear-control-valve individual control region. In a case in which the particular required flow rate q is not lower than the threshold value qs (q≥qs), it is regarded that this case falls in the ON/OFF-control-valve combination control region. Described in detail, when the particular required flow rate q is not lower than the threshold value qs, the ON/OFF-control-valve combination control I is selected. When the particular required flow rate q is lower than the threshold value qs and the delay is large, the ON/OFF-control-valve combination control II is selected. When the particular required flow rate q is lower than the threshold value qs and the delay is not large, the linear-control-valve individual control is selected.

When the normal operation control is executed, the threshold value of the particular required flow rate is set to qv since the control-type-dependent required accuracy is high. Further, if the hydraulic pressure or the like Pref, P* in the common passage 102 is also taken into consideration, the threshold value will be between qva and qvb. In execution of the normal operation control, the particular required flow rate q is actually obtained, and the obtained particular required flow rate q is compared with the threshed value qv (which is herein referred to as "qv" although it could be a value between "qva" and "qvb"), whereby one of the linear-control-valve individual control, ON/OFF-control-valve combination control I and ON/OFF-control-valve combination control II is selected. Since the threshold value qv during execution of the normal operation control is higher than the threshold value qs during execution of the emergency-operation assist control (qv>qs), the ON/OFF-control-valve combination control I is hard to be selected during execution of the normal operation control.

According to a required-flow-rate-based threshold-value determining table shown in FIG. 24 (*b*), when the emergency-operation assist control is executed, it is regarded that the control-type-dependent required response speed is fast (high), so that a threshold value of the particular required flow rate is set to qt (or value between qta and qtb). In a case in which the particular required flow rate q in the emergency-operation assist control is lower than the threshold value qt (q<qt), it is regarded that this case falls in the linear-control-valve individual control region. In a case in which the particular required flow rate q is not lower than the threshold value (q≥qt), it is regarded that this case falls in the ON/OFF-control-valve combination control region.

When the normal operation control is executed, it is regarded that the control-type-dependent required response speed is slow (low), so that the threshold value of the particular required flow rate is set to qw (or value between qwa and qwb). Then, the particular required flow rate q is compared with the threshold value qw, whereby one of the linear-control-valve individual control, ON/OFF-control-valve combination control I and ON/OFF-control-valve combination control II is selected. Since the threshold value qw during execution of the normal operation control is higher than the threshold value qt during execution of the emergency-operation assist control (qt>qw), the ON/OFF-control-valve combination control I is hard to be selected during execution of the normal operation control.

Figure 25:
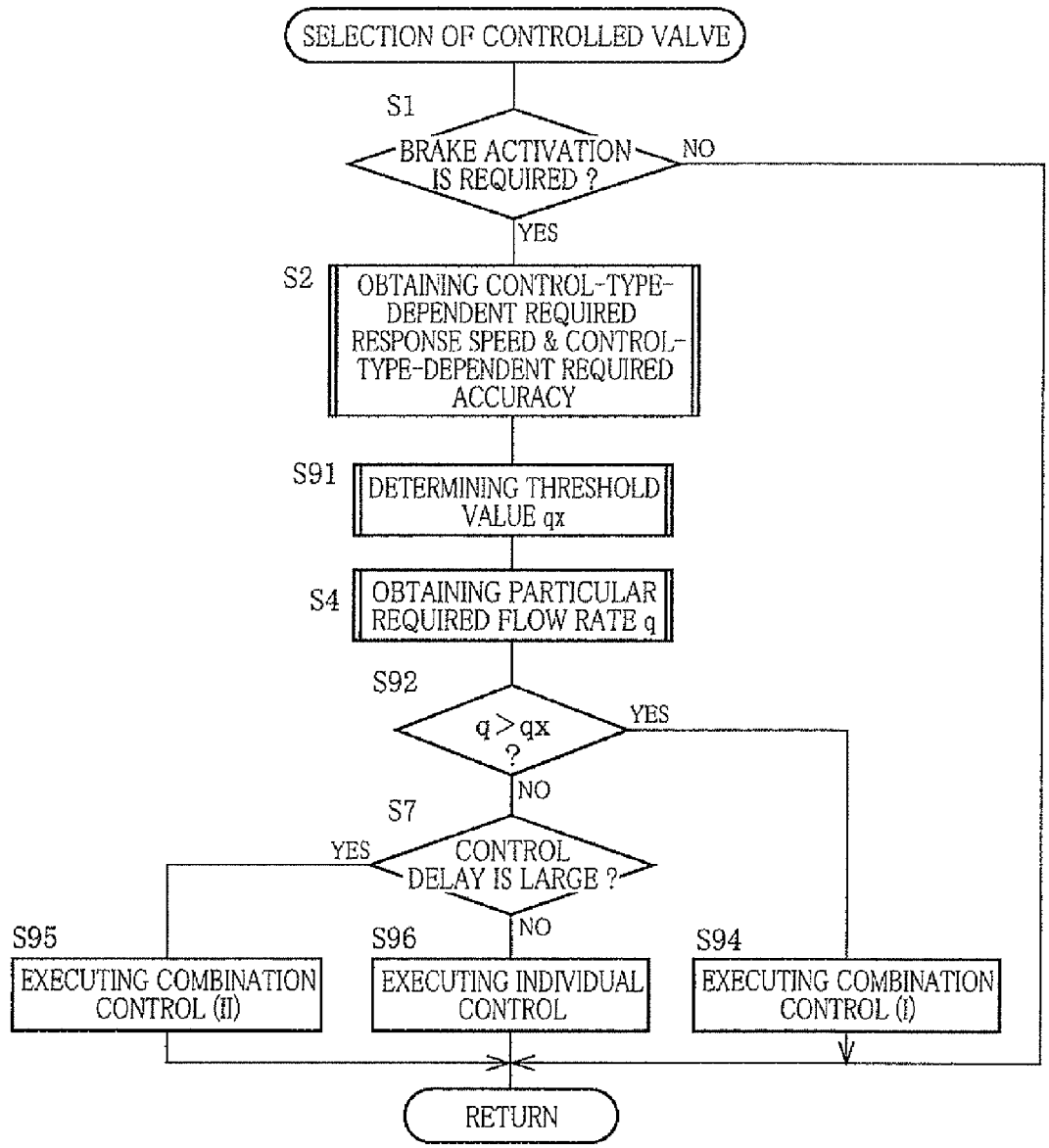
FIG. 25 is a flow chart showing another controlled-valve selecting program stored in the above-described storage portion.

FIG. 25 shows, by way of example, the controlled-valve selecting program carried out in accordance with the tables shown in FIG. 24 (*a*), (*b*).

In step S91, the threshold value qx (where x=sa–sb, ta–tb, va–vb or wa–wb) is determined as described above. In step S4, the particular required flow rate q is obtained in the same manner as in step S4 of the program of FIG. 7. Then, in step S92, the particular required flow rate q is compared with the threshold value qx. When the particular required flow rate q is not lower than the threshold value qx, the control flow goes to step S94 in which the ON/OFF-control-valve combination control I is selected. When the required flow rate q is lower than the threshold value qx, the control flow goes to step S7 in which it is judged whether the control delay is larger than a given degree or not. When the control delay is larger than the given degree, the control flow goes to step S95 in which the ON/OFF-control-valve combination control II is selected. When the control delay is not larger than the given degree, the control flow goes to step S96 in which the linear-control-valve individual control is selected.

Further, a total threshold value may be determined based on both of the control-type-dependent required accuracy and the control-type-dependent required response speed. For example, in the emergency-operation assist control, the total threshold value may be set to an average value {(qs+qt)/2} between the threshold value qs determined depending on the control-type-dependent required accuracy and the threshold value qt determined depending on the control-type-dependent required response speed. The total threshold value in the normal operation control also may be determined in the same manner {(qv+qw)/2}.

In this embodiment, by comparing the particular required flow rate with the total threshold value, one of the linear-control-valve individual control and ON/OFF-control-valve combination control is selectively executed.

Further, the methods of obtaining the control-type-dependent required accuracy, the control-type-dependent required response speed, the level of the control-type-dependent required vibration suppression, the particular required accuracy, the particular required flow rate and the like are not limited to the above details, and may be obtained according to methods other than the above details.

Further, the present invention is applicable to an arrangement in which a vehicle stability control is executed. In most cases, the vehicle stability control is executed when the brake pedal 60 is not being operated by the vehicle operator. From a point of view that the vehicle stability control should be executed without the vehicle operator noticing the execution of the vehicle stability control, it can be considered that the level of the control-type-dependent required vibration suppression and the control-type-dependent required accuracy are high during execution of the vehicle stability control. From a point of view that the vehicle stability control is a control that is to be executed in a near-critical state, it can be considered that the level of the control-type-dependent required vibration suppression is low and that the control-type-dependent required response speed is fast. By determining the boundary line or the threshold value based on these points of view, one of the linear-control-valve individual control, ON/OFF-control-valve combination control I and ON/OFF-control-valve combination control II can be selected to be executed for controlling the hydraulic pressure in the common passage.

Further, the present invention is applicable also to an arrangement in which a collision avoidance control or the like is executed. The present invention can be applied to the arrangement with execution of the collision avoidance control, for example, in the same manner as the application to the arrangement with execution of the emergency-operation assist control.

Further, the boundary line may be also a curved line.

Moreover, the boundary line may be replaced by a boundary plane dividing a three dimensional space.

(2) Linear-Control-Valve Individual Control

When the delay is small and the combination of the particular required accuracy and the particular required flow rate falls in the linear-control-valve individual control region according to the control-region judgment map shown in FIG. 8, the linear-control-valve individual control is selected (S9). When the delay is small and the particular required flow rate q is not higher than the threshold value determined in accordance with particular-required-flow-rate-based threshold-value determining maps shown in FIG. 24, the linear-control-valve individual control is selected (S96). The linear-control-valve individual control, which is a well-known control, will be described briefly.

In the present embodiment, one of the pressure-increasing mode (pressure-increasing control), pressure-reducing mode (pressure-reducing control) and pressure-holding mode (pressure-holding control) is selected based on an amount of a deviation e. In the pressure-increasing mode, the electric current supplied to the pressure-increasing linear control valve 112 is controlled while the pressure-reducing linear control valve 116 is placed in the closed state. In the pressure-reducing mode, the electric current supplied to the pressure-reducing linear control valve 116 is controlled while the pressure-increasing linear control valve 112 is placed in the closed state. In the pressure-holding mode, the pressure-increasing linear control valve 112 and the pressure-reducing linear control valve 116 are both placed in the closed states.

The supply of the electric current to the solenoid of each of the linear control valves 112, 116 is subjected to a feed-forward control and a feed-back control that are executed concurrently with each other. As shown in FIG. 13 (a), an electric current, which corresponds to a sum of a feed-forward current determined in the individual feed-forward controlling portion 190 and a feed-back current determined in the individual feed-back controlling portion 192, is applied to the solenoid of each of the linear control valves 112, 116.

As shown in FIG. 13 (b), (c), the feed-forward current IFF is set to a value corresponding to a sum of the target-hydraulic-pressure change rate dPref multiplied by a coefficient C and the valve-opening electric current Iopen at a point of time of establishment of the pressure-increasing mode or pressure-reducing mode. Regarding the pressure-increasing linear control valve 112, the high/low pressure difference upon establishment of the pressure-increasing mode is obtained, and the valve-opening electric current Iopen is obtained from the map of FIG. 3 (b). Then, the electric current dependent on the increase gradient ($Pref_1 - Pref_0$) of the target hydraulic pressure Pref is obtained, and the electric current corresponding to the above-described sum is obtained, as shown in FIG. 13 (b). Regarding the pressure-reducing linear control valve 116, the high/low pressure difference upon establishment of the pressure-reducing mode is obtained, and the valve-opening electric current Iopen is obtained from the map of FIG. 3 (b). Then, the electric current dependent on the reduction gradient ($Pref_0 - Pref_1$) of the target hydraulic pressure Pref is obtained, and the electric current corresponding to the above-described sum is obtained, as shown in FIG. 13 (c).

$$IFF = Iopen + |dPref| \cdot C$$

The feed-back current IFB is a value obtained by multiplying an absolute value ($=|Pref - P^*|$) of the deviation e by coefficients G (gains: G1, G2, G3), wherein the deviation e is a value obtained by subtracting the actual hydraulic pressure P* from the target hydraulic pressure Pref. As the feed-back control, it is possible to employ any one of P control, PI control, PID control and the like.

$$IFB = G1 \cdot |e| + G2 \cdot |de| + G3 \cdot |\int e\,dt|$$

Then, the electric current corresponding to the sum of the feed-back current IFB and the feed-forward current IFF is supplied to the pressure-increasing linear control valve 112 when the pressure-increasing mode is being established, and is supplied to the pressure-reducing linear control valve 116 when the pressure-reducing mode is being established.

In the present embodiment, a linear-control-valve individual controlling portion is constituted principally by portions of the brake ECU 56 which correspond to the individual feed-back controlling portion 192 and individual feed-forward controlling portion 190.

(3) ON/OFF-Control-Valve Combination Control I

When the combination of the particular required accuracy and particular required flow rate falls in the ON/OFF-control-valve combination control region according to the control-region judgment map shown in FIG. 8, the ON/OFF-control-valve combination control is selected (S6). Further, when the particular required flow rate q is higher than the threshold value determined in accordance with the particular-required-flow-rate-based threshold-value determining maps shown in FIG. 24, the ON/OFF-control-valve combination control I is selected (S94).

In the present embodiment, the ON/OFF-control-valve combination control I includes three controls consisting of controls A, B, C. It is possible to execute all of the three controls concurrently with each other, execute two of the three controls concurrently with each other, or execute a selected one of the controls A, B.

(3-1) Control A (Control of Linear Control Valve in ON/OFF-Control-Valve Combination Control)

The control A is a control executed for controlling the linear control valve 112 or 116 in the ON/OFF-control-valve combination control I. When not only the linear control valve 112 or 116 but also the ON/OFF control valve 114 or 118 is controlled, the linear control valve 112 or 116 is controlled in a manner different from when the linear-control-valve individual control is executed.

In the present embodiment, when the particular required flow rate upon transition from the linear-control-valve individual control region to the ON/OFF-control-valve combination control region is low, a low-responsiveness control is executed. When the particular required flow rate upon transition from the linear-control-valve individual control region to the ON/OFF-control-valve combination control region is high, a high-responsiveness control is executed.

Figure 14:
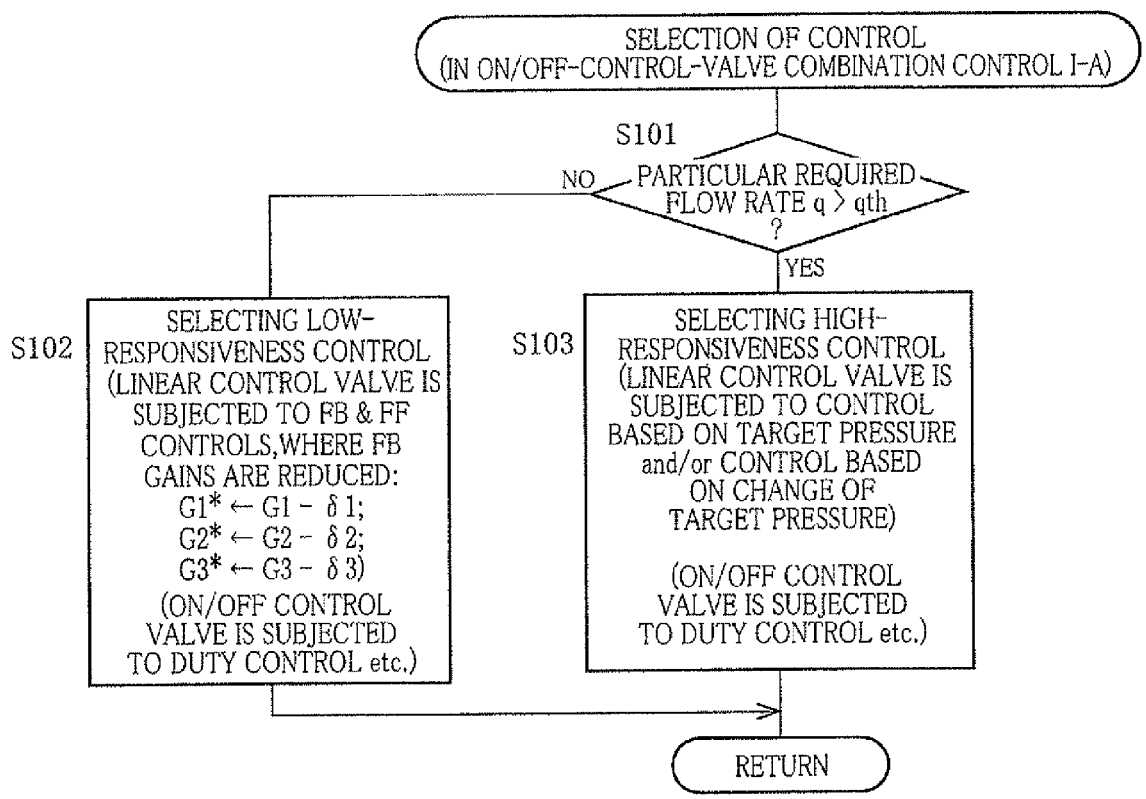
FIG. 14 is a flow chart showing a control selection program (ON/OFF-control-valve combination control I-A) stored in the above-described storage portion.

FIG. 14 is a flow chart representing a control selecting program (ON/OFF-control-valve combination control I-A) that is carried out for selecting one of the low-responsiveness control and the high-responsiveness control. The control selecting program is carried out when the ON/OFF-control-valve combination control I is initiated.

In S101, the particular required flow rate q at a point of time of initiation of the ON/OFF-control-valve combination control I is read, and it is judged whether the particular required flow rate q is higher than a high-responsiveness judgment threshold value qth. When the particular required flow rate q is not higher than the high-responsiveness judgment threshold value qth, the control flow goes to step S102 in which the low-responsiveness control is selected. When the particular required flow rate q is higher than the high-responsiveness judgment threshold value qth, the control flow goes to step S103 in which the high-responsiveness control is selected.

(3-1-1) Low-Responsiveness Control

Figure 15:
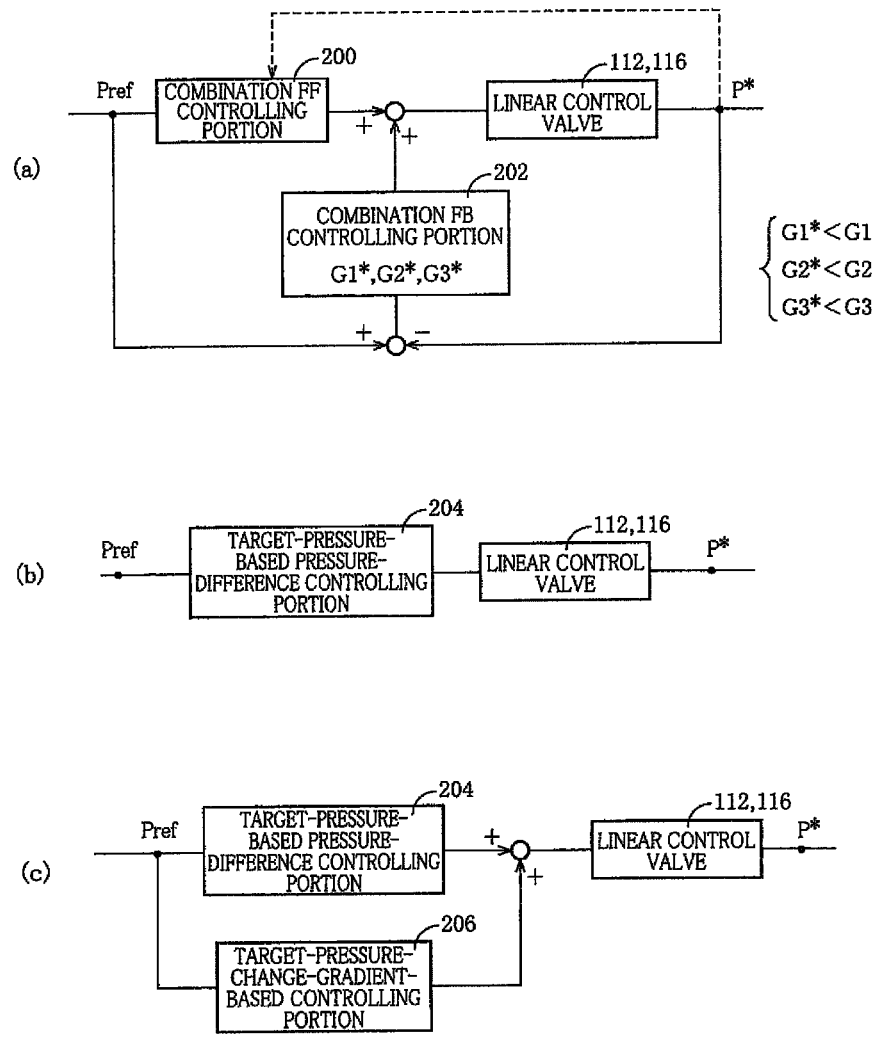
FIG. 15 (*a*) and FIG. 15 (*b*) are block diagrams showing an ON/OFF-control-valve combination controlling portion included in the above-described hydraulic brake system.

In the low-responsiveness control which is basically the same as the linear-control-valve individual control, as shown in FIG. 15 (a), the electric current corresponding to the sum of the feed-forward current obtained by the combination feed-forward controlling portion 200 and the feed-back current obtained by the combination feed-back controlling portion 202, is supplied to the linear control valve 112 or 116.

The feed-forward current is obtained in the same manner as in the linear-control-valve individual control.

Regarding the feed-back current, the gains $G1^*$, $G2^*$, $G3^*$ used in the combination feed-back controlling portion 202 are set to values which are determined based on the respective gains G1, G2, G3 used in the individual feed-back controlling portion 192 and which are smaller than the gains G1, G2, G3.

$$G1^* \leftarrow G1 - \delta 1$$

$$G2^* \leftarrow G2 - \delta 2$$

$$G3^* \leftarrow G3 - \delta 3$$

Where the ON/OFF control valve 114 or 118 is activated while the linear control valve 112 or 116 is controlled, the control of the linear control valve 112 or 116 could be disturbed by the hydraulic pressure change caused by the activation of the ON/OFF control valve 114 or 118. Therefore, it is desirable that the gain used in the feed-back control is made small. Consequently, it is possible to increase accuracy in controlling the hydraulic pressure in the common passage 102 and suppress vibration in the ON/OFF-control-valve combination control I. The ON/OFF control valves 114, 118 may be subjected to any one of the duty control, pulse control and continuous ON control.

It is noted that the gains G1*, G2*, G3* used in the combination feed-back controlling portion 202 may be larger than the gains G1, G2, G3 used in the individual feed-back controlling portion 200.

(3-1-2) High-Responsiveness Control

In the high-responsiveness control, a pressure-difference control based on the target hydraulic pressure is executed, or the target-hydraulic-pressure-based pressure-difference control and a control based on change of the target hydraulic pressure are both executed.

(3-1-2-1) Target-Hydraulic-Pressure-Based Pressure-Difference Control

The target-hydraulic-pressure-based pressure-difference control is executed in a target-hydraulic-pressure-based pressure-difference controlling portion 204 shown in FIG. 15 (b). The target-hydraulic-pressure-based pressure-difference control is a control for supplying a valve-opening electric current Iopenref to the linear control valve 112 or 116, wherein the valve-opening electric current Iopenref (hereinafter referred to as "target-pressure-difference-based valve-opening electric current" where appropriate) is based on a pressure difference ΔP between the target hydraulic pressure on the high-pressure side and the actual hydraulic pressure on the low-pressure side, or based on a pressure difference ΔP between the target hydraulic pressure on the low-pressure side and the actual hydraulic pressure on the high-pressure side. In view of characteristics of the linear control valves 112, 116, it is considered that, in principle, each of the valves 112, 116 is kept open until the actual hydraulic pressure reaches the target hydraulic pressure Pref.

For example, in the control of the pressure-increasing linear control valve 112, the pressure difference at the point of time at which the actual hydraulic pressure in the common passage 102 reaches the target hydraulic pressure in the common passage 102, is obtained by subtracting the target hydraulic pressure Pref from the value detected by the accumulator pressure sensor 164. During execution of the pressure-increasing control, since the hydraulic pressure in the common passage 102 is increased, the pressure difference is reduced whereby the valve-opening electric current is increased. In view of this, the pressure-increasing linear control valve 112 is kept open from the current point of time until the hydraulic pressure in the common passage 102 reaches the target hydraulic pressure.

In the control of the pressure-reducing linear control valve 116, the pressure difference is a value obtained by subtracting the hydraulic pressure in the reservoir 82 from the hydraulic pressure in the common passage 102, so that the target hydraulic pressure Pref corresponds to the pressure difference. During execution of the pressure-reducing control, the pressure difference is reduced with reduction of the hydraulic pressure in the common passage 102, whereby the valve-opening electric current is increased. In view of this, the pressure-reducing linear control valve 116 is kept open until the hydraulic pressure in the common passage 102 reaches the target hydraulic pressure.

(3-1-2-2) Target-Hydraulic-Pressure-Based Pressure-Difference Control and Target-Hydraulic-Pressure-Change-Based Electric-Current Control As shown in FIG. 15 (c), an electric current corresponding to a sum of the target-hydraulic-pressure-change-based electric current and the target-pressure-difference-based valve-opening electric current is supplied to the linear control valve 112 or 116. The target-pressure-difference-based valve-opening electric current Iopenref is obtained by the target-hydraulic-pressure-based pressure-difference controlling portion 204, while the target-hydraulic-pressure-change-based electric current, i.e., an electric current value (|dPref|·C) dependent on an absolute value |dPref| of change gradient of the target hydraulic pressure is obtained by a target-hydraulic-pressure-change-gradient-based controlling portion 206.

It is noted that, in any case, each of the ON/OFF control valves 114, 118 may be subjected to the duty control, pulse control or continuous ON control.

Thus, when the ON/OFF control valve 114 or 118 is additionally controlled, the manner for controlling the linear control valve 112 or 116 is changed whereby it is possible to suppress vibration caused by the additionally controlled ON/OFF control valve 114 or 118 and suppress a control hunting. Further, by additionally controlling the ON/OFF control valve 114 or 118, the actual hydraulic pressure can quickly reach the target hydraulic pressure.

It is noted that it may be judged, in step S101 of the flow chart of the control selecting program, whether the control-type-dependent required response speed is higher than the high-responsiveness judgment threshold value or not, such that step S102 is implemented when the control-type-dependent required response speed is not higher than the high-responsiveness judgment threshold value, and such that step S103 is implemented when the control-type-dependent required response speed is not higher than the high-responsiveness judgment threshold value.

(3-2) Control B (Linear-Control-Valve Priority Control and ON/OFF-Control-Valve Priority Control)

In the present embodiment, a ratio between the flow rate established in the linear control valve 112 or 116 and the flow rate established in the ON/OFF control valve 114 or 118 is determined based on the linear control valve model shown in FIG. 3 (c), the ON/OFF control valve model shown FIG. 4 (b) and the particular required accuracy. In other words, one of the linear-control-valve priority control and ON/OFF-control-valve priority control is selected.

As described above, the particular required flow rate q is obtained based on the target hydraulic pressure Pref, the target-hydraulic-pressure change rate dPref and the hydraulic-pressure change characteristic of the brake cylinder as shown in FIG. 4 (c).

For establishing the particular required flow rate q, not only the linear control valve 112 or 116 but also the ON/OFF control valve 114 or 118 is activated, such that the linear-control-valve priority control is selected when the particular required accuracy is high, and such that the ON/OFF-control-valve priority control when the particular required accuracy is low.

Figure 16:
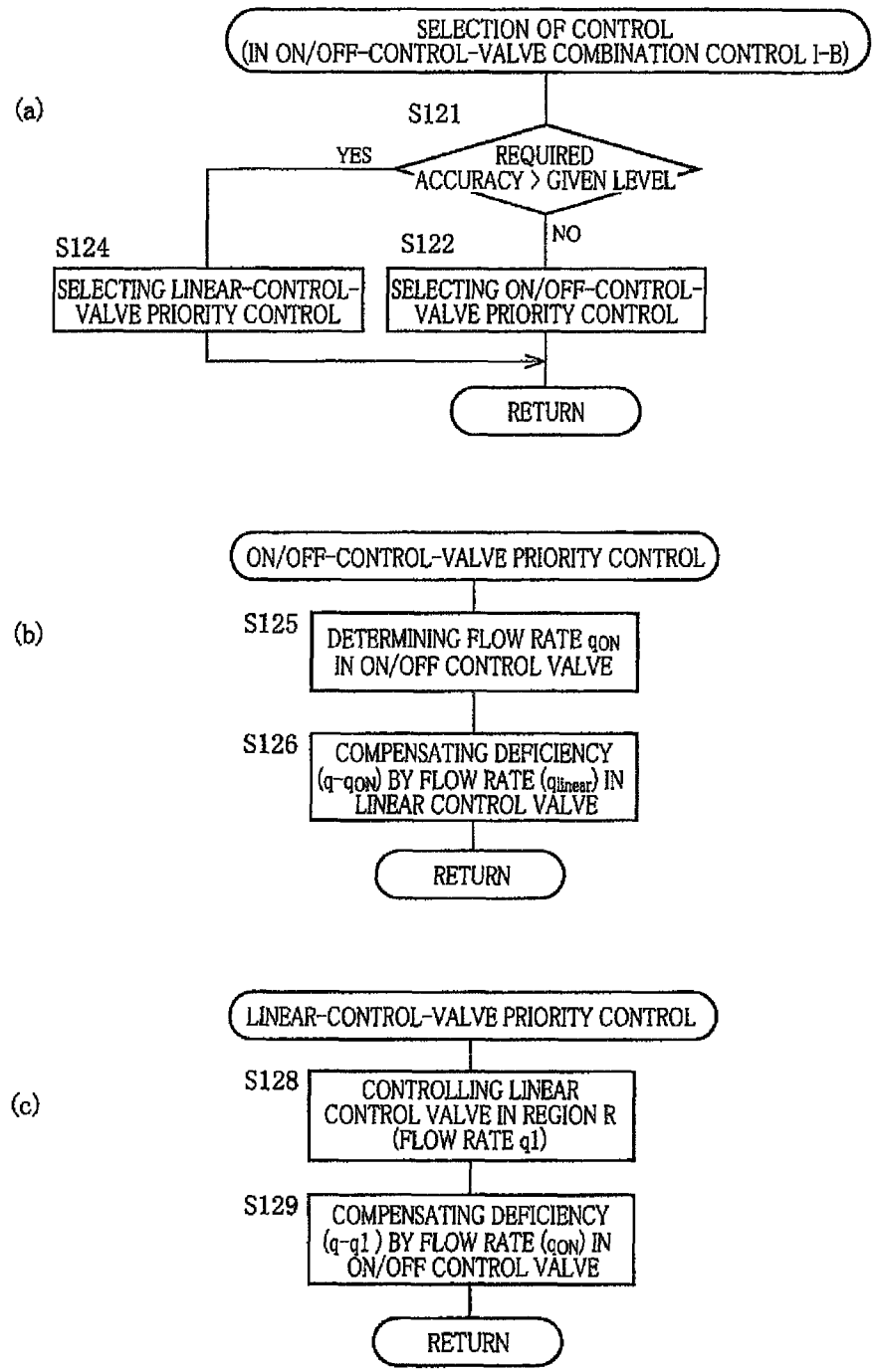
FIG. 16 (*a*) is a flow chart showing a control selecting program (ON/OFF-control-valve combination control I-B) stored in the storage portion of the above-described brake ECU.

FIG. 16 (a) is a flow chart representing a control selecting program (ON/OFF-control-valve combination control I-B) that is carried out at a predetermined time interval during execution of the ON/OFF-control-valve combination control I.

In step S121, it is judged whether the particular required accuracy is higher than a given level or not. When the particular required accuracy is not higher than the given level, the control flow goes to step S122 in which the ON/OFF-control-valve priority control is selected. When the particular required accuracy is higher than the given level, the control flow goes to step S124 in which the linear-control-valve priority control is selected.

(3-2-1) ON/OFF-Control-Valve Priority Control

An example of the ON/OFF-control-valve priority control is shown in flow chart of FIG. 16 (b).

Step S125 is implemented to determine a required flow rate qoN that is to be established in the ON/OFF control valve 114 or 118, wherein the required flow rate qoN is a maximum flow rate which is establishable in the valve 114 or 118 and which is lower than the particular required flow rate q. The required flow rate $q_{ON}$, which is to be established in the ON/OFF control valve 114 or 118, can be determined based on, for example, a flow rate unit of the ON/OFF control valve (e.g., an average flow rate where a duty ratio dependent on the ON/OFF-control-valve drive circuit 174 is a minimized value, a flow rate where the valve is placed in the ON state during one sample time in the pulse control). Then, a value of the duty ratio or a pattern of the pulse control is determined such that the determined required flow rate $q_{ON}$ is established in the ON/OFF control valve 114 or 118.

Then, in step S126, the electric current supplied to the solenoid 126 of the linear control valve 112 or 116 is controlled such that a deficiency $q_{linear}(=q-q_{ON})$ of the particular required flow rate q is compensated by the linear control valve 112 or 116.

In this case, a division ratio is represented by $q_{ON}:q_{linear}$.

Figure 17:
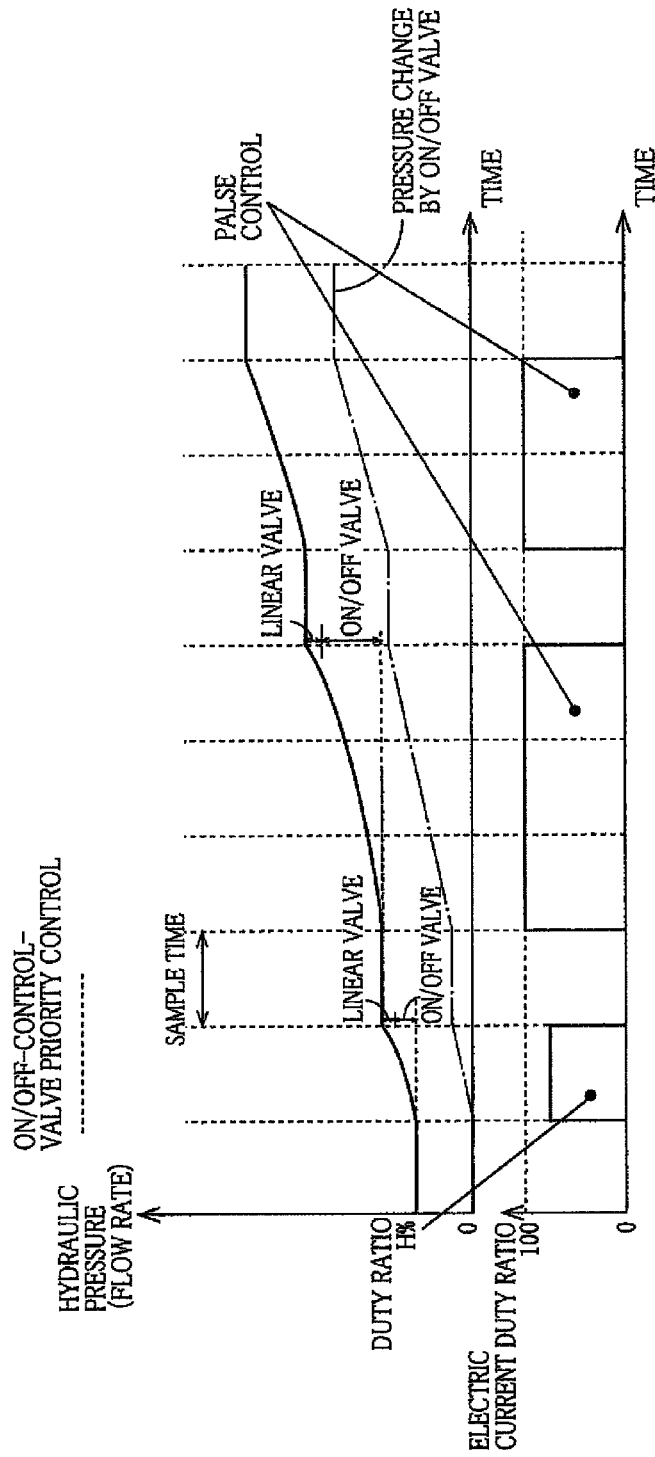
FIG. 17 is a view showing change of a hydraulic pressure in a common passage in case of execution of the above-described ON/OFF-control-valve priority control.

FIG. 17 shows a change of the hydraulic pressure in the common passage 102 when the ON/OFF-control-valve priority control is executed. The particular required flow rate q is divided into the flow rate established in the ON/OFF control valve 114 or 118 and the flow rate established in the linear control valve 112 or 116, as shown in FIG. 17.

(3-2-2) Linear-Control-Valve Priority Control

An example of the linear-control-valve priority control is shown in flow chart of FIG. 16 (c).

In step S128, the flow rate, which is to be established in the linear control valve 112 or 116, is set to a flow rate q1. The linear control valve 112 or 116 is controlled within the region R in which the flow rate is accurately controllable. As shown in the model of FIG. 3 (c), the flow rate q1 is an average flow rate within the region R.

In step S129, the flow rate, which is to be established in the ON/OFF control valve 114 or 118, is set to a deficiency $q_{ON}(=q-q1)$ of the particular required flow rate q, which is to be compensated by the ON/OFF control valve 114 or 118. The ON/OFF control valve 114 or 118 is subjected to the duty control or pulse control such that the required flow rate $q_{ON}$ is established in the valve 114 or 118.

In this case, the division ratio is represented by $q_{ON}:q1$.

Thus, one of the linear-control-valve priority control and the ON/OFF-control-valve priority control, which is selected depending on the particular required accuracy required in the ON/OFF-control-valve combination control I, is executed, so that the linear control valve 112 or 116 and the ON/OFF control valve 114 or 118 can be controlled with the particular required accuracy being established.

In the present embodiment, one of the linear-control-valve priority control and the ON/OFF-control-valve priority control is selected depending on the particular required accuracy. However, it is also possible to select one of the linear-control-valve priority control and the ON/OFF-control-valve priority control, based on the control-type-dependent required accuracy (S121). In this arrangement, the linear-control-valve priority control is executed during the normal operation control, and the ON/OFF-control-valve priority control is executed during the emergency-operation assist control.

In the present embodiment, an ON/OFF-control-valve combination controlling portion is constituted principally by portions of the brake ECU 56 which are assigned to store and carry out the programs represented by the flow charts of FIG. 16 (a), (b), (c); a flow rate controlling portion is constituted principally by portions of the brake ECU 56 which are assigned to store and implement steps S125, S129; and a ratio determining portion is constituted principally by portions of the brake ECU 56 which are assigned to store and implement steps S125, S126, S128, S129. It is also possible to consider that the ratio determining portion is constituted by portions of the brake ECU 56 which are assigned to store and implement steps S121-S123, because it is possible to consider that the division ratio is determined depending on which one of the linear-control-valve priority control and the ON/OFF-control-valve priority control is selected (i.e., whether the linear control valve or the ON/OFF control valve is selected as a priority-controlled valve).

(3-3) Control C (Standby Control)

A standby control is executed concurrently with one of the controls A, B.

Figure 18:
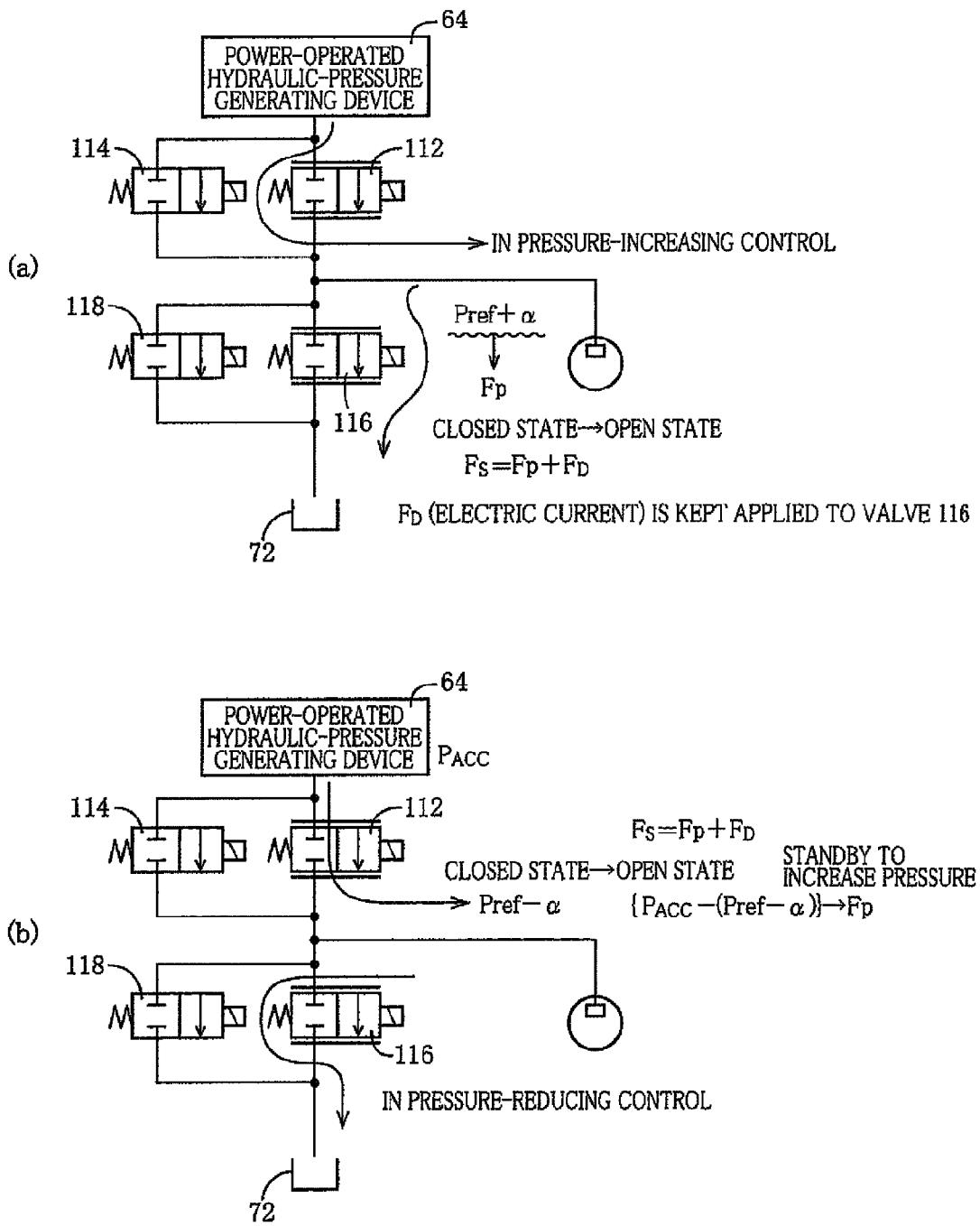
FIG. 18 is a set of views showing a control valve device and its neighborhood in the above-described hydraulic brake system, for explaining a standby control.

The standby control is a control (pressure-reduction standby control or pressure-increase standby control) in which, as shown in FIG. 18 (a), (b), a standby electric current is supplied to the pressure-reducing linear control valve 116 during the pressure-increasing control, and is supplied to the pressure-increasing linear control valve 112 during the pressure-reducing control. Thus, when the hydraulic pressure in the common passage 102 has been increased (or reduced) to a desired value (standby hydraulic pressure), the pressure-reducing linear control valve 116 (or the pressure-increasing linear control valve 112) is opened so as not to further increase (or so as not to further reduce) the hydraulic pressure.

During the pressure-increasing control, the hydraulic pressure in the common passage 102 is increased whereby the high/low pressure difference in the pressure-reducing linear control valve 116 is increased. Meanwhile, as shown in FIG. 3 (b), the valve-opening electric current is reduced with increase of the pressure difference. Thus, at a current point of time, the pressure-reducing linear control valve 116 is held in the closed state even with supply of the valve-opening electric current (that is required to open the valve 116 when the hydraulic pressure has reached the desired value) to the valve 116. The pressure-reducing linear control valve 116 is switched to the open state when the high/low pressure difference in the pressure-reducing linear control valve 116 has been increased with increase of the hydraulic pressure in the common passage 102 in execution of the pressure-increasing control. The same description may be applied to the pressure-increasing linear control valve 112 during the pressure-reducing control, too.

Figure 19:
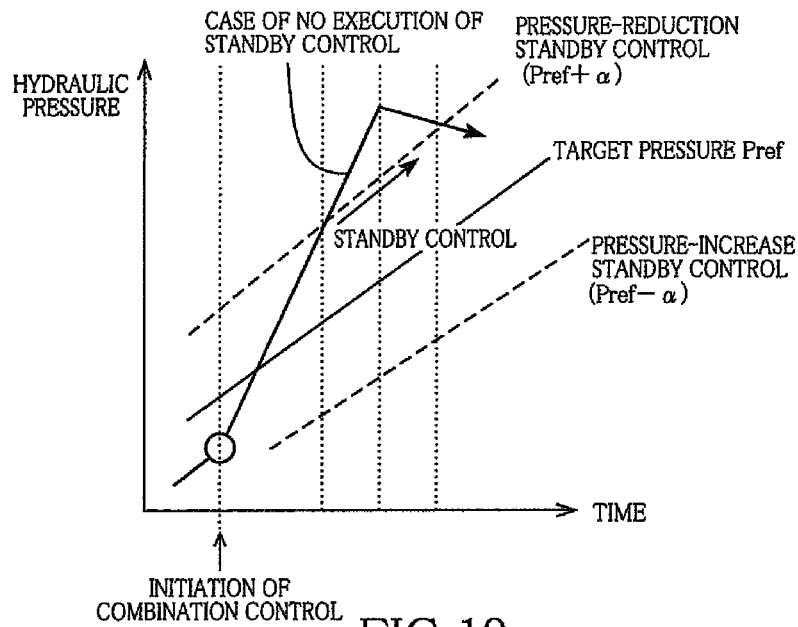
FIG. 19 is a view showing change of the hydraulic pressure in the common passage in case of execution of the above-described standby control.

In execution of the ON/OFF-control-valve combination control I, the gradient of change of the brake-cylinder hydraulic pressure is increased, as shown in FIG. 19, the hydraulic pressure could be overshot or switching between the pressure-increasing control and pressure-reducing control is considerably frequently carried out, thereby causing a risk of a control hunting. For avoiding such a risk, the standby control is executed.

In FIG. 19, a bent line represents a change of the hydraulic pressure where the pressure-increasing control is changed to the pressure-reducing control when the actual hydraulic pressure P* has reached to a pressure-increase termination threshold value that is determined depending on the target hydraulic pressure and a dead zone width Thus, by executing the standby control, it is possible to suppress the overshoot and to restrain the control hunting.

During the pressure-increasing control, the pressure-reducing linear control valve 116 serves as a standby-controlled valve (that may be referred to as a valve subjected to a pressure-reduction standby control). The valve-opening electric current, which is required for opening the pressure-reducing linear control valve 116 when the hydraulic pressure in the common passage 102 as the high pressure side of the pressure-reducing linear control valve 116 reaches the standby hydraulic pressure (=target hydraulic pressure Pref+allowable fluctuation value α) as shown in FIG. 18 (a), can be obtained from FIG. 3 (b). Thus, this valve-opening electric current Iopen as a standby electric current is kept supplied to the solenoid 126 of the pressure-reducing linear control valve 116. When the hydraulic pressure in the common passage 102 has reached the standby hydraulic pressure (=target hydraulic pressure Pref+allowable fluctuation value α) with the standby electric current being kept supplied to the solenoid 126 of the pressure-reducing linear control valve 116, the pressure-reducing linear control valve 116 is placed from the closed state to the open state so that the hydraulic pressure in the common passage 102 can be avoided from becoming higher than the standby hydraulic pressure (=target hydraulic pressure Pref+ allowable fluctuation value α). It is common that an amount of the standby electric current is changed with change of the target hydraulic pressure Pref so that the supplied electric current is reduced with increase of the target hydraulic pressure Pref.

Further, as shown in FIG. 18 (b), during the pressure-reducing control, the pressure-increasing linear control valve 112 serves as a standby-controlled valve (that may be referred to as a valve subjected to a pressure-increase standby control). The hydraulic pressure on the high-pressure side of the pressure-increasing linear control valve 112 corresponds to the accumulator pressure Pacc. The valve-opening electric current, which is required for opening the pressure-increasing linear control valve 112 when the hydraulic pressure in the common passage 102 as the low pressure side of the pressure-increasing linear control valve 112 reaches the standby hydraulic pressure (=target hydraulic pressure Pref−allowable fluctuation value α), can be obtained from FIG. 3 (b). Thus, this valve-opening electric current Iopen as a standby electric current is kept supplied to the solenoid 126 of the pressure-increasing linear control valve 112. When the hydraulic pressure in the common passage 102 has reached the standby hydraulic pressure (=target hydraulic pressure Pref−allowable fluctuation value α) with the standby electric current being kept supplied to the solenoid 126 of the pressure-increasing linear control valve 112, the pressure-increasing linear control valve 112 is placed from the closed state to the open state whereby the working fluid is supplied from the accumulator 66 to the common passage 102 so that the hydraulic pressure in the common passage 102 can be avoided from being reduced.

The allowable fluctuation value α may be either a predetermined fixed value or a value determined depending on the control-type-dependent required accuracy and the level of the control-type-dependent required vibration suppression.

The allowable fluctuation value α may be set to a small value, for example, when the control-type-dependent required accuracy is high. By setting the allowable fluctuation value α to a small value, the hydraulic pressure in the common passage 102 can be controlled to be close to the target hydraulic pressure Pref.

Where the allowable fluctuation value α is a small value, the frequency of activation of each of the pressure-increasing linear control valve 112 and the pressure-reducing linear control valve 116 is increased whereby operational noise and vibration are easily generated. Therefore, when the level of the control-type-dependent required vibration suppression is high (i.e., when the vehicle operator is sensitive to the vibration and noise), it is desirable to increase the allowable fluctuation value α.

In view of the above, the allowable fluctuation value α may be set to a suitable value, for example, such that the allowable fluctuation value α is set to a large value when the level of the control-type-dependent required vibration suppression is regarded important, and such that the allowable fluctuation value α is set to a small value when the control-type-dependent required accuracy is regarded important. Further, during execution of the emergency-operation assist control, the allowable fluctuation value α may be set to a large value.

The allowable fluctuation value α may be a value determined depending on the dead zone width.

The allowable fluctuation value during the pressure-increasing control and the allowable fluctuation value during the pressure-reducing control may be either equal to each other or different from each other.

Figure 20:
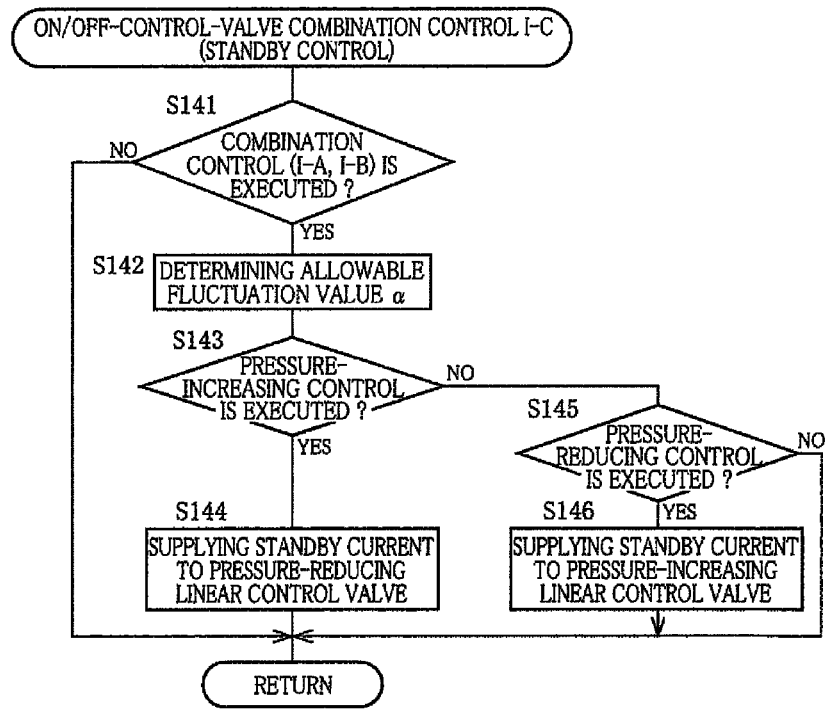
FIG. 20 is a flow chart showing an ON/OFF-control-valve combination control I-C program stored in the storage portion of the above-described brake ECU.

FIG. 20 is a flow chart showing a standby control (ON/OFF-control-valve combination control I-C) program that is carried out at a predetermined time interval. In step S141, it is judged whether the ON/OFF-control-valve combination control is being executed or not. In step S142, the allowable fluctuation value α is determined. In step S143, it is judged whether the pressure-increasing control is being executed or not. When the pressure-increasing control is being executed, the control flow goes to step S144 in which the standby electric current is supplied to the pressure-reducing linear control valve 116. In this instance, the supplied electric current (standby electric current) is an electric current, which causes the pressure-reducing linear control valve 116 to be switched from the closed state to the open state when the pressure difference has reached a value represented by {the hydraulic pressure on the high-pressure side (target hydraulic pressure Pref+allowable fluctuation value α)−the hydraulic pressure on the low-pressure side (reservoir pressure)}.

When the pressure-reducing control is being executed, a positive judgment (YES) is obtained in step S145 whereby the control flow goes to step S146 in which the standby electric current is supplied to the pressure-increasing linear control valve 112. In this instance, the supplied electric current (standby electric current) is an electric current, which causes the pressure-increasing linear control valve 112 to be switched from the closed state to the open state when the pressure difference has reached a value represented by {the hydraulic pressure on the high-pressure side (accumulator pressure)−the hydraulic pressure on the low-pressure side (target hydraulic pressure Pref−allowable fluctuation value α)}.

FIG. 21 shows a summary of content of the ON/OFF-control-valve combination control I that is executed as described above. The controls A, B are executed alternatively or concurrently with each other, while the control C is executed concurrently with at least one of the controls A, B.

In the present embodiment, a standby electric-current supplying portion is constituted principally by portions of the brake ECU 56 which are assigned to store and implement steps S144, S146 of the flow chart of FIG. 20.

(4) ON/OFF-Control-Valve Combination Control II

During the linear-control-valve individual control, if the control delay becomes not smaller than a given degree, the ON/OFF-control-valve combination control II is selected (S8, S95) whereby the linear control valve 112 or 116 and the ON/OFF control valve 114 or 118 are selected as controlled valves. In the present embodiment, when a situation in which the deviation e is larger than a response-delay threshold value eth has lasted for a delay judgment time Tdeth or more (S7), it is judged that the control delay becomes not smaller than the given degree.

In the ON/OFF-control-valve combination control II, the electric current is supplied to the ON/OFF control valve 114 or 118 in accordance with a predetermined pattern (for example, in the present embodiment, the current supply is switched ON for one sample time and is switched OFF for three sample times).

The response-delay threshold value eth may be either a predetermined fixed value or a variable value that is variable as needed. Where the response-delay threshold value eth is a fixed value, the threshold value eth may be, for example, a product ($\Delta P \cdot K$) of a reference value $\Delta P$ and a value K not smaller than 1, wherein the reference value $\Delta P$ is an average value by which the hydraulic pressure in the common passage 102 is to be increased or reduced by placing the ON/OFF control valve 114 or 118 in the ON state for one sample time. Since the hydraulic pressure in the common passage 102 is increased or reduced by a value that varies depending on the high/low pressure difference, the average value is used as the reference value. The fixed value as the response-delay threshold value eth is a degree of the delay that can be recovered by placing the ON/OFF control valve 114 or 118 in the open state at least once.

Meanwhile, the delay judgment time Tdeth is a length of time that makes it possible to regard that the delay is large when the deviation e is kept larger than the response-delay threshold value eth for the delay judgment time Tdeth or more. The delay judgment time Tdeth may be, for example, as large as several times of the one sample time.

Figure 22:
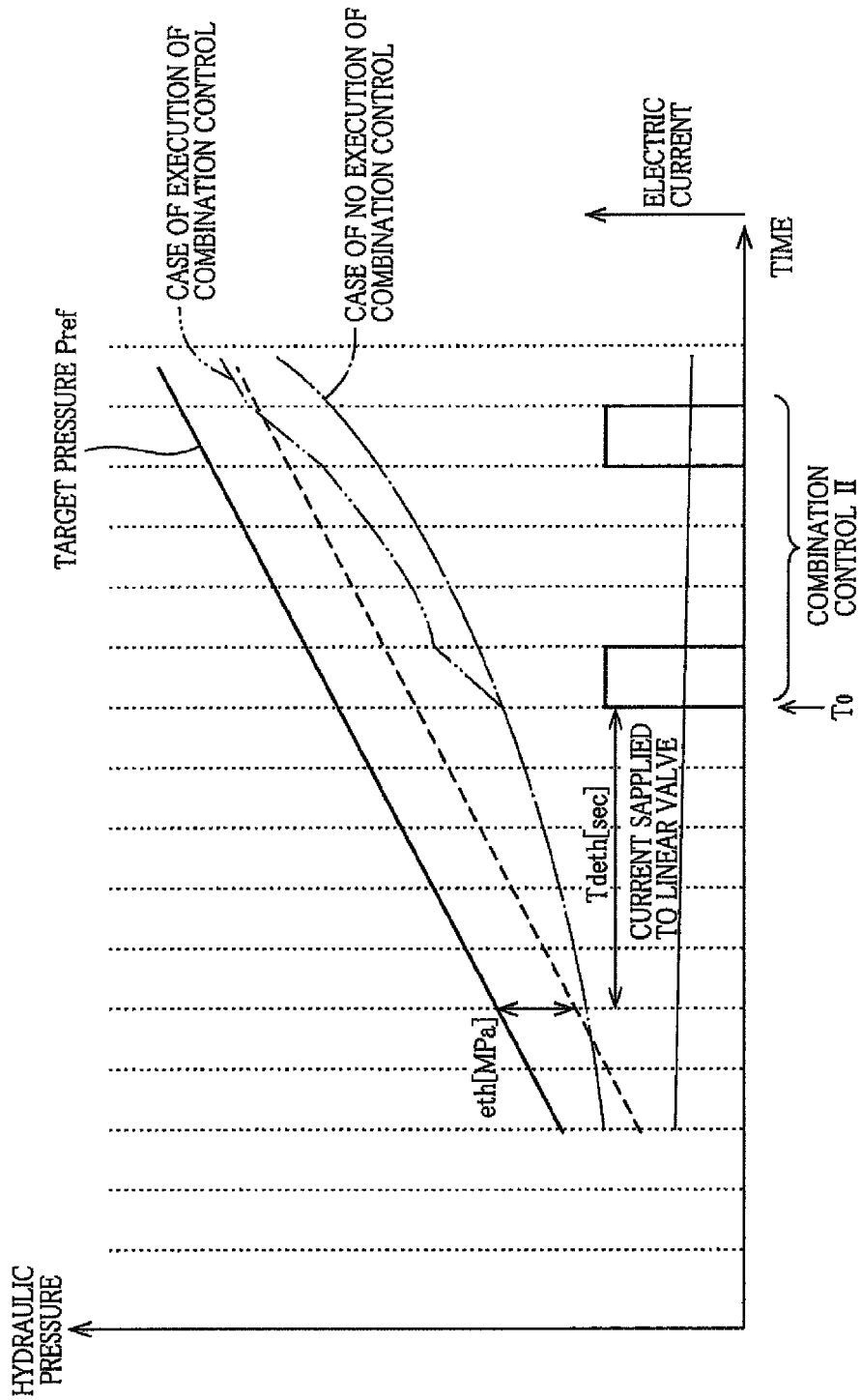
FIG. 22 is a view showing change of the hydraulic pressure in case of execution of the above-described ON/OFF-control-valve combination control II.

When it is judged that the control delay becomes larger than the given degree or more at a point To of time in FIG. 22, the ON/OFF control valve 114 or 118 is controlled in accordance with the above-described pattern. In the present embodiment, the ON/OFF-control-valve combination control II is terminated when the controlled pressure has become close to the target hydraulic pressure and the deviation e has become smaller than the response-delay threshold value eth as a result of execution of the ON/OFF-control-valve combination control II.

Thus, by executing the ON/OFF-control-valve combination control II, it is possible to make the actual hydraulic pressure close to the target hydraulic pressure and to reduce the control delay.

In the present embodiment, a delay-recovering ON/OFF-control-valve-combination-control executing portion is constituted principally by portions of the brake ECU 56 which are assigned to store and implement steps S7, S8 of the brake ECU 56.

The manner of execution of the ON/OFF-control-valve combination control II is not limited to the above details.

For example, the response-delay threshold value eth may be a value (fixed value) dependent on an amount of the dead zone width, or a value (fixed value) dependent on an increase or a reduction of the hydraulic pressure when the ON/OFF control valve 114 or 118 is placed on the ON state for the duty control.

Further, the pattern of the ON/OFF-control-valve combination control II may be determined also based on an amount of the deviation e or a length Tr of time that is required for the actual hydraulic pressure to reach the target hydraulic pressure. For example, the ON time may be longer when the amount of the deviation e is large than when the amount of the deviation e is small, and/or may be longer when the delay time Tr is long than when the delay time Tr is short. Specifically described, the deviation e may take one of three levels, for example, such that the pulse width (ON state) is set to a value larger than two sample times (e.g., three sample times) when the deviation e is a largest one of the three levels, the pulse width is set to two sample times when the deviation e is an intermediate one of the three levels, and the pulse width is set to one sample time when the deviation e is a smallest one of the three levels.

[Embodiment 2]

In the present embodiment, the ON/OFF-control-valve combination control is executed at an initial stage of activations of the hydraulic brakes 40, 50 or at a stage shortly after a control mode has been changed in accordance with a predetermined pattern.

FIG. 26 (*a*) shows a relationship (brake-cylinder hydraulic pressure change characteristic) between an amount of the working fluid and the hydraulic pressure in each of the brake cylinders 42, 52. At the initial stage of activations of the hydraulic brakes 40, 50, an amount of the working fluid required for increasing the hydraulic pressure by a given amount is large so that the activation delay is caused.

In the present embodiment, at the initial stage of activations of the hydraulic brakes 40, 50 (i.e., at a stage from initiation of the activations until elapse of a first given time), the ON/OFF-control-valve combination control III is executed, irrespective of an actual increase gradient of the target hydraulic pressure or the like (i.e., irrespective of whether the increase gradient of the target hydraulic pressure is large or small).

As shown in FIG. 26 (*b*), there exists a hysteresis (hereinafter referred to as hysteresis characteristic) between the change of the brake-cylinder hydraulic pressure and the working fluid amount. That is, when the brake cylinder pressure is to be reduced or increased after having been increased or reduced, the hydraulic pressure is not immediately changed but is changed with a delay. Further, also when the control mode is switched from the pressure-holding mode to the pressure-reducing mode or pressure-increasing mode, the delay is increased. Therefore, when the control mode is changed in accordance with one of the above-described four patterns (i.e., from the pressure-increasing mode to the pressure-reducing mode, from the pressure-holding mode to the pressure-reducing mode, from the pressure-reducing mode to the pressure-increasing mode, from the pressure-reducing mode to the pressure-holding mode), the ON/OFF-control-valve combination control IV is executed. Described specifically, the ON/OFF-control-valve combination control IV is executed at a stage from change of the control mode in accordance with one of the above-described patterns until elapse of the first given time, irrespective of the change gradient of the target hydraulic pressure and the like.

Figure 27:
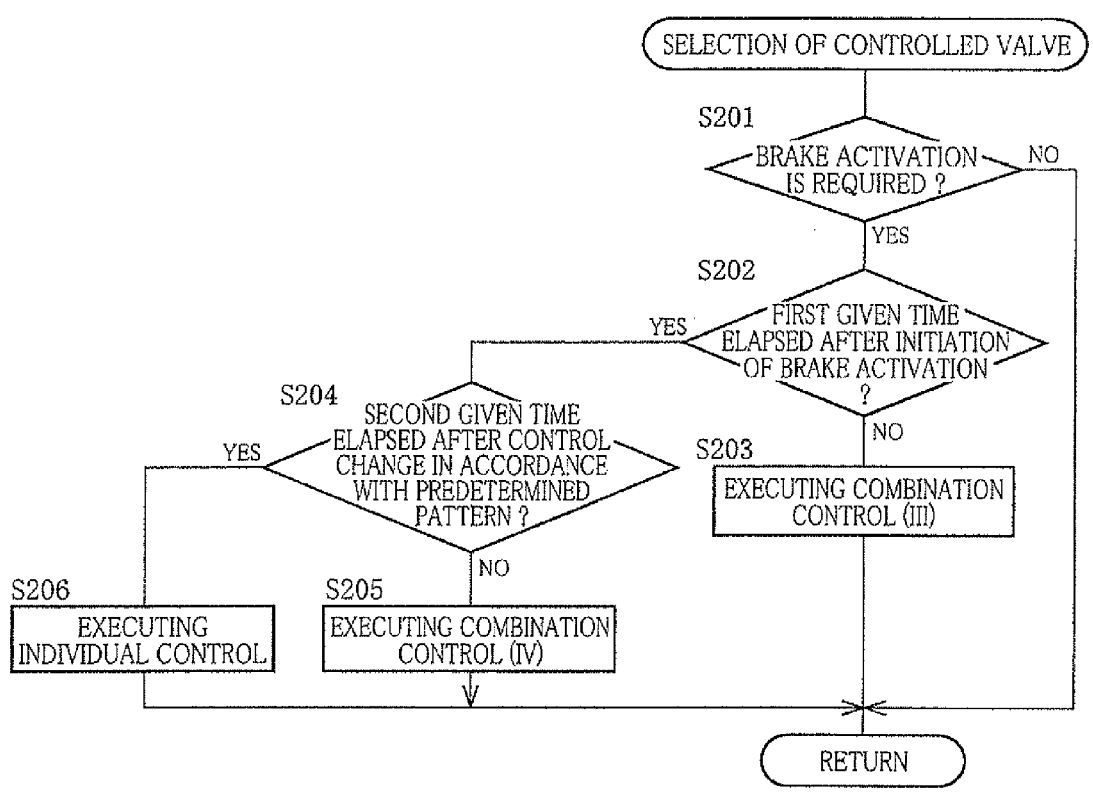
FIG. 27 is a flow chart showing a control-mode instructing program stored in a storage portion of a brake ECU of the above-described hydraulic brake system. The control-mode instructing program is a controlled-valve selecting program, too.

FIG. 27 is a flow chart showing a controlled-valve selecting program that is carried out at a predetermined interval time.

In step S201, it is judged whether the activations of the hydraulic brakes 40, 50 are requested or not. When the activations are requested, the control flow goes to step S202 in which it is judged whether the first given time or more has elapsed after initiation of the activations of the hydraulic brakes 40, 50.

The point of time of the initiation of the activations of the hydraulic brakes 40, 50 may be a point of time at which an activation-request absent state (in which the activation request is absent) is changed to an activation-request present state (in which the activation request is present), a point of time at which a command requesting an increase of the hydraulic pressure in each of the brake cylinders 42, 52 is outputted (at which the pressure-increasing mode is requested for the first time), or a point of time at which the target hydraulic pressure becomes higher than 0. The first given time may be a length of time determined based on the brake-cylinder hydraulic pressure change characteristic shown in FIG. 26 (a), namely, may be a length of time determined based on a region in which an amount of the working fluid required for increasing the hydraulic pressure by a given amount is considered large.

Then, when the first given time has not yet elapsed after initiation of the activation of the hydraulic brakes 40, 50, the control flow goes to step S203 in which execution of the ON/OFF-control-valve combination control III is requested, namely, the pressure-increasing linear control valve 112 and the pressure-increasing ON/OFF control valve 114 are selected as the controlled valves.

On the other hand, when at least the first given time has elapsed after initiation of the activation of the hydraulic brakes 40, 50, the control flow goes to step S204 in which it is judged whether the control mode has been changed in accordance with one of the above-described four patterns and a given second time has elapsed after change of the control mode. When the control mode is changed in accordance with one of the above-described patterns and the second given time has not yet elapsed after the change of the control mode (i.e., after establishment of a new control mode), the control flow goes to step S205 in which execution of the ON/OFF-control-valve combination control IV is requested, namely, the ON/OFF-control-valve combination controlling portion is selected whereby the linear control valve 112 or 116 and the ON/OFF control valve 114 or 118 are selected as the controlled valves.

The second given time is determined based on a length of time by which the change of the hydraulic pressure is delayed due to the hysteresis as shown in FIG. 26 (b). The second time may be a value that varies depending on the pattern of change of the control mode. For example, the second given time may be a large length of time when the control mode is switched from the pressure-increasing mode to the pressure-reducing mode, and may be a small length of time when the control mode is switched from the pressure-reducing mode to the pressure-increasing mode.

On the other hand, when the second given time has elapsed after change of the control mode, the control flow goes to step S206 in which execution of the linear-control-valve individual control is requested.

Figure 28:
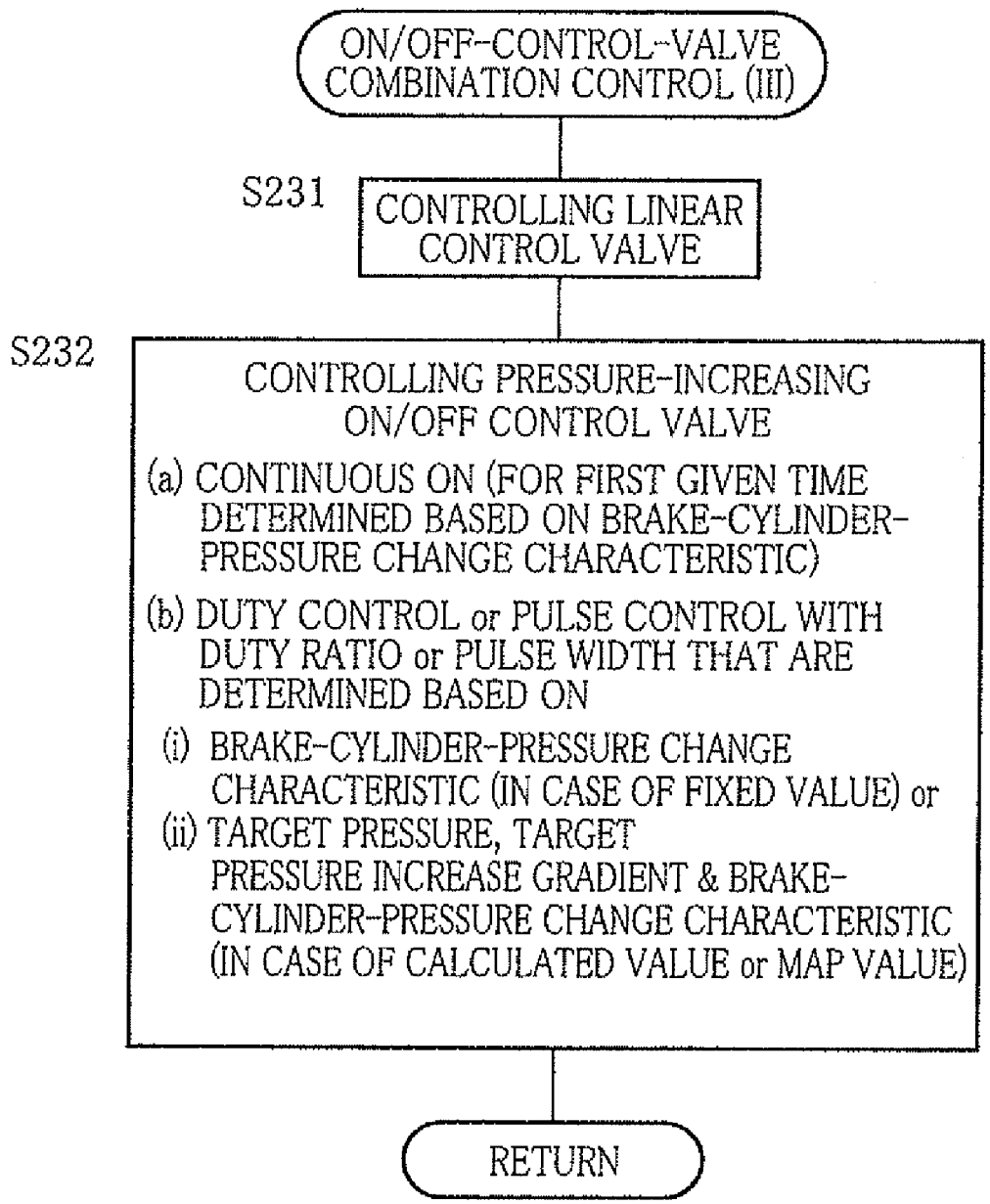
FIG. 28 is a flow chart showing an ON/OFF-control-valve combination control III program stored in the above-described storage portion.

FIG. 28 is a flow chart showing an example of the ON/OFF-control-valve combination control III.

In step S231, the pressure-increasing linear control valve 112 is controlled substantially in the same manner as in the linear-control-valve individual control of the embodiment 1.

In step S232, the pressure-increasing ON/OFF control valve 114 is controlled, for example, such that (a) the valve 114 is held in the continuous ON state for the first given time, or such that (b) the duty control or pulse control is executed. Each of the duty ratio and the pulse width may be (i) a predetermined fixed value determined based on the brake-cylinder hydraulic pressure change characteristic shown in FIG. 26 (a) or (ii) a variable value determined based on the target hydraulic pressure, the increase gradient of the target hydraulic pressure, the brake-cylinder hydraulic pressure change characteristic (shown in FIG. 26 (a)) and the like. In the latter case, each of the duty ratio and the pulse width may be obtained as needed, for example, by calculation or based on a map.

Figure 30:
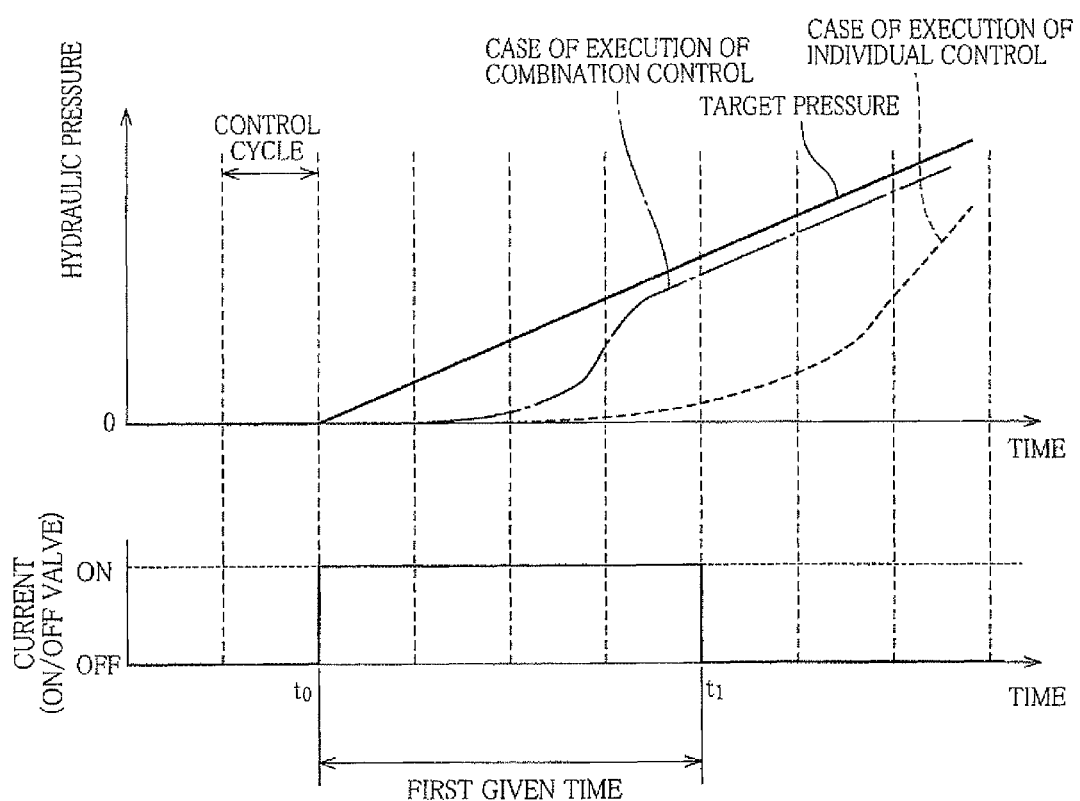
FIG. 30 is a view showing change of a hydraulic pressure in a brake cylinder in the above-described hydraulic brake system.

FIG. 30 shows change of the hydraulic pressure in each of the brake cylinders 42, 52 when the ON/OFF-control-valve combination control III is executed at the initial stage of activations of the hydraulic brakes 40, 50.

A command requesting the activations of the hydraulic brakes 40, 50 is detected at a point $t_0$ of time, and then the target hydraulic pressure is increased as indicated by solid line, so that the pressure-increasing mode is established, namely, the pressure-increasing control is executed. However, the actual increase of the hydraulic pressure is delayed due to the hydraulic-pressure change characteristic of the brake cylinder, so that the actual hydraulic pressure in each of the brake cylinders 42, 52 is changed as indicated by broken line if the linear-control-valve individual control is executed.

On the other hand, in the present embodiment, the ON/OFF-control-valve combination control III is executed for the first given time from the point $t_0$ of time (until a point $t_1$ of time), so that the pressure-increasing ON/OFF control valve 114 is placed in the continuous ON state while the pressure-increasing linear control valve 112 is being controlled. Consequently, the brake-cylinder hydraulic pressure (i.e., hydraulic pressure in the common passage) is changed as indicated by one-dot chain line, so that the delay of the increase of the hydraulic pressure can be made smaller as compared with the change indicated by broken line.

Figure 29:
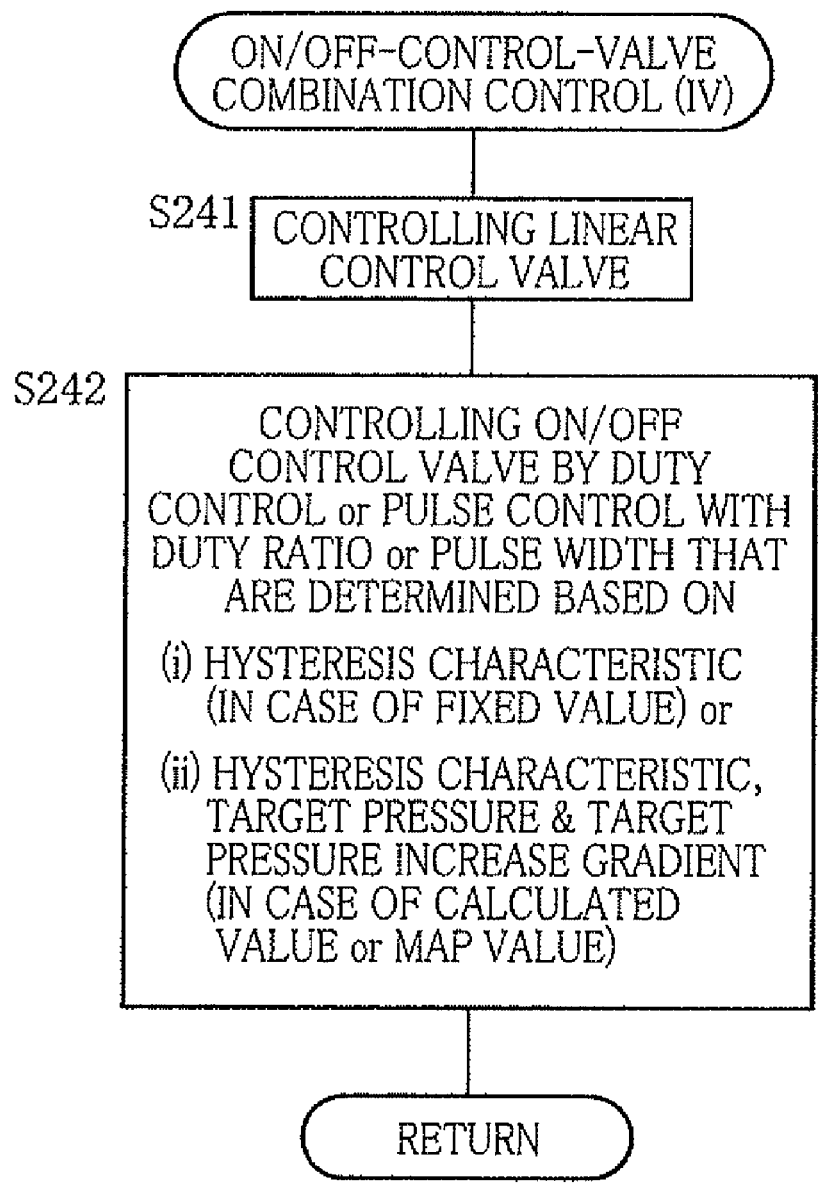
FIG. 29 is a flow chart showing an ON/OFF-control-valve combination control IV program stored in the above-described storage portion.

FIG. 29 is a flow chart showing an example of the ON/OFF-control-valve combination control IV.

In step S241, the pressure-increasing linear control valve 112 or 116 is controlled in substantially the same manner as in the linear-control-valve individual control of the embodiment 1.

In step S242, the ON/OFF control valve 114 or 118 is subjected to the duty control or the pulse control. Each of the duty ratio and the pulse width may be (i) a predetermined fixed value determined based on the hysteresis characteristic shown in FIG. 26 (b) or (ii) a variable value determined based on the hysteresis characteristic, the target hydraulic pressure and the increase gradient of the target hydraulic pressure.

For example, when the control mode is switched from the pressure-increasing mode or pressure-holding mode to the pressure-reducing mode, the pressure-reducing ON/OFF control valve 118 is controlled such that the working fluid is rapidly discharged from the brake cylinders 42, 52. Further, when the control mode is switched from the pressure-reducing mode or pressure-holding mode to the pressure-increasing mode, the pressure-increasing ON/OFF control valve 114 is controlled such that the working fluid is rapidly supplied to the brake cylinders 42, 52. Thus, it is possible to reduce the delay due to the hysteresis characteristic.

In the present embodiment, a hydraulic-brake-activation-initiation ON/OFF-control-valve-combination-control selecting portion is constituted principally by portions of the brake ECU 56 which are assigned to store and implement step S203 of the flow chart of FIG. 27, and a control-change ON/OFF-control-valve-combination-control selecting portion is constituted principally by portions of the brake ECU 56 which are assigned to store and implement step S205 of the flow chart of FIG. 27.

In the above-described embodiment 2, the ON/OFF-control-valve combination control III is executed in a period from initiation of the activations of the hydraulic brakes 40, 50 until the first given time elapses. However, this is not essential. For example, the ON/OFF-control-valve combination control III may be executed, for example, (a) in a period from initiation of the activations of the hydraulic brakes 40, 50 until an absolute value of a difference between the target hydraulic pressure in the common passage 102 and the actual hydraulic pressure (i.e., value detected by the brake-cylinder hydraulic pressure sensor 166) in the common passage 102 becomes smaller than a given value (that can be regarded that the delay becomes small) or (b) in a period from initiation of the activations of the hydraulic brakes 40, 50 until the actual hydraulic pressure reaches a given amount (that can be regarded that the pressure comes out from the region of large delay).

Further, in the above-described embodiment 2, the ON/OFF-control-valve combination control IV is executed in a period from change of the control mode until the second given time elapses. However, this is not essential. For example, the ON/OFF-control-valve combination control IV may be executed, for example, (a) in a period from change of the control mode until an absolute value of a difference between the target hydraulic pressure and the actual hydraulic pressure becomes smaller than a given value or (b) in a period from change of the control mode until the actual hydraulic pressure in the common passage 102 is changed by a given amount or more.

[Embodiment 3]

It is noted that the brake circuit is not limited to the circuit in the above-described embodiments.

Figure 31:
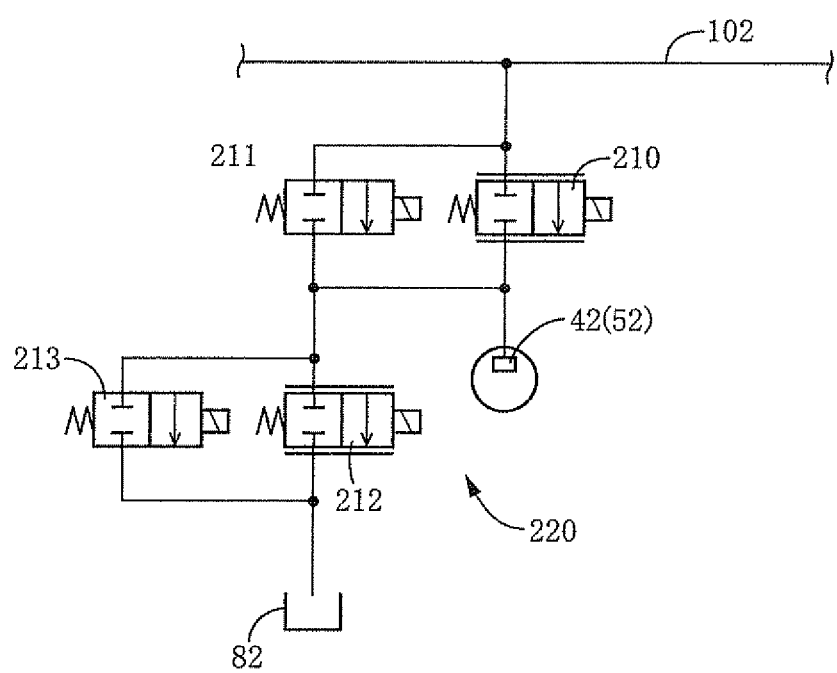
FIG. 31 is an electric circuit showing an arrangement in a hydraulic brake system according to embodiment 3 of the present invention.

For example, as shown in FIG. 31, a pressure-increasing linear control valve 210 and a pressure-increasing ON/OFF control valve 211 may be disposed in parallel with each other (in the individual passage 100) between the common passage 102 and each of the brake cylinders 42, 52, while a pressure-reducing linear control valve 212 and a pressure-reducing ON/OFF control valve 213 may be disposed in parallel with each other between the reservoir 82 and each of the brake cylinders 42, 52.

In the above-described embodiments 1 and 2, the hydraulic pressure in the common passage 102 is controlled to the target hydraulic pressure. In the present embodiment 3, the hydraulic pressures in the respective brake cylinders 42, 52 can be controlled to respective target hydraulic pressures (that are determined for the respective brake cylinders 42, 52) individually from each other, by controlling respective hydraulic-pressure control valve devices 220FL, 220FR, 220RL, 220RR (provided for the respective brake cylinders 42, 52) individually from each other. In the present embodiment 3, an individual hydraulic-pressure controlling portion of the hydraulic-pressure control device is constituted principally by portions of the brake ECU 56 which are assigned to control the hydraulic-pressure control valve devices 220FL, 220FR, 220RL, 220RR.

Further, the present invention can be carried out according to not only the above-described modes but also in other modes of various modifications and improvements that will be made based on knowledge of a person skilled in the art.

DESCRIPTION OF REFERENCE SIGNS

40, 50: hydraulic brake 42, 52: brake cylinder 54: hydraulic-pressure controlling portion 56: brake ECU 57: pump motor ECU 60: brake pedal 64: power-operated hydraulic-pressure generating device 102: common passage 110: controlled-pressure passage 112, 210: pressure-increasing linear control valve 114, 211: pressure-increasing ON/OFF control valve 116, 212: pressure-reducing linear control valve 118, 213: pressure-reducing ON/OFF control valve 119A: pressure-increasing control valve group 119D: pressure-reducing control valve group 119S, 220: control valve device 160: stroke sensor 162: master-cylinder pressure sensor 164: accumulator pressure sensor 160: individual feed-forward controlling portion 162: individual feed-back controlling portion 200: combination feed-forward controlling portion 202: combination feed-back controlling portion 204: target-hydraulic-pressure-based pressure-difference controlling portion 206: target-hydraulic-pressure-change-gradient-based controlling portion

The invention claimed is:
1. A hydraulic brake system comprising:
 a hydraulic pressure source provided for a vehicle, and including a hydraulic-pressure generating device and a reservoir
 a plurality of hydraulic brakes provided for respective wheels of the vehicle, and configured to restrain rotation of the respective wheels
 a common passage to which brake cylinders of said hydraulic brakes are connected;
 at least one of a pressure-increasing control valve group disposed between said common passage and said hydraulic-pressure generating device and a pressure-reducing control valve group disposed between said common passage and said reservoir;
  wherein said at least one of said pressure-increasing control valve group and said pressure-reducing control valve group includes at least one ON/OFF control valve and at least one linear control valve that are disposed in parallel with each other,
  wherein each of said at least one ON/OFF control valve is opened and closed by an ON/OFF control that is applied to supply an electric current to a solenoid of said each of said at least one ON/OFF control valve, and
  wherein each of said at least one linear control valve is capable of continuously controlling a pressure difference between a high-pressure side and a low-pressure side of said each of said at least one linear control valve b a continuous control that is applied to supply an electric current to a solenoid of said each of said at least one linear control valve; and
 a hydraulic-pressure control device configured to control a hydraulic pressure in said common passage, by controlling said at least one of said pressure-increasing control valve group and said pressure-reducing control valve group,
  wherein said hydraulic-pressure control device includes:
   (i) a linear-control-valve individual controlling portion configured, when said least one ON/OFF control valve is being closed, to continuously control an amount of the electric current supplied to said solenoid of each of said at least one linear control valve,
   (ii) an ON/OFF-control-valve combination controlling portion configured to continuously control the amount of the electric current supplied to said solenoid of each of said at least one linear control valve and to control ON/OFF of the supply of the electric current to said solenoid of each of said at least one ON/OFF control valve, and

(iii) a required-response-speed-based selecting portion configured to select one of said linear-control-valve individual controlling portion and said ON/OFF-control-valve combination controlling portion, based a required response speed that is required for controlling the hydraulic pressure in said common passage.

2. The hydraulic brake system according to claim 1, wherein said linear-control-valve individual controlling portion includes an individual feed-back controlling portion configured to execute a feed-back control for supply of the electric current to said solenoid of each of said at least one linear control valve, and wherein said ON/OFF-control-valve combination controlling portion includes a combination feed-back controlling portion configured to execute a feed-back control for supply of the electric current to said solenoid of each of said at least one linear control valve, by using a gain that is different from a gain used in said individual feed-back controlling portion.

3. The hydraulic brake system according to claim 1 wherein said ON/OFF-control-valve combination controlling portion includes a target-hydraulic-pressure-based pressure-difference controlling portion configured to supply, to said solenoid of each of said at least one linear control valve, a valve-opening electric current dependent on a pressure difference between a target value of the hydraulic pressure in said common passage and an actual value of the hydraulic pressure on a side of said each of said at least one linear control valve which is remote from said common passage.

4. The hydraulic brake system according to claim 1, wherein said hydraulic-pressure control device includes an activation-initiation ON/OFF-control-valve-combination-control selecting portion configured to select said ON/OFF-control-valve combination controlling portion in a period from a point of time when activation of each of said plurality of hydraulic brakes is initiated until a point of time when a first given condition is satisfied.

5. The hydraulic brake system according to claim 1, wherein said hydraulic-pressure control device includes a control-content-change ON/OFF-control-valve-combination-control selecting portion configured to select said ON/OFF-control-valve combination controlling portion, in a period from a point of time when a content of control of the hydraulic pressure in said common passage is changed in accordance with a predetermined pattern until a point of time when a second given condition is satisfied.

6. A hydraulic brake system comprising;
a hydraulic pressure source provided for a vehicle, and including a hydraulic-pressure generating device and a reservoir;
a plurality of hydraulic brakes provided for respective wheels of the vehicle, and configured to restrain rotation of the respective wheels;
a common passage to which brake cylinders of said hydraulic brakes are connected;
at least one of a pressure-increasing control valve group disposed between said common passage and said hydraulic-pressure generating device and a pressure-reducing control valve group disposed between said common passage and said reservoir;
wherein said at least one of said pressure-increasing control valve group and said pressure-reducing control valve group includes at least one ON/OFF control valve and at least one linear control valve that are disposed in parallel with each other,
wherein each of said at least one ON/OFF control valve is opened and closed by an ON/OFF control that is applied to supply an electric current to a solenoid of said each of said at least one ON/OFF control valve, and
wherein each of said at least one linear control valve is capable of continuously controlling a pressure difference between a high-pressure side and a low-pressure side of said each of said at least one linear control valve b a continuous control that is applied to supply an electric current to a solenoid of said each of said at least one linear control valve; and
a hydraulic-pressure control device configured to control a hydraulic pressure in said common passage, by controlling said at least one of said pressure-increasing control valve group and said pressure-reducing control valve group,
wherein said hydraulic-pressure control device includes:
(i) a linear-control-valve individual controlling portion configured, when said least one ON/OFF control valve is being closed, to continuously control an amount of the electric current supplied to said solenoid of each of said at least one linear control valve
(ii) an ON/OFF-control-valve combination controlling portion configured to continuously control the amount of the electric current supplied to said solenoid of each of said at least one linear control valve and to control ON/OFF of the supply of the electric current to said solenoid of each of said at least one ON/OFF control valve, and
(iii) a required-accuracy-based selecting portion configured to select one of said linear-control-valve individual controlling portion and said ON/OFF-control-valve combination controlling portion, based on a required accuracy that is required for controlling the hydraulic pressure in said common passage.

7. A hydraulic brake system comprising:
a hydraulic pressure source provided for a vehicle, and including a hydraulic-pressure generating device and a reservoir;
a plurality of hydraulic brakes provided for respective wheels of the vehicle, and configured to restrain rotation of the respective wheels;
a common passage to which brake cylinders of said hydraulic brakes are connected;
at least one of a pressure-increasing control valve group disposed between said common passage and said hydraulic-pressure generating device and a pressure-reducing control valve group disposed between said common passage and said reservoir;
wherein said at least one of said pressure-increasing control valve group and said pressure-reducing control valve group includes at least one ON/OFF control valve and at least one linear control valve that are disposed in parallel with each other,
wherein each of said at least one ON/OFF control valve is opened and closed by an ON/OFF control that is applied to supply an electric current to a solenoid of said each of said at least one ON/OFF control valve, and
wherein each of said at least one linear control valve is capable of continuously controlling a pressure difference between a high-pressure side and a low-pressure side of said each of said at least one linear control valve, by a continuous control that is applied to supply an electric current to a solenoid of said each of said at least one linear control valve; and
a hydraulic-pressure control device configured to control a hydraulic pressure in said common passage, by controlling said at least one of said pressure-increasing control valve group and said pressure-reducing control valve group, wherein said hydraulic-pressure control device includes:
(i) a linear-control-valve individual controlling portion configured, when said least one ON/OFF control valve is being closed, to continuously control an amount of the electric current supplied to said solenoid of each of said at least one linear control valve,
(ii) an ON/OFF-control-valve combination controlling portion configured to continuously control the amount of the electric current supplied to said solenoid of each of said at least one linear control valve and to control ON/OFF of the supply of the electric current to said solenoid of each of said at least one ON/OFF control valve, and
(iii) a response-speed-based ON/OFF-control-valve-combination-control selecting portion configured to select said ON/OFF-control-valve combination controlling portion at least when a required response speed that is required for controlling the hydraulic pressure in said common passage is higher than a threshold value dependent on a required accuracy that is required for controlling the hydraulic pressure in said common passage.

8. A hydraulic brake system comprising,
a hydraulic pressure source provided for a vehicle, and including a hydraulic-pressure generating device and a reservoir
a plurality of hydraulic brakes provided for respective wheels of the vehicle, and configured to restrain rotation of the respective wheels;
a common passage to which brake cylinders of said hydraulic brakes are connected;
a pressure-increasing control valve group disposed between said common passage and said hydraulic-pressure generating device and a pressure-reducing control valve group disposed between said common passage and said reservoir:
wherein each of said pressure-increasing control valve group and said pressure-reducing control valve group includes at least one ON/OFF control valve and at least one linear control valve that are disposed in parallel with each other,
wherein each of said at least one ON/OFF control valve is opened and closed by an ON/OFF control that is applied to supply an electric current to a solenoid of said each of said at least one ON/OFF control valve, and
wherein each of said at least one linear control valve is capable of continuously controlling a pressure difference between a high-pressure side and a low-pressure side of said each of said at least one linear control valve, by a continuous control that is applied to supply an electric current to a solenoid of said each of said at least one linear control valve and
a hydraulic-pressure control device configured to control a hydraulic pressure in said common passage, by controlling said pressure-increasing control valve group and said pressure-reducing control valve group,
wherein said hydraulic-pressure control device includes:
(i) a linear-control-valve individual controlling portion configured, when said least one ON/OFF control valve is being closed, to continuously control an amount of the electric current supplied to solenoid of each of said at least one linear control valve, and
(ii) an ON/OFF-control-valve combination controlling portion configured to continuously control the amount of the electric current supplied to solenoid of each of said at least one linear control valve and to control ON/OFF of the supply of the electric current to said solenoid of each of said at least one ON/OFF control valve,
wherein said ON/OFF-control-valve combination controlling portion includes a standby electric-current supplying portion configured, while one of said pressure-increasing control valve group and said pressure-reducing control valve group is being controlled by said ON/OFF-control-valve combination controlling portion, to supply the electric current to said solenoid of each of said at least one linear control valve of the other of said pressure-increasing control valve group and said pressure-reducing control valve group, by a standby amount that causes said each of said at least one linear control valve to be switched from a closed state to an opening state when the hydraulic pressure in said common passage reaches a threshold value dependent on a target value of the hydraulic pressure.

9. A hydraulic brake system comprising:
a hydraulic pressure source provided for a vehicle, and including a hydraulic-pressure generating device and a reservoir;
a plurality of hydraulic brakes provided for respective wheels of the vehicle, and configured to restrain rotation of the respective wheels;
a common passage to which brake cylinders of said hydraulic brakes are connected;
at least one of a pressure-increasing control valve group disposed between said common passage and said hydraulic-pressure generating device and a pressure-reducing control valve group disposed between said common passage and said reservoir;
wherein said at least one of said pressure-increasing control valve group and said pressure-reducing control valve group includes at least one ON/OFF control valve and at least one linear control valve that are disposed in parallel with each other,
wherein each of said at least one ON/OFF control valve is opened and closed by an ON/OFF control that is applied to supply an electric current to a solenoid of said each of said at least one ON/OFF control valve, and
wherein each of said at least one linear control valve is capable of continuously controlling a pressure difference between a high-pressure side and a low-pressure side of said each of said at least one linear control valve, by a continuous control that is applied to supply an electric current to a solenoid of said each of said at least one linear control valve and
a hydraulic-pressure control device configured to control a hydraulic pressure in said common passage, by controlling said at least one of said pressure-increasing control valve group and said pressure-reducing control valve group,
wherein said hydraulic-pressure control device includes:
(i) a linear-control-valve individual controlling portion configured, when said least one ON/OFF control valve is being closed, to continuously control an amount of the electric current supplied to said solenoid of each of said at least one linear control valve, and (ii) an ON/OFF-control-valve combination controlling portion configured to continuously control the amount of the electric current supplied to said solenoid of each of said at least one linear control valve and to control ON/OFF of the supply of the electric current to said solenoid of each of said at least one ON/OFF control valve, wherein each of said at least one linear control valve is configured to allow flow of a working fluid at a higher rate when an amount of the electric current supplied to said solenoid is large than when the amount of the electric current is small, and wherein said ON/OFF-control-valve combination controlling portion includes (a) an ON/OFF-control-valve-flow-rate controlling portion configured to control an average rate of a working fluid flowing through each of said at least one ON/OFF control valve, by causing the electric current, which is supplied to said each of said at least one ON/OFF control valve, to be alternately turned on and off, and (b) a ratio determining portion configured to determine, based on a level of accuracy required for controlling the hydraulic pressure in said common passage, a ratio between the average rate of the working fluid allowed in said each of said at least one ON/OFF control valve and a rate of the working fluid allowed in each of said at least one linear control valve.

10. A hydraulic brake system comprising:

a hydraulic pressure source provided for a vehicle, and including a hydraulic-pressure generating device and a reservoir;

a plurality of hydraulic brakes provided for respective wheels of the vehicle, and configured to restrain rotation of the respective wheels;

a common passage to which brake cylinders of said hydraulic brakes are connected;

at least one of a pressure-increasing control valve group disposed between said common passage and said hydraulic-pressure generating device and a pressure-reducing control valve group disposed between said common passage and said reservoir;

wherein said at least one of said pressure-increasing control valve group and said pressure-reducing control valve group includes at least one ON/OFF control valve and at least one linear control valve that are disposed in parallel with each other, wherein each of said at least one ON/OFF control valve is opened and closed by an ON/OFF control that is applied to supply an electric current to a solenoid of said each of said at least one ON/OFF control valve, and wherein each of said at least one linear control valve is capable of continuously controlling a pressure difference between a high-pressure side and a low-pressure side of said each of said at least one linear control valve, by a continuous control that is applied to supply an electric current to a solenoid of said each of said at least one linear control valve; and a hydraulic-pressure control device configured to control a hydraulic pressure in said common passage, by controlling said at least one of said pressure-increasing control valve group and said pressure-reducing control valve group, wherein said hydraulic-pressure control device includes:

(i) a linear-control-valve individual controlling portion configured, when said least one ON/OFF control valve is being closed, to continuously control an amount of the electric current supplied to said solenoid of each of said at least one linear control valve, (ii) an ON/OFF-control-valve combination controlling portion configured to continuously control the amount of the electric current supplied to said solenoid of each of said at least one linear control valve and to control ON/OFF of the supply of the electric current to said solenoid of each of said at least one ON/OFF control valve, and (iii) a delay-recovering ON/OFF-control-valve-combination-control executing portion configured, when a delay in controlling the hydraulic pressure in said common passage by said linear-control-valve individual controlling portion is larger than a predetermined delay, to forcedly cause said ON/OFF-control-valve combination controlling portion to control the hydraulic pressure in said common passage.

* * * * *